United States Patent
Djorgovski et al.

(10) Patent No.: US 10,417,812 B2
(45) Date of Patent: Sep. 17, 2019

(54) SYSTEMS AND METHODS FOR DATA VISUALIZATION USING THREE-DIMENSIONAL DISPLAYS

(71) Applicant: California Institute of Technology, Pasadena, CA (US)

(72) Inventors: Stanislav G. Djorgovski, Altadena, CA (US); Ciro Donalek, Pasadena, CA (US); Scott Davidoff, Los Angeles, CA (US); Vicente Estrada, Rancho Cucamonga, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/465,528

(22) Filed: Mar. 21, 2017

(65) Prior Publication Data
US 2017/0193688 A1    Jul. 6, 2017

Related U.S. Application Data

(63) Continuation of application No. 15/276,742, filed on Sep. 26, 2016, now Pat. No. 9,665,988.
(Continued)

(51) Int. Cl.
*G06T 11/20* (2006.01)
*G06T 13/20* (2011.01)
(Continued)

(52) U.S. Cl.
CPC .......... *G06T 15/205* (2013.01); *G06K 9/4671* (2013.01); *G06K 9/6267* (2013.01);
(Continued)

(58) Field of Classification Search
CPC .... G06K 9/4671; G06K 9/6267; G06T 13/20; G06T 15/005; G06T 17/00; G06T 19/006;
(Continued)

(56) References Cited

U.S. PATENT DOCUMENTS 5,461,708 A    10/1995  Kahn
6,057,856 A    5/2000   Miyashita et al.
(Continued)

FOREIGN PATENT DOCUMENTS

EP    3353751        8/2018
WO    2014130044 A1  8/2014
(Continued)

OTHER PUBLICATIONS

Microsoft document, UIElement.Visibility Property (https://docs.microsoft.com/en-us/dotnet/api/system.windows.uielement.visibility?view=netframework-4.7.2) (Year: 2011).*
(Continued)

*Primary Examiner* — Sing-Wai Wu
(74) *Attorney, Agent, or Firm* — Gates & Cooper LLP

(57) ABSTRACT

Data visualization systems and methods for generating 3D visualizations of a multidimensional data space are described. In one embodiment a 3D data visualization application directs a processing system to: load a set of multidimensional data points into a visualization table; create representations of a set of 3D objects corresponding to the set of data points; receive mappings of data dimensions to visualization attributes; determine the visualization attributes of the set of 3D objects based upon the selected mappings of data dimensions to 3D object attributes; update a visibility dimension in the visualization table for each of the plurality of 3D object to reflect the visibility of each 3D object based upon the selected mappings of data dimensions to visualization attributes; and interactively render 3D data visualizations of the 3D objects within the virtual space from viewpoints determined based upon received user input.

23 Claims, 34 Drawing Sheets
(30 of 34 Drawing Sheet(s) Filed in Color)

Related U.S. Application Data

(60) Provisional application No. 62/232,119, filed on Sep. 24, 2015, provisional application No. 62/365,837, filed on Jul. 22, 2016.

(51) Int. Cl.

| | |
|---|---|
| G06T 15/00 | (2011.01) |
| G06T 15/20 | (2011.01) |
| G06T 15/50 | (2011.01) |
| G06T 19/00 | (2011.01) |
| G06T 19/20 | (2011.01) |
| G06T 7/55 | (2017.01) |
| G06K 9/46 | (2006.01) |
| G06K 9/62 | (2006.01) |
| H04N 5/225 | (2006.01) |
| G06T 15/40 | (2011.01) |

(52) U.S. Cl.
CPC .............. *G06T 7/55* (2017.01); *G06T 11/206* (2013.01); *G06T 13/20* (2013.01); *G06T 15/40* (2013.01); *G06T 15/506* (2013.01); *G06T 19/003* (2013.01); *G06T 19/006* (2013.01); *H04N 5/2256* (2013.01); *G06T 2200/04* (2013.01); *G06T 2200/24* (2013.01); *G06T 2219/2004* (2013.01); *G06T 2219/2016* (2013.01)

(58) Field of Classification Search
CPC ..... G06T 19/20; G06T 2200/04; G06T 7/004; G06T 7/20; H04N 5/2256
See application file for complete search history.

(56) References Cited

U.S. PATENT DOCUMENTS

| | | | |
|---|---|---|---|
| 6,154,723 | A | 11/2000 | Cox et al. |
| 6,750,864 | B1 | 6/2004 | Anwar |
| 8,773,508 | B2 | 7/2014 | Daniel et al. |
| 9,098,559 | B2 * | 8/2015 | Muenkel ........... G06F 17/30572 |
| 9,953,372 | B1 | 4/2018 | Dziabiak et al. |
| 2001/0012018 | A1 * | 8/2001 | Hayhurst .............. G06T 15/503 345/630 |
| 2004/0041846 | A1 | 3/2004 | Hurley et al. |
| 2004/0061702 | A1 | 4/2004 | Kincaid |
| 2005/0223337 | A1 | 10/2005 | Wheeler et al. |
| 2006/0069635 | A1 | 3/2006 | Ram et al. |
| 2006/0072799 | A1 | 4/2006 | McLain |
| 2007/0211056 | A1 * | 9/2007 | Chakraborty ......... G06T 11/206 345/440 |
| 2008/0079719 | A1 * | 4/2008 | Woo ........................ G06T 15/30 345/419 |
| 2010/0316284 | A1 | 12/2010 | Jeong et al. |
| 2011/0211056 | A1 | 9/2011 | Publicover et al. |
| 2013/0097563 | A1 | 4/2013 | Carlos et al. |
| 2014/0071138 | A1 | 3/2014 | Gibson et al. |
| 2014/0151035 | A1 | 6/2014 | Cohen et al. |
| 2015/0113460 | A1 | 4/2015 | High et al. |
| 2015/0205840 | A1 | 7/2015 | Yerli |
| 2016/0086353 | A1 | 3/2016 | Lukac et al. |
| 2017/0092008 | A1 | 3/2017 | Djorgovski et al. |
| 2017/0132792 | A1 | 5/2017 | Jerebko et al. |
| 2017/0185668 | A1 | 6/2017 | Convertino et al. |
| 2017/0193688 | A1 | 7/2017 | Djorgovski et al. |
| 2017/0249401 | A1 | 8/2017 | Eckart et al. |
| 2018/0000371 | A1 | 1/2018 | Gupta et al. |

FOREIGN PATENT DOCUMENTS

| | | |
|---|---|---|
| WO | 2014193418 A1 | 12/2014 |
| WO | 2017054004 A1 | 3/2017 |
| WO | 2017054004 A8 | 3/2017 |

OTHER PUBLICATIONS

International Search Report and Written Opinion for International Application No. PCT/US2016/053842, Search completed Jan. 11,2017, dated Jan. 11, 2017, 12 Pgs.

"3D Visualization Perspective for PDI 4—Pentaho Data Mining—Pentaho Wiki", printed from http://wiki.pentaho.com/display/DATAMINING/3D+Visualization+Perspective+for+PDI+4 on May 25, 2016, 5 pgs.

"Amra46p", printed from http://i.imgur.com/aMRA46p.png on May 19, 2016, 1 pg.

"CastAR Wand", printed from https://s3.amazonaws.com/ksr/assets/001/081/488/765f86d82ae5f37a5d4d0a27dad4534b_large.jpg?1381537591 on May 19, 2016, 1 pg.

"InterSense, Precision Motion Tracking Solutions, IS-900 System", printed from http://www.intersense.com/pages/20/14 on May 19, 2016, 2 pgs.

"Magic Wand—Programmable TV Remote", printed from http://www.thinkgeek.com/product/cf9b/ on May 19, 2016, 4 pgs.

"PPT Wand—EST, Engineering Systems Technologies GmbH & Co. KG", printed from http://www.est-kl.com/es/products/motion-tracking/worldviz/ppt-wand.html on May 19, 2016, 4 pgs.

"Steal this idea: VR Wand", printed from https://forums.oculus.com/community/discussion/1620/steal-this-idea-vr-wand on May 19, 2016, 21 pgs.

"Virtual Reality: Input devices. Technologies for the direct interaction", Curs 2012/2013, 86 pgs.

"Virtual Reality: Interface Devices", printed from http://archive.ncsa.illinois.edu/Cyberia/VETopLevels/VR.Interface.html on May 19, 2016, 3 pgs.

"VR Wand/Stylus Concept", printed from https://www.reddit.com/r/oculus/comments/22mzis/vr_wandstylus_concept/ on May 19, 2016, 4 pgs.

Alger, Mike, "Visual Design Methods for Virtual Reality", Sep. 2015, 98 pgs.

Brath, Richard, "3D InfoVis is Here to Stay: Deal with It", IEEE VIS International Workshop on 3DVis, Nov. 9, 2014, 7 pgs.

Cabral, Marcio C. et al., "On the usability of gesture interfaces in virtual reality environments", CLIHC '05 Proceedings of the 2005 Latin American conference on Human-computer interaction, Oct. 23-26, 2005, 10 pgs.

Chandler, Tom et al., "Immersive Analytics", IEEE, Sep. 22-25, 2015, 8 pgs.

Chen, Jim X., "Data Visualization and Virtual Reality", Handbook of Statistics, vol. 24, 2005, 25 pgs.

Cioc, Alex, "Immersing Yourself in Your Data: Using Virtual World Engines to Solve "Big" Data", printed from http://www.astrobetter.com/blog/2013/03/25/immersing-yourself-in-your-data/ on Jun. 25, 2016, Mar. 25, 2013, 6 pgs.

Cruz-Neira, Carolina et al., "Scientists in Wonderland: A Report on Visualization Applications in the CAVE Virtual Reality Environment", IEEE, Oct. 25-26, 1993, pp. 59-66.

De Haan, Gerwin et al., "Towards Intuitive Exploration Tools for Data Visualization in VR", VRST '02, Nov. 11-13, 2002, 8 pgs.

Djorgovski, S. G. et al., "Immersive Data Visualization", AstroInformatics 2012, Redmond, WA, Sep. 2011, 8 pgs.

Djorgovski, S. G. et al., "The MICA Experiment: Astrophysics in Virtual Worlds", SLACTIONS 2012 International Research Conference on Virtual Worlds, eds. L. Morgado, Y. Sivan, A.M. Maia, et al., 2012, pp. 49-57.

Donalek et al., "Immersive and Collaborative Data Visualization Using Virtual Reality Platforms", 2014 IEEE International Conference on Big Data, Oct. 27-30, 2014, pp. 609-614.

Etemadpour, Ronak et al., "Choosing Visualization Techniques for Multidimensional Data Projection Tasks: A Guideline with Examples", Computer Vision, Imaging and Computer Graphics Theory and Applications, vol. 598, Mar. 2015, 21 pgs.

Gardner, M. R. et al., "The Immersive Education Laboratory: understanding affordances, structuring experiences, and creating constructivist, collaborative processes, in mixed-reality smart environments", EAI Endorsed Transactions on Future Intelligent Educational Environments, Sep. 9, 2014, 13 pgs.

(56) References Cited

OTHER PUBLICATIONS

Heer, Jeffrey et al., "A Tour Through the Visualization Zoo", Communications of the ACM, vol. 53, No. 6, Jun. 2010, pp. 59-67.
Heer, Jeffrey et al., "Animated Transitions in Statistical Data Graphics", IEEE Transactions on Visualization and Computer Graphics, vol. 13, No. 3, Nov./Dec. 2007, pp. 1240-1247.
Hollerer, Tobias et al., "Exploring MARS: Developing Indoor and Outdoor User Interfaces to a Mobile Augmented Reality System", Computers & Graphics, vol. 23, Issue 6, Dec. 1999, pp. 779-785.
Jarocsh, Rafael et al., "Interactive exploration of immersive illuminated 3D scatterplots ProjINF", retrieved from https://www.informatik.uni-stuttgart.de/studium/interessierte/bsc-studiengaenge/informatik/projekt-inf/2015-06-26/Gruppe_6.pdf, Jun. 26, 2015, 6 pgs.
Khairi et al., "Visualizing Large, Heterogeneous Data in Hybrid-Reality Environments", IEEE Computer Graphics and Applications, Jul./Aug. 2013, pp. 38-48.
Luo, Xun, "PACE: A Framework for Personalized Visualization and Scalable Human Computer Interaction", Thesis of Xun Luo, 2008, 187 pgs.
Maddix, Karl, "Big Data VR Challenge—Winners!", printed from http://www.mastersofpie.com/big-data-vr-challenge-winners/ on Jun. 21, 2016, Jul. 21, 2015, 17 pgs.
Maddix, Karl, "Big Data VR Challenge Phase 1", printed from http://www.mastersofpie.com/big-data-vr-challenge/ on Jun. 21, 2016, Jun. 1, 2015, 10 pgs.
Maddix, Karl, "Big Data VR Challenge Phase 2 Update", printed from http://www.mastersofpie.com/big-data-vr-challenge-phase-2-update/ on Jun. 21, 2016, Jun. 26, 2015, 14 pgs.
Marr, Bernard, "How VR Will Revolutionize Big Data Visualizations", retrieved from: http://www.forbes.com/sites/bernardmarr/2016/05/04/how-vr-will-revolutionize-big-data-visualizations/print/ on Jun. 20, 2016, May 4, 2016, 4 pgs.
Milgram, Paul et al., "A Taxonomy of Mixed Reality Visual Displays", retrieved from http://vered.rose.utoronto.ca/people/paul_dir/IEICE94/ieice.html on on Oct. 16, 2003, IEICE Trans. on Info. Syst., vol. E77-D, No. 12, Dec. 12, 1994, 15 pgs.
Moran, Andrew et al., "Improving Big Data Visual Analytics with Interactive Virtual Reality", retrieved from arXiv:1506.08754v2 [cs.HC], Oct. 6, 2015, 6 pgs.
Nagel, Henrik R. et al., "Methods for Visual Mining of Data in Virtual Reality", In Proceedings of the International Workshop on Visual Data Mining, in conjunction with ECML/PKDD2001, 2nd European Conference on Machine Learning and 5th European Conference on Principles and Practice of Knowledge Discovery in Databases, Sep. 4, 2001, 15 pgs.
Raja, Dheva et al., "Exploring the Benefits of Immersion in Abstract Information Visualization", Virginia Tech, Department of Computer Science, 2004, 7 pgs.
St. John, Mark et al., "The Use of 2D and 3D Displays for Shape-Understanding versus Relative-Position Tasks", Human Factors: The Journal of the Human Factors and Ergonomics Society, vol. 43, Issue 1, Mar. 1, 2001, pp. 79-98.
Takahashi, Dean, "astAR will return $1Min Kickstarter money and postpone augmented reality glass shipments", printed from http://venturebeat.com/2015/12/16/castar-will-return-1m-in-kickstarter-money-and-postpone-augmented-reality-glasses-shipments/ on May 19, 2016, 7 pgs.
Takahasi, Dean, "CastAR shows how it will turn your tabletop into an animated gaming world", printed from http://venturebeat.com/2016/04/11/castars-latest-demos-show-how-it-plans-to-enable-tabletop-mixed-reality-games/ on May 19, 2016, 8 pgs.
Tanriverdi, Vildan et al., "VRID: A Design Model and Methodology for Developing Virtual Reality Interfaces", VRST'01, Nov. 15-17, 2001, 8 pgs.
The Uber Maker, "How To: Connect your Wiimote to your computer via Bluetooth", retrieved from http://www.instructables.com/id/How-To-Connect-your-Wiimote-to-your-PC-via-Blueto/ in 2016, 6 pgs.
Tollerud, Erik, "An Analysis of 3D Data Visualization in Numerical Models", 2006, 24 pgs.
White, Sean et al., "Visual Hints for Tangible Gestures in Augmented Reality", Proceedings of the Sixth IEEE and ACM International Symposium on Mixed and Augmented Reality, Nov. 13-16, 2007, pp. 47-50.
White Paper Intel Labs, "ScienceSim: A virtual environment for collaborative visualization and experimentation", Intel Labs, 2009, 5 pgs.
Wilhelm, Parker, "Microsoft HoloLens Bluetooth Clicker is our first glimpse at a possible controller", printed from http://www.techradar.com/us/news/wearables/microsoft-s-hololens-bluetooth-clicker-is-our-first-glimpse-at-any-controller-1315623 on Jun. 25, 2016, Feb. 23, 2016, 10 pgs.
Barczak, J., "Why Geometry Shaders Are Slow (Unless you're Intel)", The Burning Basis Vector, Omega WordPress, Mar. 18, 2015, 20 pgs.
Breiman, L., "Random Forests", University of California Berkeley, Statistics Department, Jan. 2001, 33 pgs.
Denise, L., "Tutorial: Processing Point Cloud Data with Unity", Sketchfab, Feb. 16, 2017, 41 pgs.
Elkan C., "Using the Triangle Inequality to Accelerate k-Means", Proceedings of the Twentieth International Conference on Machine Learning (ICML) 2003, Conference date: Aug. 21-24, 2003, Washington DC, 7 pgs.
Flick, J., "Catlike Coding, Unity C# Tutorials: Building a Graph, Visualizing Math", Retrieved from: https://catlikecoding.com/unity/tutorials/basics/building-a-graph/, 2017, 30 pgs.
Fraiss, S.M., et al., "Rendering Large Point Clouds in Unity", Technische Universitat Wien, Bachelor of Science, Medieninformatik and Visual Computing, Sep. 14, 2017, 54 pgs.
Jacomy, M., et al., "ForceAtlas2, a Continuous Graph Layout Algorithm for Handy Network Visualization Designed for Gephi Software", PLOS One, vol. 9, No. 6, Jun. 10, 2014, Retrieved from: ForceAtlas2, a Continuous Graph Layout Algorithm for Handy Network Visualization Designed for the Gephi Software, 12 pgs.
Knudsen, J.S., "Transparency and sorting in Unity", WordPress, Jul. 20, 2013, 9 pgs.
Mashor, M.Y., "Improving the Performance of K-Means Clustering Algorithm to Position the Centres of RBF Network", Cheney Shen Technology Blog, 2018, 17 pgs.
Shen, C., "DirectCompute tutorial for Unity 2: Kernels and thread groups", Cheney Shen Technology Blog, 2018, 17 pgs.
Shyu, M-L., et al., "A Novel Anomaly Detection Scheme Based on Principal Component Classifier", ICDM Foundation and New Direction of Data Mining Workshop, 2003, pp. 172-179.
Swalin, A., "CatBoost vs. Light GBM vs. XGBoost", Towards Data Science, Mar. 13, 2018, 11 pgs.
Tulloch, A., "Fast and Randomized SVD", facebook Research, Retrieved from: https://research.fb.com/fast-randomized-svd/, Sep. 22, 2014, 7 pgs.
Vanderplas, J., "In Depth: k-Means Clustering", Python Data Science Handbook, Excerpt Retrieved from: https://jakevdp.github.io/PythonDataScienceHandbook/05.11-k-means.html, 2017, 16 pgs.
Zucconi, A., "Arrays & Shaders in Unity 5.4+", WordPress, Oct. 24, 2016, 14 pgs.
Extended European Search Report for Application No. 16849900.2, Report dated Feb. 20, 2019, 7 pgs.
Accord.NET Framework, Retrieved from: https://web.archive.org/web/20180910115347/http://accord-framework.net/, Sep. 10, 2018, 12 pgs.
Extracts of ENVI User's Guide, ENVI EX, Retrieved from: http://www.harrisgeospatial.com/portals/0/pdfs/enviex/ENVI_EX_User_Guide.pdf, Dec. 2009, 275 pgs.
MIConvexHull, A.Net fast convex hull library for 2,3, and higher dimensions, GitHub Pages, 2018, 3 pgs.
Histograms and Binning, H20.ai, Retrieved from: https://web.archive.org/web/20180403144856/http://docs.h2o.ai/h2o/latest-stable/h2o-docs/data-science/gbm-faq/histograms_and_binning_html, Apr. 3, 2018, 3 pgs.
International Search Report and Written Opinion for International Application No. PCT/US2018/051394, Search completed Dec. 3, 2018, dated Dec. 13, 2018, 14 Pgs.

(56) References Cited

OTHER PUBLICATIONS

Case Study: Ecommerce Website, YouTube, Retrieved from: https://www.youtube.com/watch?v=iYAKcXJ9Ask, Published May 19, 2017, 1 pg.
Documentation for BestHTTP, May 2018, 46 pgs.
Fintech Innovation Lab NY Presents: Virtualitics, YouTube, Retrieved from: https://www.youtube.com/watch?v=giQj07HI0SM, Published Aug. 3, 2018, 1 pg.
International Preliminary Report on Patentability for International Application PCT/US2016/053842, Report issued Mar. 27, 2018, dated Apr. 5, 2018, 10 Pgs.
How to draw a covariance error ellipse, Computer vision for dummies, 2014, 50 pgs.
Machine learning for C#.Net, GitHub, Inc., Retrieved from: https://web.archive.org/web/20180509150200/https://github.com/mdabros/SharpLearning, May 9, 2018, 3 pgs.
OriginLab, OriginLab Corporation, Accessed 2018, 3 pgs.
Math.NET Numerics for .NET and Mono, Retrieved from: https://web.archive.org/web/20091211190916/https://numerics.mathdotnet.com/, Dec. 11, 2009, 3 pgs.
Scikit-learn, scikit-learn, Retrieved from: https://web.archive.org/web/20180506040737/http://scikit-learn.org/stable/, May 6, 2018, 3 pgs.
OpenWERX Data Science Hackathon—Bounty Hunter—FIRST PLACE!, YouTube, Retrieved from; https://www.youtube.com/watch?v=5O2KXVEcMIA, Published May 13, 2017, 1 pg.
Virtualities—Immerse yourself in your data!, VirtualiticsVR, YourTube, Retrieved from: https://www.youtube.com/watch?v=YkoTfENJxL4, Published Feb. 12, 2018, 1 pgs.
Scikit-learn user guide, Release 0.20.0, scikit-learn developers, Sep. 27, 2018, 2373 pgs.
Math.NET Numerics, Wikipedia, Retrieved from: https://en.wikipedia.org/wiki/Math.NET_Numerics, Last Modified Nov. 2, 2017, 2 pgs.
Model Random Forest for classification, implementation on c#, Developers Club, greek daily blog, Retrieved from: http://developers-club.com/posts/215453/, Mar. 2014, 35 pgs.
Framework modules, Accord.NET Framework, Retrieved from: http://accord-framework.net/docs/html/R_Project_Accord_NET.htm, Apr. 27, 2017, 17 pgs.
PrincipleComponentAnalysis Class, Accord.NET Framework, Retrieved from: https://web.archive.org/web/20180327041531/http://accord-framework.net/docs/html T_Accord_Statistics_Analysis_PrincipalComponentAnalysis.htm, Mar. 27, 2018, 11 pgs.
Introduction, The Accord.NET Image Processing and Machine Learning Framework, .NET Framework, Retrieved from: https://web.archive.org/web/20180423094320/http://accord-framework.net/intro.html, Apr. 23, 2018, 5 pgs.
Unity User Manual (2018.2), Unity Technologies, 2018, 5 pgs.
Math.NET Numerics, Retrieved from: https://web.archive.org/web/20150217042219/http://numerics.mathdotnet.com:80/, Feb. 17, 2015, 7 pgs.

\* cited by examiner

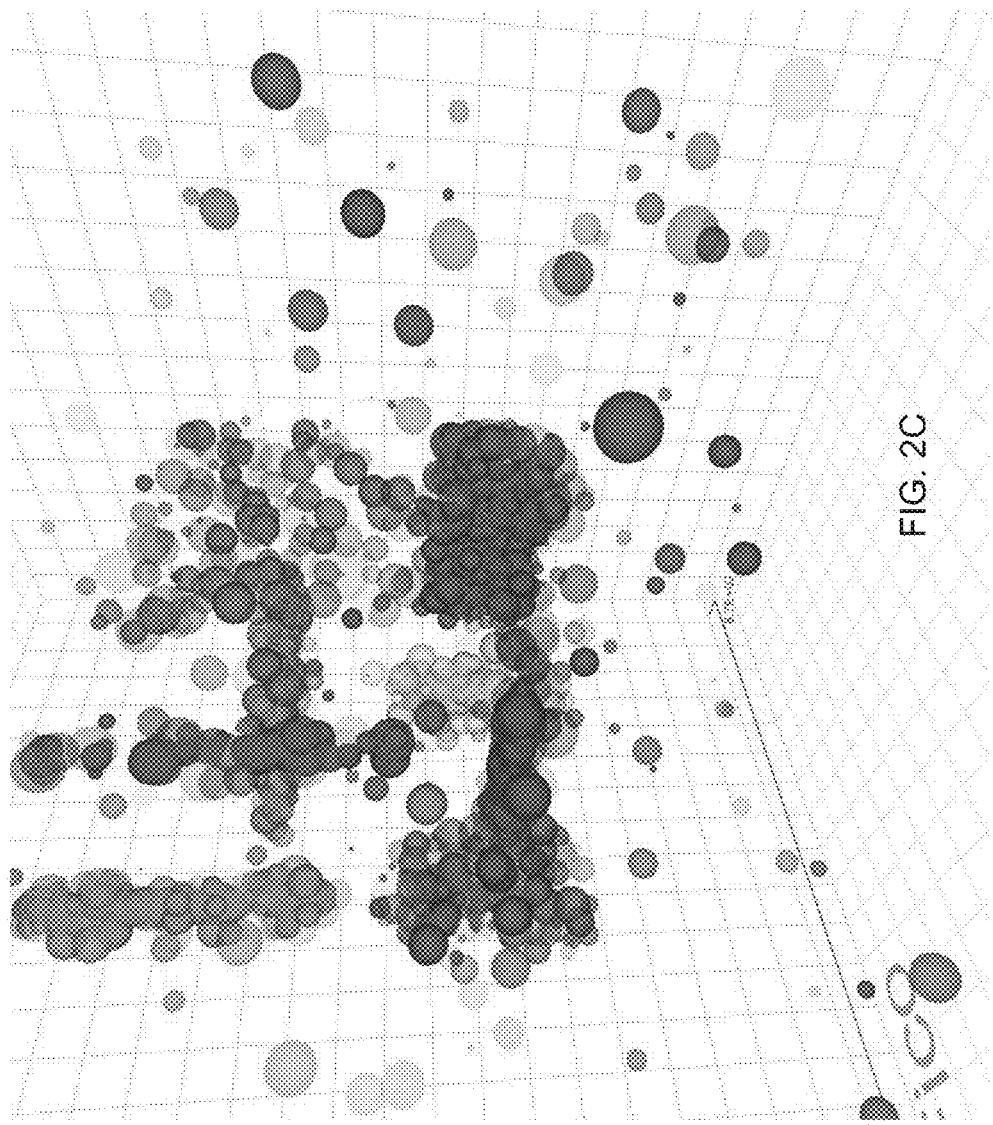

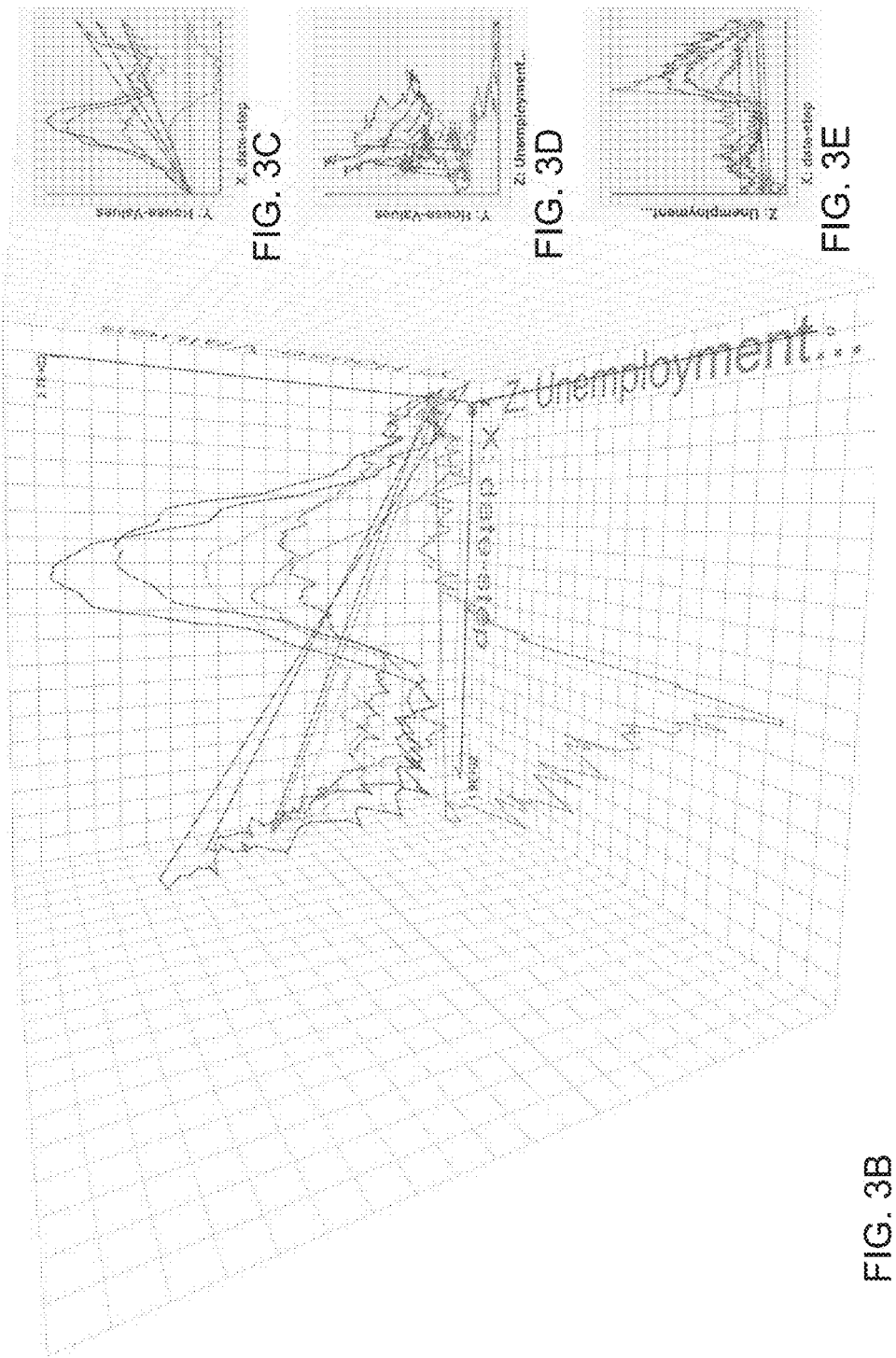

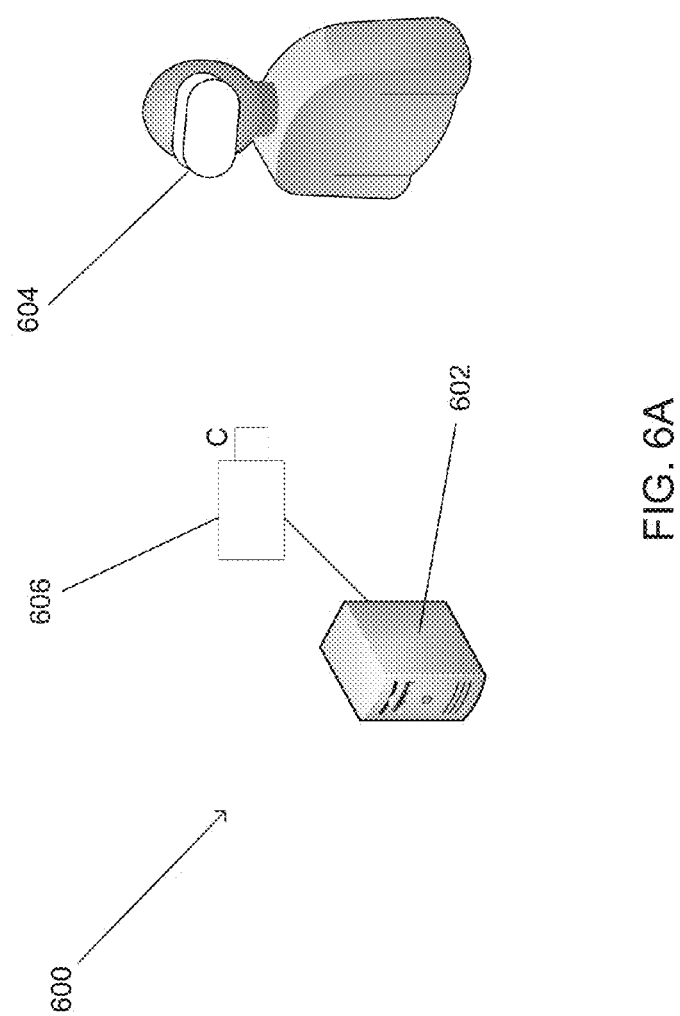

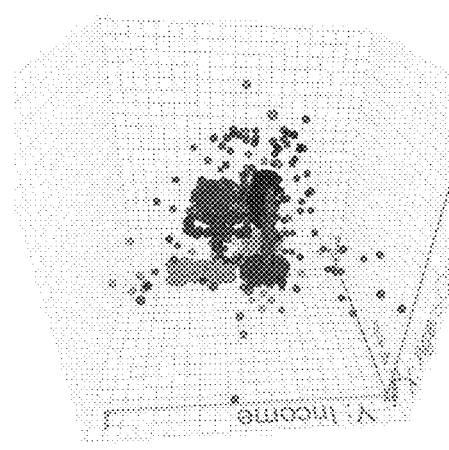
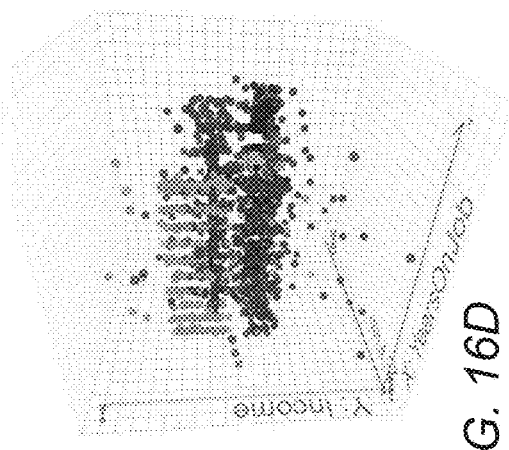
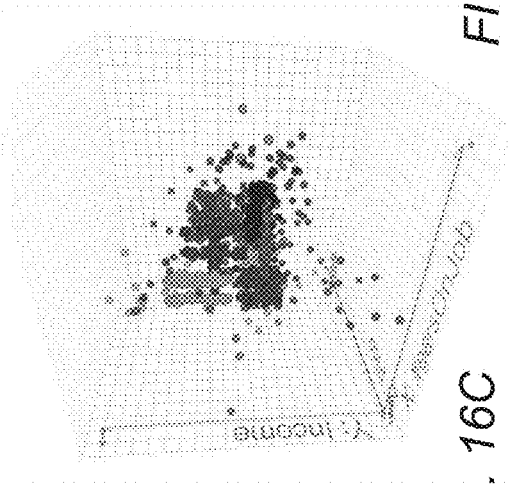
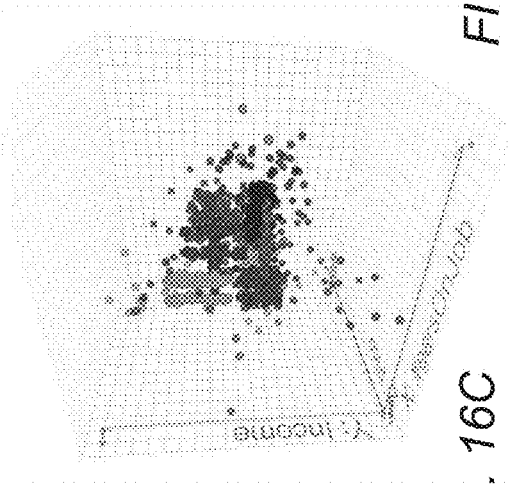
FIG. 16A
FIG. 16B
FIG. 16C
FIG. 16D

SYSTEMS AND METHODS FOR DATA VISUALIZATION USING THREE-DIMENSIONAL DISPLAYS

CROSS-REFERENCE TO RELATED APPLICATIONS

The current application is a continuation of U.S. patent application Ser. No. 15/276,742 entitled "Systems and Methods for Data Visualization Using Three-Dimensional Displays" to Djorgovski et al., filed Sep. 26, 2016, which claims priority under 35 U.S.C. § 119(e) to U.S. Provisional Patent Application Ser. No. 62/232,119 entitled "Novel Method for a Visual Exploration of High-Dimensionally Data Sets Using Virtual Reality" to Djorgovski et al., filed Sep. 24, 2015 and U.S. Provisional Patent Application Ser. No. 62/365,837 entitled "Systems and Methods for Data Visualization Using Three-Dimensional Displays" to Djorgovski et al., filed Jul. 22, 2016, the disclosures of which are incorporated by reference herein in their entirety.

STATEMENT OF FEDERAL SUPPORT

This invention was made with government support under Grant No. HCC0917814 awarded by the National Science Foundation. The government has certain rights in the invention. The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention relates generally to data visualization and more specifically to the visualization of complex, multidimensional data using three-dimensional display technologies including (but not limited to) virtual reality (VR), mixed reality (MR), and augmented reality (AR) displays.

BACKGROUND

Data visualization commonly refers to techniques utilized to communicate data or information by encoding it as visual objects that can be displayed via a computer. Visualization is an essential component of any data analysis and/or data mining process. In many instances, a graphical representation of the geometry and topology of a data distribution can enable selection of appropriate analysis tools revealing further insights, and the interpretation of the results. In the era of "big data", the key bottleneck in the extraction of actionable knowledge from high dimensionality data sets is often a user's (in)ability to visualize patterns in more than 3 dimensions.

Computer displays typically display information in two dimensions (2D). However, a variety of three-dimensional (3D) display technologies are emerging that simulate depth through a number of different visual effects including stereoscopy in which images rendered from different viewpoints are displayed separately to the left and right eye. The two images are then combined in the brain to give the perception of 3D depth. A number of head mounted 3D display technologies are currently available. Paul Milgram and Fumio Kishino, in a paper entitled "A Taxonomy of Mixed Reality Visual Displays" published in IEICE Transactions on Information Systems, Vol. E77-D, No. 12 in December 1994 (the disclosure of which is incorporated by reference herein in its entirety) proposed the concept of a "virtuality continuum" that relates to the mixture of classes of objects presented in any particular display situation, where real environments constitute one end of the continuum, and virtual environments constitute the opposite end of the continuum. In their paper, Milgram and Kishino explain the difference between virtual reality and mixed reality as follows:

"The conventionally held view of a Virtual Reality (VR) environment is one in which the participant-observer is totally immersed in, and able to interact with, a completely synthetic world. Such a world may mimic the properties of some real-world environments, either existing or fictional; however, it can also exceed the bounds of physical reality by creating a world in which the physical laws ordinarily governing space, time, mechanics, material properties, etc. no longer hold. What may be overlooked in this view, however, is that the VR label is also frequently used in association with a variety of other environments, to which total immersion and complete synthesis do not necessarily pertain, but which fall somewhere along a virtuality continuum. In this paper we focus on a particular subclass of VR related technologies that involve the merging of real and virtual worlds, which we refer to generically as Mixed Reality (MR)."

(Milgram, Paul, and Fumio Kishino. "A taxonomy of mixed reality visual displays." IEICE TRANSACTIONS on Information and Systems 77.12 (1994), p. 1321).

Within the realm of mixed reality, a further distinction can be drawn between Augmented Reality (AR), and Mixed Reality (MR). Both AR and MR displays can be implemented using transparent display technology and/or by capturing images of a scene and using the captured images to render displays combining the real world scene and the virtual objects. The term AR is typically used to describe 3D display technologies that display virtual objects that provide contextually relevant information to a real world scene. AR is often used to refer to an experience in which real world objects are augmented or supplemented by computer-generated sensory input. MR, sometimes referred to as hybrid reality, typically involves the merging of real and virtual worlds to produce new environments and visualizations where real and virtual objects co-exist and interact in real time.

AR, MR, and VR displays can all have a similar goal of immersing a user in an environment that is either partially or entirely virtual. With AR and MR, users continue to be in touch with the real world while interacting with virtual objects around them. With VR, the user is isolated from the real world while immersed in a world that is completely synthesized (although may include virtual analogues to real world objects).

SUMMARY OF THE INVENTION

Humans have a remarkable pattern recognition system and can acquire more information through vision than all the other senses combined. Visualization provides an ability to understand large amounts of data by mapping abstract information to more easily understandable visual elements. Systems and methods in accordance with various embodiments of the invention create 3D data visualizations that increase a viewer's ability to explore an even higher dimensionality in data and observe complex patterns within the data. Humans are biologically optimized to see the world and the patterns in it in three dimensions. Therefore, presentation of data via a 3D display as a multidimensional (i.e., with the number of displayed data dimensions of 3 or greater) data visualization enables identification of meaningful structures in data (e.g., clusters, correlations, outliers) that may contain an actionable knowledge and that often reside in higher dimensional spaces and which are not readily observable through visualization of data via conventional 2D display technologies. Furthermore, immersive AR, MR, and VR environments naturally support collaborative data visualization and exploration, and are conducive to scientists interacting with their data along side of their colleagues in shared virtual spaces.

In discussing data visualization, a distinction must be made between the dimensionality of the graphical display device, (e.g., a printed paper or a flat screen being typical 2D devices, while VR/AR headsets represent typical 3D display devices) and the dimensionality of the data, which can be though of as the number of features/quantities/parameters associated with each data item (e.g. a row in a spreadsheet could be a single data item, and the number of columns would be its dimensionality). By way of further illustration, a data set with 3 column entries would be 3-dimensional, a data set with 20 columns would be 20-dimensional. Either dataset can be represented on a 3D display device. An additional distinction is the dimensionality of the data space within which the data are being rendered or visualized. Up to 3 dimensions (axes) of such a data visualization space can be spatial; additional dimensions may be encoded through the colors, transparencies, shapes and sizes of the data points. In this way, more than three data dimensions can be visualized in a multidimensional data space via a 3D display device. If a data set has N dimensions, a subset of k of them may be visualized at any given time, with k≤N. If k>3, up to 3 dimensions can be encoded as spatial positions (XYZ) in a data visualization space, with the remainder being represented through characteristics of the data points such as colors, sizes, and shapes. In a scatter plot each data item (data point) is represented as an individual geometrical object, e.g., a dot, a square, a sphere, etc., with some spatial coordinates (XYZ), and other visible properties (e.g., colors, sizes, etc.) encoding the additional data dimensions. The challenge is in maximizing the number of simultaneously visualized data dimensions k that can be readily understood by a human.

In a number of embodiments, three-dimensional data visualization systems can provide data visualizations in a variety of display contexts. In certain embodiments, multidimensional data is rendered in a 3D data visualization space that can be viewed, navigated, and manipulated using a traditional 2D display device (e.g., a flat screen). In many embodiments, an optimized rendering of up to 10 or more data dimensions is used to generate a 3D data visualization of the multidimensional data space. In several embodiments, the three-dimensional data visualization systems can provide an enhanced intuitive comprehension of the multidimensional data space, when displayed using a 3D display device (e.g., a VR/AR headset). Immersion in the multidimensional data space using an immersive 3D display can enhance the human ability to understand the geometry and the relationships (clusters, correlations, outliers, anomalies, gaps, etc.) that may be present in the data as compared to a traditional data visualization methodology involving the use of a 2D display.

One embodiment of the invention includes: a display device; and a computing system, including memory containing a 3D data visualization application and a processing system. In addition, the 3D data visualization application directs the processing system to: load a set of data points into a visualization table in the memory, where each data point includes values in multiple data dimensions and an additional visibility value is assigned to each data point in a visibility dimension within the visualization table; create representations of a set of 3D objects corresponding to the set of data points, where each 3D object has a set of visualization attributes that determine the manner in which the 3D object is rendered and the visualization attributes include a location of the 3D object within a virtual space having three spatial dimensions; receive mappings of data dimensions to visualization attributes; determine the visualization attributes of the set of 3D objects based upon the selected mappings of data dimensions to 3D object attributes, where the selected mappings of data dimensions to visualization attributes determine a location for each visible 3D object within the virtual space; update the visibility dimension in the visualization table for each of the plurality of 3D object to reflect the visibility of each 3D object based upon the selected mappings of data dimensions to visualization attributes; and interactively render 3D data visualizations of the 3D objects within the virtual space from viewpoints determined based upon received user input.

In a further embodiment, the display device is a 3D display device, and interactively rendering 3D data visualizations of the 3D objects within the virtual space from viewpoints determined based upon received user input comprises rendering stereo images displayed via the 3D display device.

In another embodiment, the 3D data visualization application is implemented using a 3D rendering engine.

In a still further embodiment, the implementation of the 3D data visualization application further relies upon scripts that execute via the 3D rendering engine.

In still another embodiment, the visualization attributes include at least one attribute selected from the group of: X Coordinate, Y Coordinate, Z Coordinate, Shape, Size, Color Palette, Color Map, Color Scale, Transparency. ID, URL, Mask, Show By, Motion of the 3D Object, Sonification, Haptic Feedback, and Vibrotactile Feedback.

In a yet further embodiment receiving mappings of data dimensions to visualization attributes further includes receiving user selections of mappings of data dimensions to visualization attributes.

In yet another embodiment, receiving mappings of data dimensions to visualization attributes further includes retrieving a stored set of mappings of data dimensions to visualization attributes.

In a further embodiment again, interactively rendering 3D data visualizations of the 3D objects within the virtual space from viewpoints determined based upon received user input further includes: generating at least one 3D object based upon the visualization attributes of a plurality of visible 3D objects; and interactively rendering 3D data visualizations of the at least one group 3D object within the virtual space from viewpoints determined based upon received user input.

In another embodiment again, interactively rendering 3D data visualizations of the 3D objects within the virtual space from viewpoints determined based upon received user input further includes: modifying 3D objects forming part of a virtual environment within the virtual space in response to the user input so that the 3D objects corresponding to the set of data points remain stationary within the virtual space and appear to change relative to the virtual environment in the 3D data visualization due to the modification to the 3D objects forming part of the virtual environment; and rendering the visible 3D objects corresponding to the set of data points and the 3D objects forming part of the virtual environment.

In a further additional embodiment, modifying 3D objects forming part of a virtual environment within the virtual space in response to the user input comprises at least one modification selected from the group including: modifying the size of the 3D objects forming part of the virtual environment in response to a user instruction to resize the 3D objects corresponding to the set of data points to create the impression that the 3D objects corresponding to the set of data points are changing in size relative to the virtual environment; moving the positions of the 3D objects forming part of the virtual environment in response to a user instruction to move the 3D objects corresponding to the set of data points to create the impression that the 3D objects corresponding to the set of data points are moving relative to the virtual environment; and moving the positions of the 3D objects forming part of the virtual environment in response a user instruction to rotate the 3D objects corresponding to the set of data points to create the impression that the 3D objects corresponding to the set of data points are rotating relative to the virtual environment.

In a still yet further embodiment, interactively rendering 3D data visualizations of the 3D objects within the virtual space from viewpoints determined based upon received user input includes: illuminating at least some of the 3D objects, where each illuminated 3D object is illuminated using a directional illumination source originating at a user viewpoint; and rendering at least the illuminated 3D objects based upon the user viewpoint.

In still yet another embodiment, illuminating at least some of the 3D objects further includes: determining a field of view; illuminating 3D objects within the field of view of the user using a directional illumination source originating at the user viewpoint; and rendering the illuminated 3D objects within the field of view of the user.

In a still further embodiment again, interactively rendering 3D data visualizations of the 3D objects within the virtual space from viewpoints determined based upon received user input includes: rotating at least some of the 3D objects based upon a user viewpoint, so that the appearance of the rotated 3D objects is invariant with user viewpoint; and rendering the rotated 3D objects based upon the user viewpoint.

In still another embodiment again, interactively rendering 3D data visualizations of the 3D objects within the virtual space from viewpoints determined based upon received user input includes: determining a location within the virtual space of at least one interaction primitive based upon a user viewpoint; and rendering the at least one interaction primitive based upon the user viewpoint.

A still further additional embodiment also includes determining a transparency of at least one interaction primitive based upon the user viewpoint.

In still another additional embodiment, the 3D objects include 3D objects having depth perception preserving shapes.

In a yet further embodiment again, the depth perception preserving shapes are characterized by a first dimension that is invariant and second dimension that is a visualization attribute that varies based upon a mapped data dimension.

In yet another embodiment again, at least one of the depth perception preserving shapes is pill shaped.

In a further additional embodiment again, receiving mappings of data dimensions to visualization attributes includes: receiving a selection of a target feature; determining the importance of at least a subset of multiple data dimensions to the target feature; and generating mappings of data dimensions having high importance to specific visualization attributes.

In another additional embodiment again, determining the importance of at least a subset of multiple data dimensions to the target feature further includes: identifying data dimensions that are numerical and data dimensions that are categorical; generating mappings of numerical data dimensions having high importance to a first set of visualization attributes; generating mappings of categorical data dimensions having high importance to a second set of visualization attributes.

In another further embodiment, the first set of visualization attributes comprises X, Y, Z position, and size.

In still another further embodiment, the second set of visualization attributes comprises shape.

In yet another further embodiment, the 3D data visualization application further directs the processing system to: receive at least one updated mapping of a data dimension to a visualization attribute; determine updated visualization attributes for the set of 3D objects based upon the selected mappings of data dimensions to 3D object attributes, where the updated mappings of data dimensions to visualization attributes determine a location for each visible 3D object within an updated virtual space; generate trajectories for the set of visible 3D objects from their locations in the virtual space to their updated locations in the virtual space; and interactively render animations of the movements of 3D objects along their generated trajectories from their locations in the virtual space to their locations in the updated virtual space from viewpoints determined based upon received user input.

In another further embodiment again, the 3D data visualization application further directs the processing system to determine updated visibility values for each of the plurality of 3D objects to reflect the visibility of each 3D object based upon the updated mapping.

In another further additional embodiment, interactively rendering animations of the movements of 3D objects along their generated trajectories further comprises varying the time at which different sets of 3D objects commence moving along their trajectories during a rendered animation.

In still yet another further embodiment, the time at which different sets of 3D objects commence moving along their trajectories during a rendered animation is determined based upon user input.

In still another further embodiment again, interactively rendering animations of the movements of 3D objects along their generated trajectories further includes varying the speed with which different sets of 3D objects move along their trajectories during a rendered animation.

In still another further additional embodiment, interactively rendering 3D data visualizations of the 3D objects within the virtual space from viewpoints determined based upon received user input includes: determining a location within the virtual space of at least one affordance, where user input directing movement of a 3D data visualization onto one of the at least one affordances initiates modification of the 3D data visualization; detecting movement of a 3D data visualization onto one of the at least one affordances; modifying the 3D data visualization based upon the one of the at least one affordances; and rendering the modified 3D data visualization based upon the user viewpoint.

In yet another further embodiment again, modifying the 3D data visualization based upon the one of the at least one affordances comprises resizing the 3D data visualization.

In yet another further additional embodiment, modifying the 3D data visualization based upon the one of the at least one affordances includes: applying a data analysis process to the set of data points in the visualization table corresponding to the 3D objects visualized within the 3D visualization; and modifying visualization attributes of the 3D objects visualized within the 3D visualization based upon at least one result of the data analysis process; and rendering a modified 3D data visualization including the modified visual attributes of the 3D objects based upon the user viewpoint.

In another further additional embodiment again, the data analysis process is a clustering process.

In still yet another further embodiment again, modifying the 3D data visualization based upon the one of the at least one affordances includes rendering a new 3D data visualization of a set of 3D objects represented by at least one selected 3D object in the 3D data visualization moved onto one of the at least one affordances.

Still yet another further additional embodiment, further includes: an input device having an elongated handle and an input button. In addition, the 3D data visualization application further directs the processing system to: obtain a pose input and a button state input from the wand; modify the 3D data visualization based upon the pose input and the button state input in a manner determined based upon a user interface context; and render the modified 3D data visualization based upon the user viewpoint.

In still another further additional embodiment again, modifying the 3D data visualization based upon the pose input and the button state input in a manner determined based upon a user interface context includes: determining a location for the 3D data visualization within the virtual world based upon the pose input and the button status input indicating that the button is not being pressed; and rotating the 3D data visualization within the virtual world based upon the pose input and the button status input indicating that the button is being pressed.

In a further embodiment, the memory further comprises avatar metadata including a set of visualization attributes that determine the manner in which an avatar is rendered and the visualization attributes include a location of the avatar within the virtual space, and interactively rendering 3D data visualizations of the 3D objects within the virtual space from viewpoints determined based upon received user input, and further rendering avatars within the 3D data visualization based upon the viewpoints and the avatar metadata.

In another embodiment, the avatar metadata further comprises pose information, and rendering avatars within the 3D data visualization based upon the viewpoints and the avatar metadata further comprises rendering the poses of avatars within the 3D data visualization based upon the pose information within the avatar metadata.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2D illustrate the different perspective a user can obtain by moving within a 3D visualizations of a multidimensional data space and the use of additional visualization attributes to visualize additional data dimensions in accordance with various embodiments of the invention.

FIGS. 3A-3E illustrate visualization of a 3D graph from multiple viewpoints in which data is visualized as 3D line plots in accordance with an embodiment of the invention.

FIGS. 6A and 6B conceptually illustrate systems for generating 3D visualizations of a multidimensional data space in accordance with various embodiments of the invention.

FIGS. 16A-16D is a sequence of 3D data visualizations in which the X attribute of the 3D data objects is modified from a first data dimension (i.e. "Age") to a second data dimension (i.e. "YearsOnJob") in accordance with an embodiment of the invention.

DETAILED DESCRIPTION

Figure 1A:
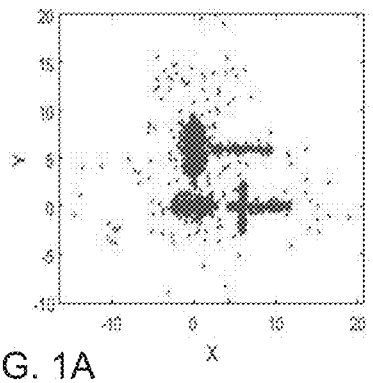
FIGS. 1A-1E illustrate a set of eight clusters laid out with their data centers at the corners of a virtual cube.
Figure 1B:
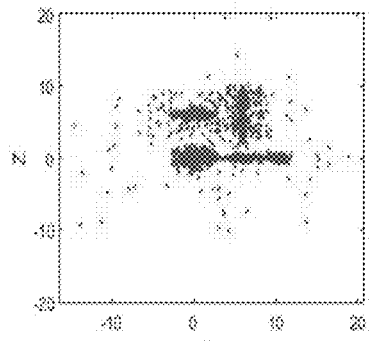
Figure 1C:
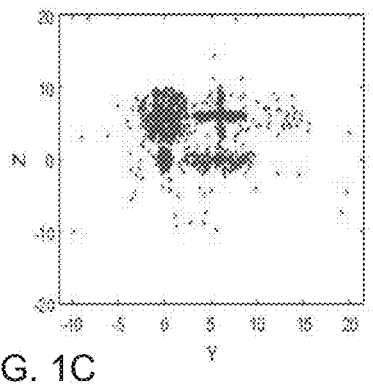

Data visualization systems that can visualize multidimensional data as 3D graphs (i.e. 3D data visualization systems) and methods of generating visualizations of multidimensional data spaces in accordance with a number of embodiments of the invention can utilize 3D display technologies to address many of the challenges of effective interactive visualization of high-dimensional data. The term here 3D graph is used in a general sense to reference any 3D object or group of 3D objects that collectively describe a set of data. A distinction can be drawn between the 3D object or objects that make up a 3D graph and other 3D objects, which may be utilized within a 3D visualization of multidimensional data to represent a virtual environment in which the 3D graph is contained. Current data visualization techniques, largely ask a user to perceive an environment that is displayed on a flat screen effectively by looking from the outside in. Systems and methods in accordance with several embodiments of the invention enable the visualization of more complex data spaces and can extend the human ability to interpret additional dimensions by utilizing 3D display technologies to place a user inside the visualization, and making the act of data visualization a first person experience. This approach can activate the human senses of proprioception (how people senses the relative position of their body parts) and kinesthesia (how people sense the extent of their own body in motion), which describe and explain the human body's experience within an external environment.

Presentation of highly dimensional data in a three-dimensional visualization is complex and can involve representation of structure within data using subtle variations in the characteristics of 3D objects such as size, shape, and/or texture. Movement and depth perception can confuse some of these visual cues and the confusion can be complicated in circumstances where the manner in which the 3D objects are rendered for 3D display introduces variations that are unrelated to the underlying data dimensions (e.g. shadows that may alter perceived color and/or size). 3D data visualization systems in accordance with many embodiments of the invention utilize techniques including (but not limited to) shape selection and illumination models that preserve similarity between similar 3D objects within the field of view of the user and enhance a user's ability to differentiate between variations in size due to variations in the size attribute of a 3D object and variations in size due to differences in distances to 3D objects. In a number of embodiments, a user's ability to perceive structure within data is further enhanced by utilizing animation to enable a user to observe modifications to the attributes of 3D objects corresponding to specific 3D data points as the 3D objects migrate from one 3D visualization of a multidimensional data space to a 3D visualization of a different multidimensional data space.

Usability of 3D data visualization systems in accordance with a number of embodiments of the invention is enhanced by providing affordances within a 3D user interface that a user can use to automatically modify the rendering of high dimensionality data in a 3D data visualization. In several embodiments, the user can simply drag the 3D visualization of a multidimensional data space over the affordance and a particular action is performed (e.g. resizing of the 3D data visualization, or k-means clustering of the data points). We emphasize that whereas the data are visualized as distinct objects (data points) in a 3D data visualization, more than three data dimensions are being rendered through the properties of the individual data points (e.g., colors, sizes, shapes, etc.).

As can readily be appreciated, the ability to visualize data within a multidimensional data space in 3D opens up a vast array of possibilities for the analysis of complex data, 3D data visualization systems in accordance with many embodiments of the invention enable data exploration to be performed in a collaborative manner. In several embodiments, multiple users who may or may not be in the same physical location can independently explore the same shared, virtual, multidimensional data space. In certain embodiments, a single user can lead a "broadcast" interactive session in which all users view the 3D data visualization space from the same viewpoint controlled by a lead user. Multidimensional data visualization systems and processes for exploring complex data using multidimensional data visualizations in accordance with various embodiments of the invention are discussed further below.

Three-Dimensional Data Visualizations

Figure 1D:
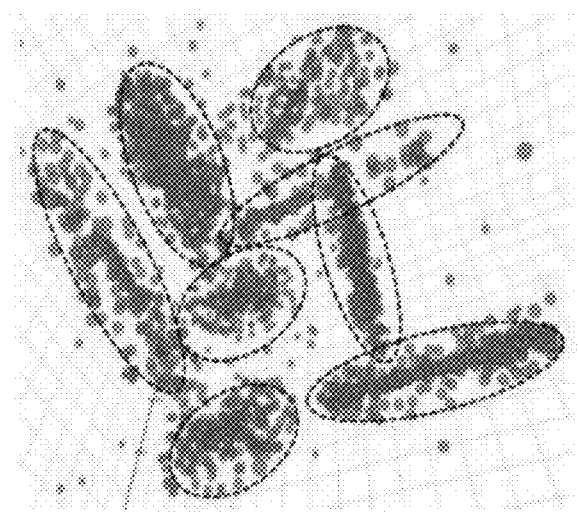
Figure 1E:
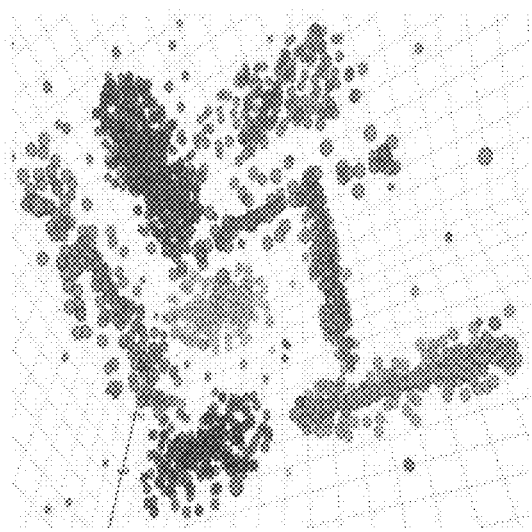

When dealing with complex data, two-dimensional mappings often fail to reveal inherent structures within data. FIGS. 1A-1E illustrate a set of eight clusters laid out with their data centers at the corners of a virtual cube. The simple 2D projections shown in FIGS. 1A-1C do not readily reveal all structures within the data. When the data is visualized within three spatial dimensions as shown in FIGS. 1D and 1E, cluster patterns are more readily discerned. 3D data visualization systems in accordance with many embodiments of the invention provide the user with an additional capability to directly interact with 3D cues from motion and parallax that enable a user to more clearly discern structures that may not be readily apparent depending upon the viewpoint from which a particular 3D visualization is rendered. Stated another way, the ability for the user to readily shift the viewpoint of a 3D data visualization in real time can reveal visual cues that cause the user to explore the data space from a different viewpoint that yields additional insights into the data. The ability to visually observe structure can be particularly useful in circumstances where machine learning algorithms trained to identify structures within data (e.g. k-means clustering) fail due to the presence of outliers that can be readily identified by a human user through visual inspection from one or more viewpoints.

Figure 2A:
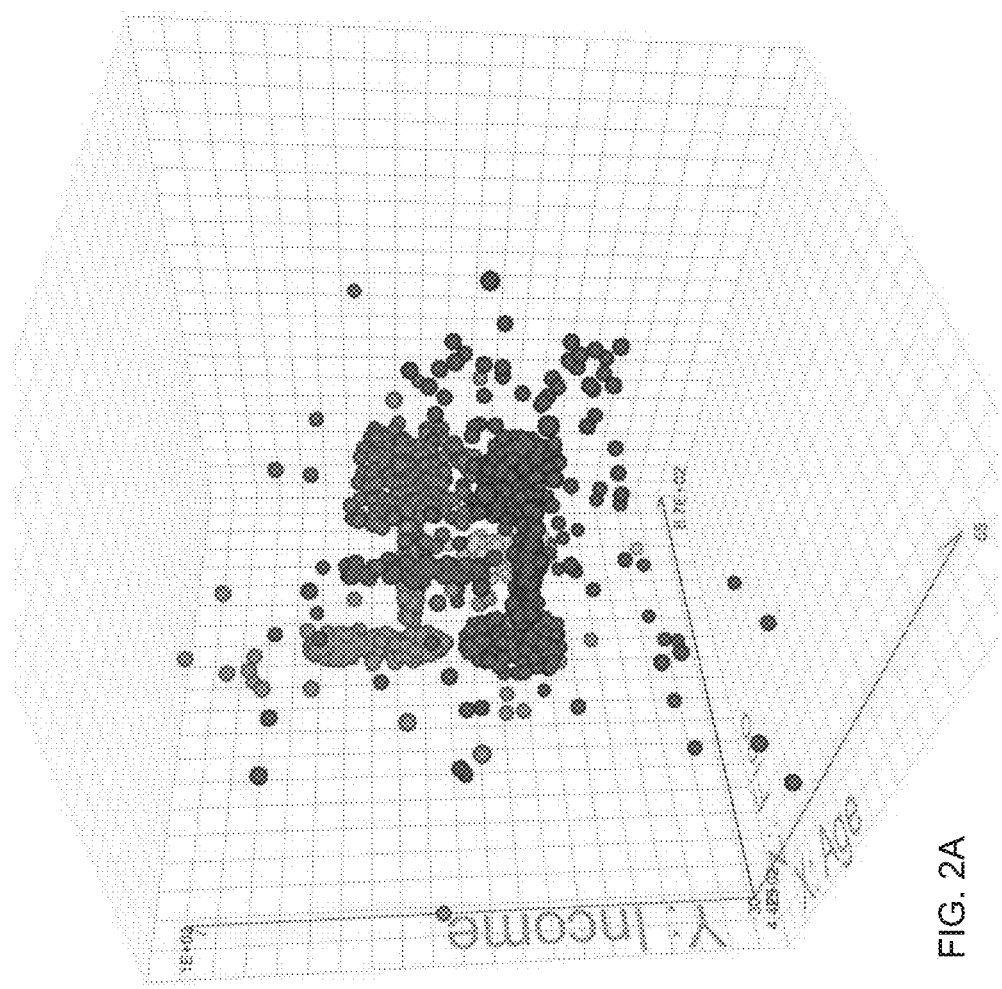
Figure 2B:
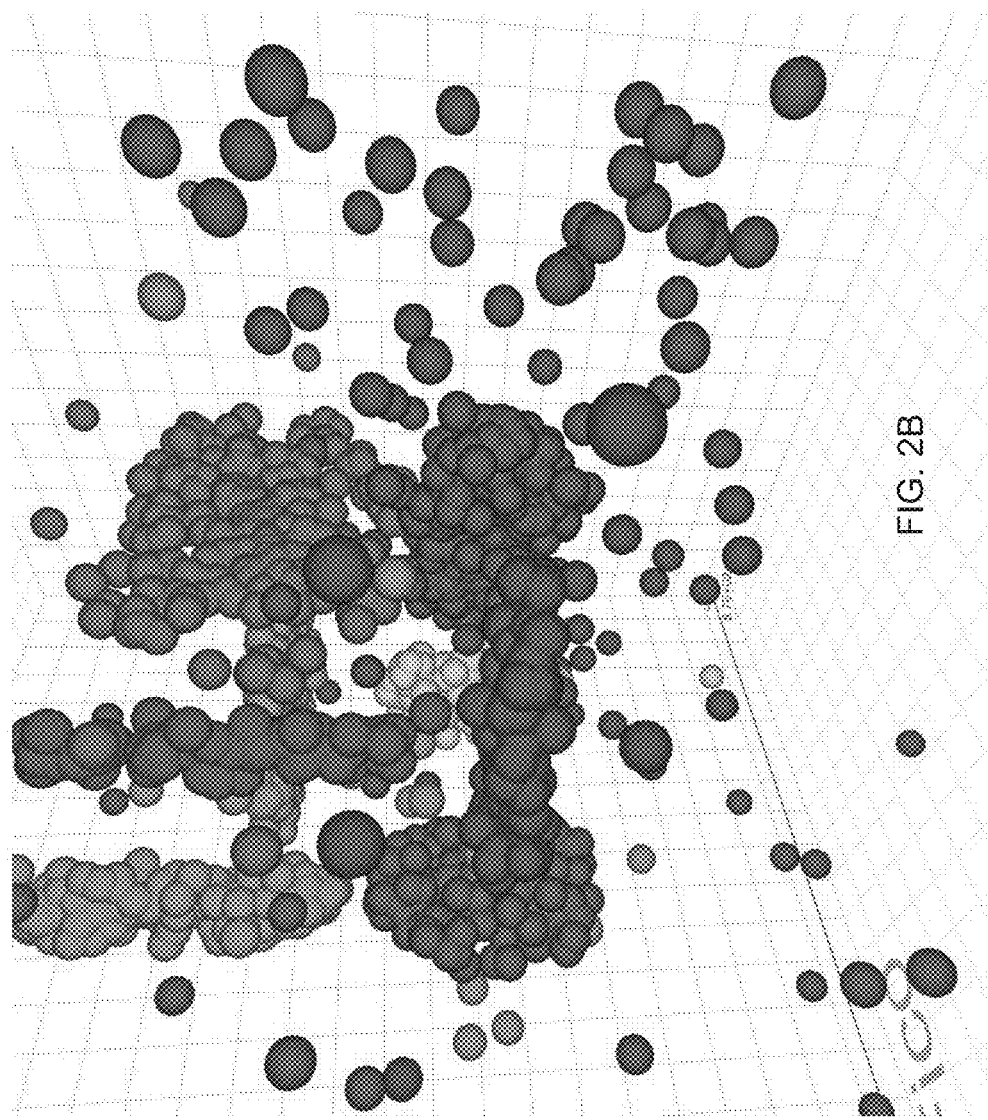
Figure 2D:
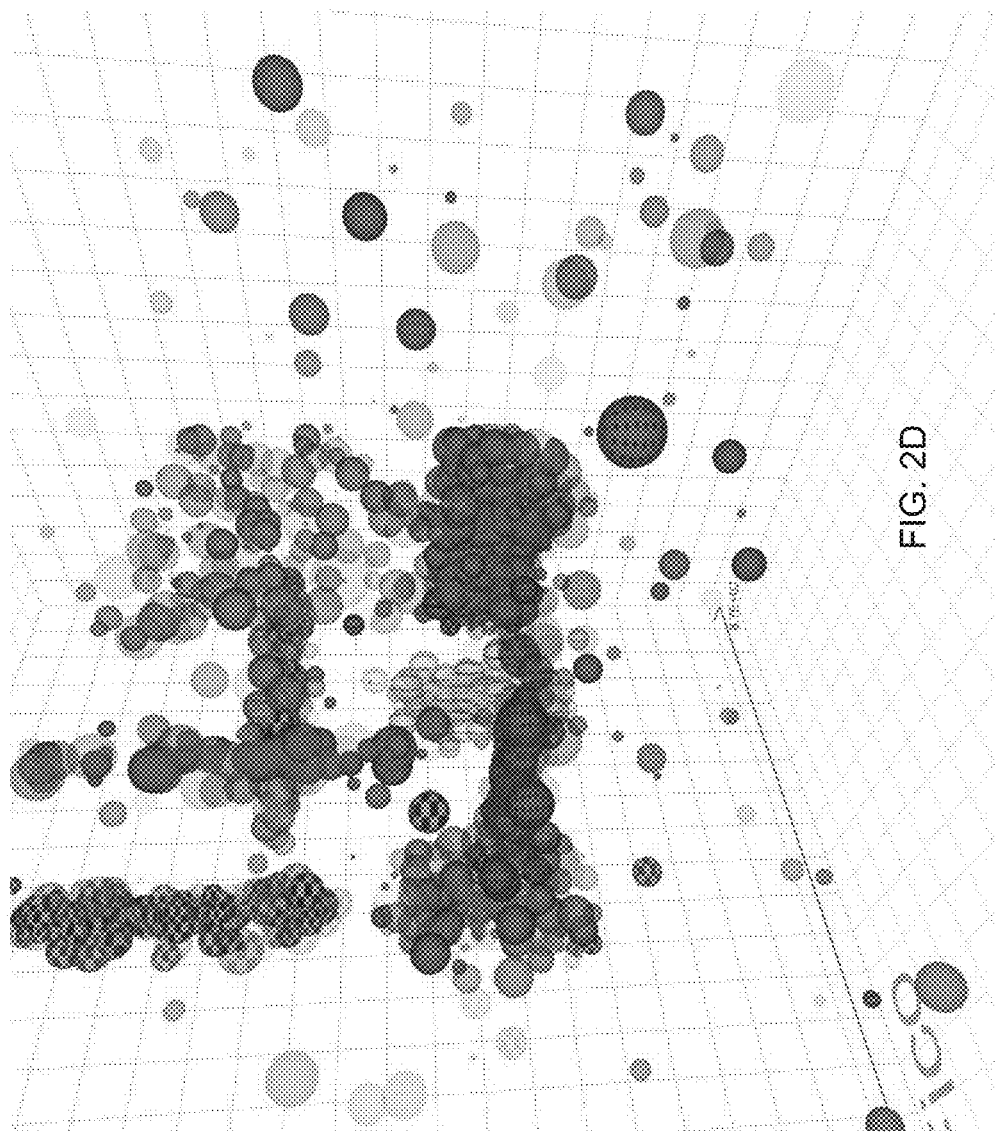

FIGS. 2A and 2B illustrate the different perspective a user can obtain by moving within a 3D visualizations of a multidimensional data space (as opposed to being constrained to look at data visualized in three spatial dimensions from outside the data space). As the viewpoint the user moves from the viewpoint shown in FIG. 2A toward data of interest and the viewpoint shown in FIG. 2B, structure within a particular subset of the data is visible in greater detail. As is discussed further below, 3D data visualization systems in accordance with various embodiments of the invention can support any of a number of different input modalities via which a user can provide instructions controlling the zoom, relative position and/or orientation of the 3D data visualization. The 3D data visualizations shown in FIGS. 2A and 2B are rendered by mapping data dimensions to characteristics of 3D objects that include the visibility of the 3D object (some data points may not be shown based upon filtering criterion), the location of the 3D object within a 3D data visualization, the size of the rendered 3D object, and/or the color of the 3D object. In certain embodiments, higher dimensionality visualizations again can be generated by using data dimension mappings to determine additional characteristics of the 3D objects including (but not limited to) the shape used to render the 3D object, the texture of the 3D object, and/or the transparency of the 3D object. FIG. 2C illustrates a 3D visualization of the data set shown in FIG. 2B using transparency to represent an additional data dimension. FIG. 2D illustrates a 3D visualization of the data set shown in FIG. 2B using both transparency and texture to represent additional data dimensions. The representation of additional data dimensions through choice of different 3D shapes, including the use of depth perception preserving shapes, in accordance with various embodiments of invention is discussed further below. In other embodiments, data dimensions can be mapped to non-visual aspects of an immersive experience including (but not limited to) motion, sonification, haptic feedback, and/or vibrotactile feedback.

An inherent limitation of illustrating 3D data visualizations on a 2D page is that the 3D data visualizations shown in FIGS. 2A-2D are two-dimensional projections of the underlying 3D data visualization. 3D data visualization systems in accordance with many embodiments of the invention provide interactive 3D visualizations that enable interaction and motion parallax, which are lost when 3D data is projected in the manner utilized to generate FIGS. 2A and 2D. Accordingly, a video sequence illustrating interactive data exploration of a 3D data visualization generated by a 3D data visualization system in accordance with an embodiment the invention is available at http://www.virtualitics.com/patent/Virtualitics1.mp4 and http://www.virtualitics.com/patent/Virtualitics2.mp4 and a 3D video sequence of the same interactive session is available http://www.virtualitics.com/patent/Virtualitics3.mp4. A comparison of the 2D and 3D video sequences provides a sense of the benefits of motion parallax in interpreting the structure of the data used to generate the 3D data visualization by the 3D data visualization system. The 2D and 3D video sequences found at http://www.virtualitics.com/patent/Virtualitics1.mp4, http://www.virtualitics.com/patent/Virtualitics2.mp4 and http://www.virtualitics.com/patent/Virtualitics3.mp4 are hereby incorporated by reference herein in their entirety.

Figure 3A:
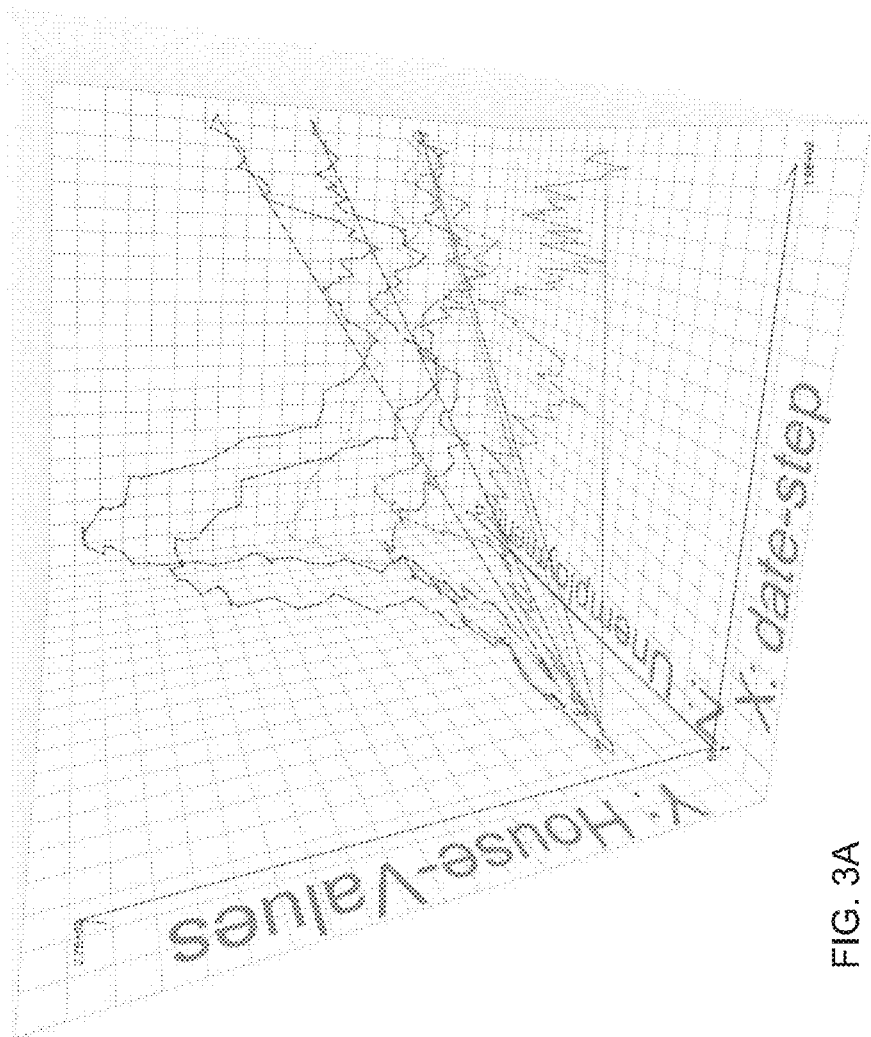
Figure 4A:
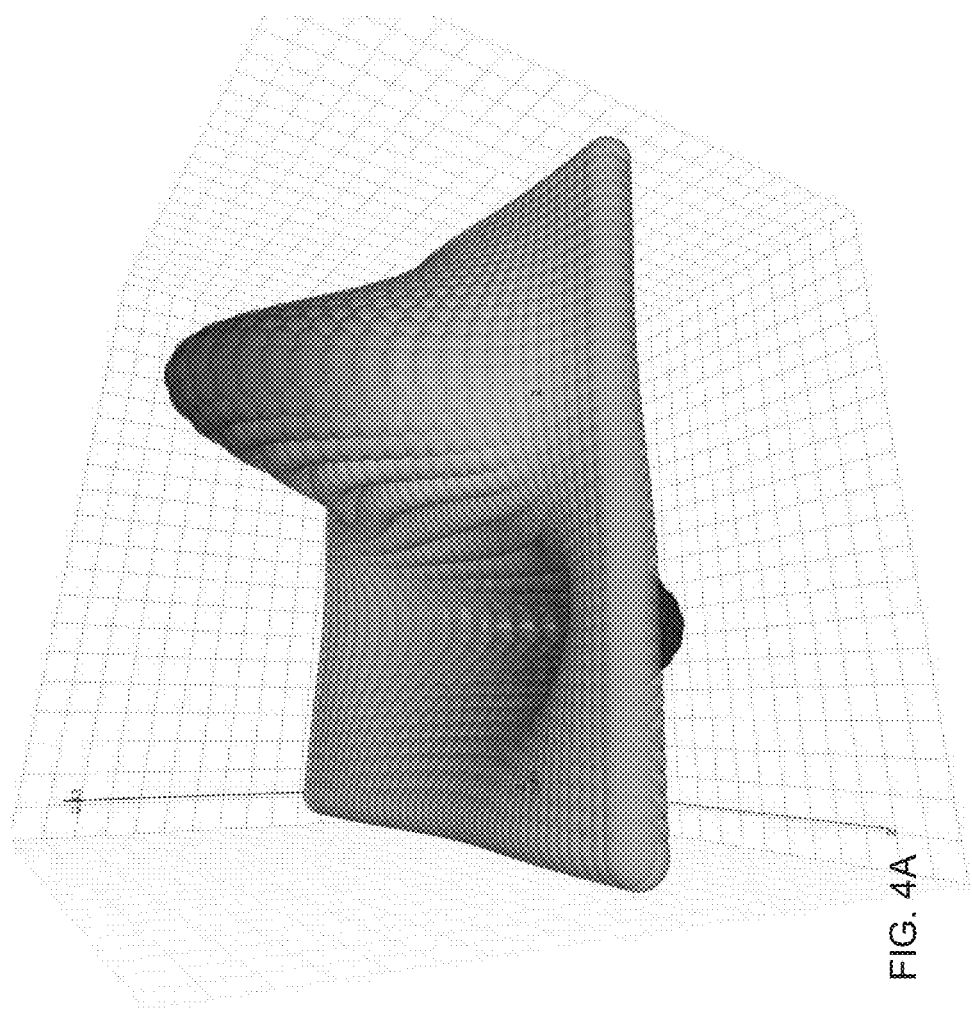
FIGS. 4A-4E illustrate visualization of a 3D graph from multiple viewpoints in which data is visualized as a 3D surface in accordance with an embodiment of the invention.
Figure 4C:
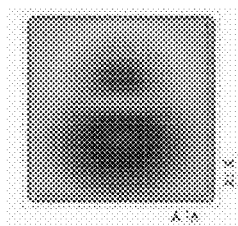
Figure 4D:
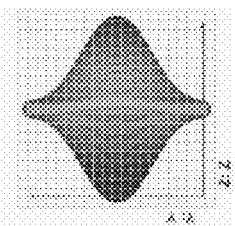
Figure 4E:
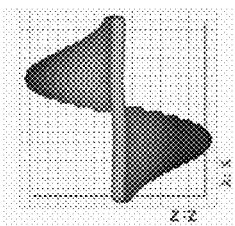
Figure 4B:
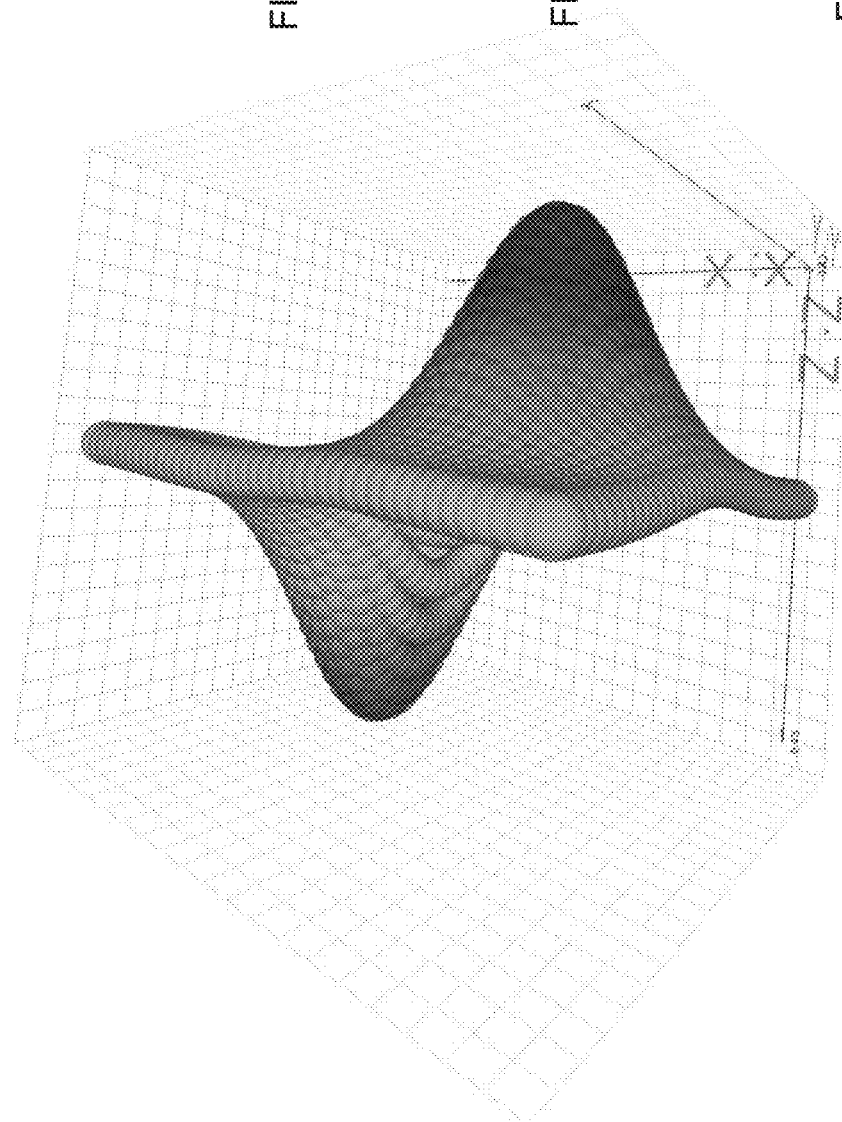

While much of the discussion that follows relates to generation of interactive multidimensional visualizations created by rendering 3D objects within a virtual space, systems and methods in accordance with many embodiments of the invention can be utilized to generate multidimensional data visualizations using a variety of different techniques for representing data. In several embodiments, 3D data visualizations can include 3D line plots (see, for example, FIGS. 3A and 3B) and/or 3D surfaces (see, for example, FIGS. 4A and 4B). FIGS. 3A and 3B illustrate visualization of a 3D graph from multiple viewpoints in which data is visualized as a series of 3D line plots. By way of comparison, two dimensional projections of the 3D line plots are shown in FIGS. 3C-3E. FIGS. 4A and 4B illustrate visualization of a 3D graph from multiple viewpoints in which data is visualized as a 3D surface. By way of comparison, two dimensional projections of the 3D surfaces are shown in FIGS. 4C-4E. Accordingly, systems and methods in accordance with different embodiments of the invention are not limited to specific types of 3D data visualizations and can be utilized to generate any of a variety of 3D data visualizations. Systems and methods for performing 3D data visualization that enable a user's cognition system to interpret highly dimensional data and interact with high dimensional data in accordance with various embodiments of the invention are discussed further below.

3D Data Visualization Systems 3D data visualization systems in accordance with certain embodiments of the invention can be configured for exploration of a 3D graph by a single user or by multiple users. In several embodiments, the 3D data visualization system includes a 3D rendering engine that maps data dimensions to characteristics of 3D virtual objects that are then rendered for visualization within a virtual space by the 3D rendering engine. A machine vision system and/or sensor system can be utilized to track the pose of one or more users and more specifically track the head position of the user(s). Head positions can be utilized to determine a viewpoint from which to render a 3D display of the virtual space for each user that is interacting with data within the virtual space. Where multiple users are collaborating within a virtual space, head positions and/or poses of the users can be utilized to render the 3D displays presented to each user and to render the avatars of individual users within the data space.

Figure 5A:
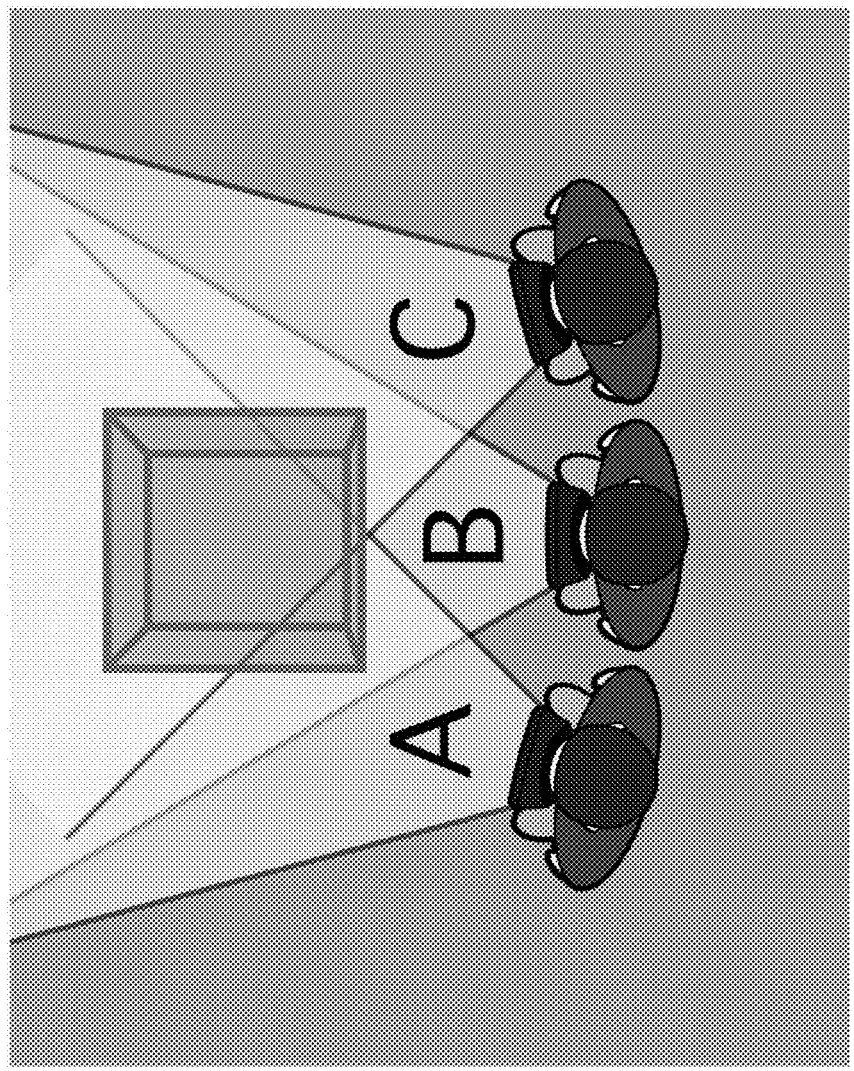
FIGS. 5A-5D conceptually illustrates rendering of a 3D graph from different viewpoints of different users in accordance with an embodiment of the invention.
Figure 5B:
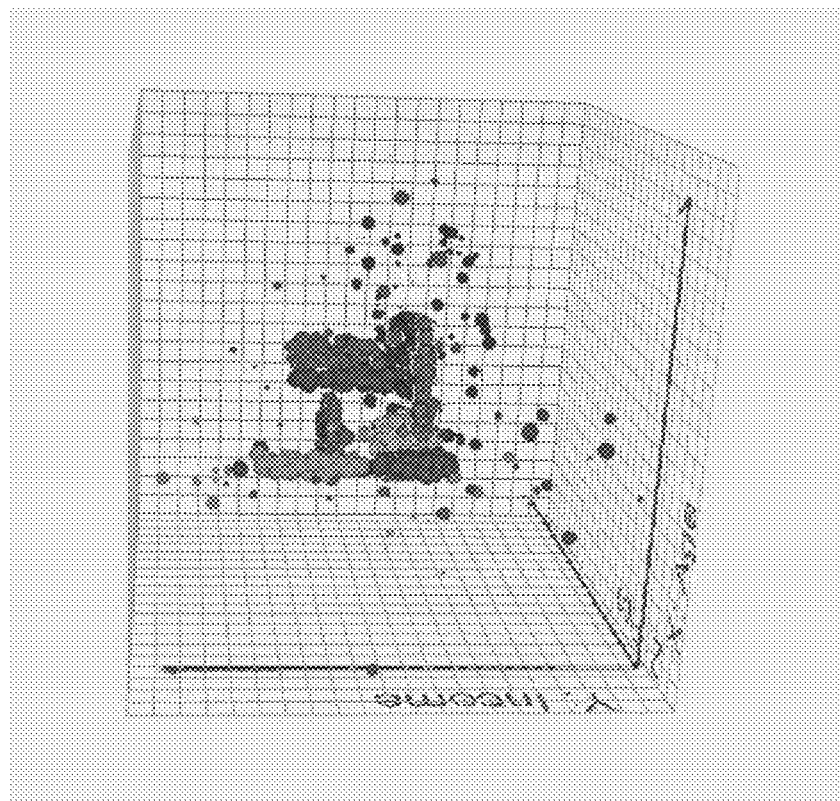
Figure 5C:
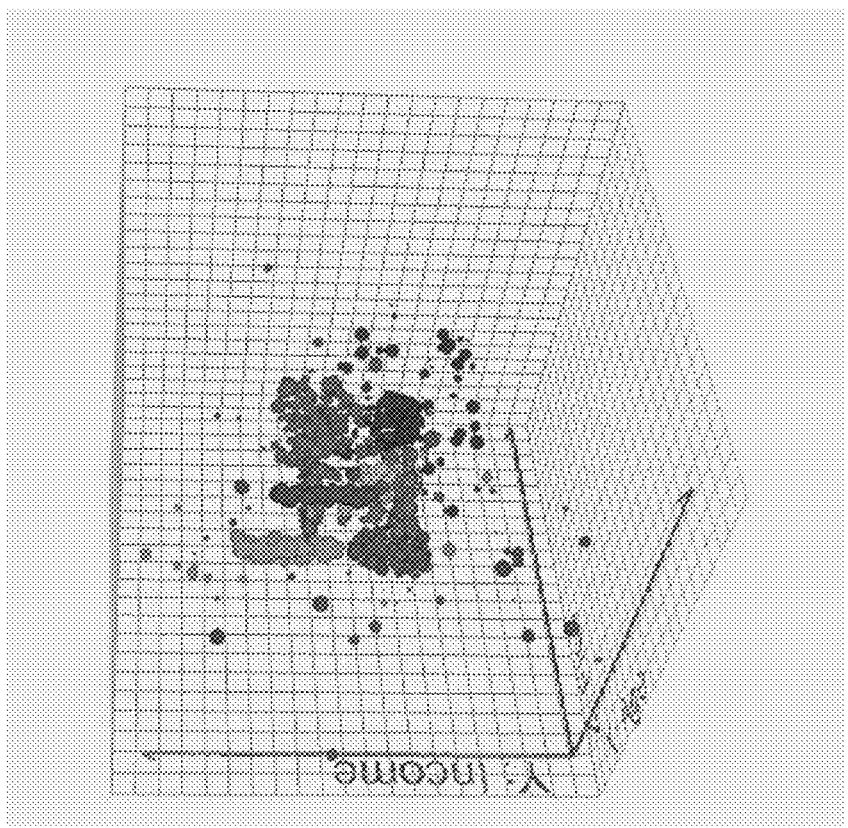
Figure 5D:
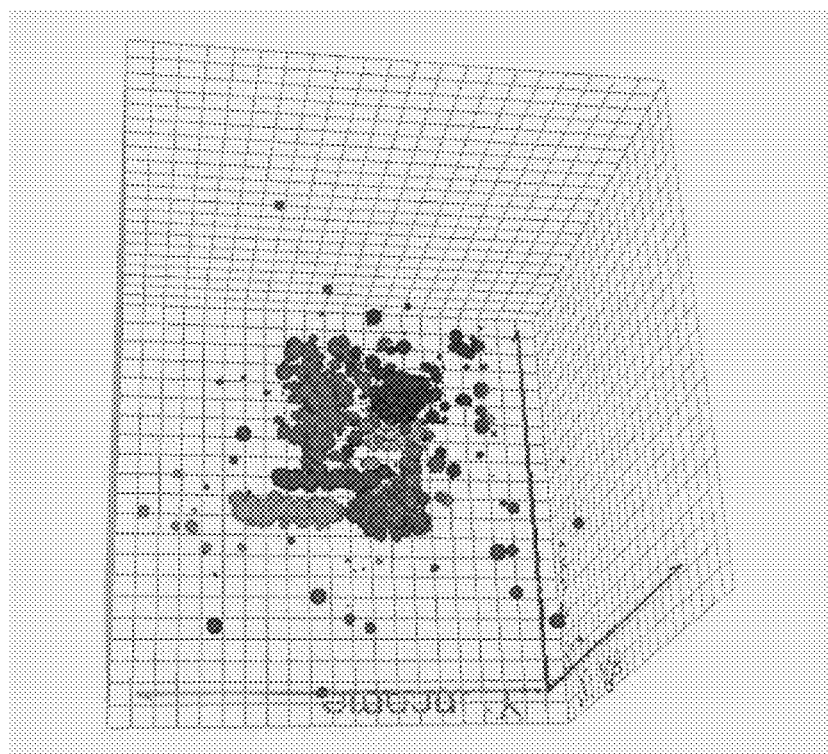
Figure 5E:
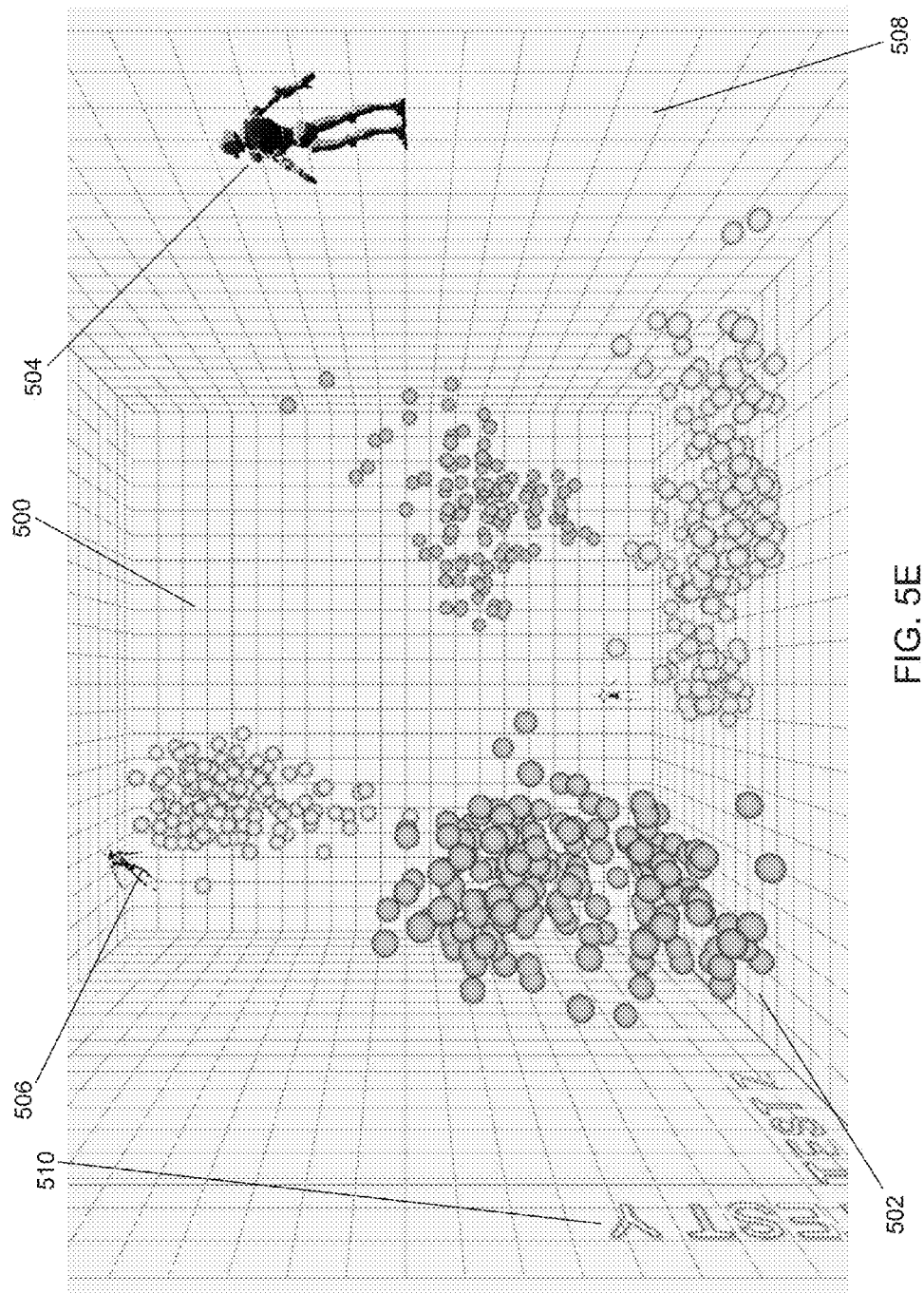
FIG. 5E illustrates a 3D data visualization showing avatars of multiple users within a virtual space in accordance with an embodiment of the invention.

Rendering of a 3D graph from different viewpoints of different users in accordance with an embodiment of the invention is conceptually illustrated in FIGS. 5A-5D. A 3D data visualization showing avatars of multiple users within a virtual space in accordance with an embodiment of the invention is illustrated in FIG. 5E. In the illustrated 3D data visualization, a 3D graph 500 is shown in which data points are visualized as 3D objects 502 and the viewpoints from which other users are exploring the virtual space is indicated by avatars 504, 506. As is discussed below, a user's ability to orient themselves within a virtual space can be enhanced by providing intuitive interaction primitives such as grid lines 508, and 510 axes labels. In many embodiments collaborating users can independently move through the virtual space or a set of users can experience the same visualization of the virtual space controlled by a single user's interactions with the virtual space. As can readily be appreciated, the specific collaborative exploration modes supported by a 3D data visualization system is largely dependent upon the requirements of a given application.

A multidimensional data visualization system that can be utilized to generate a visualization of multidimensional data within three spatial dimensions for a user and/or to facilitate collaborative multidimensional data exploration in such a 3D space by multiple users in accordance with an embodiment of the invention is illustrated in FIG. 6A. The 3D data visualization system 600 includes a 3D data visualization computing system 602 that is configured to communicate with a 3D display 604, which in the illustrated embodiment is a head mounted display.

The 3D data visualization computing system 602 can also be connected to a camera system 606 that is utilized to capture image data of the user from which the pose and/or head position of the user can be determined. The camera system can also be used as an input modality to detect gesture based inputs. Additional and/or alternative input modalities can be provided including (but not limited to) user input devices, and microphones to detect speech inputs. The camera system can incorporate any of a variety of different camera systems that can capture image data from which the pose of a user can be determined including (but not limited to) conventional cameras, time of flight cameras, structured illumination cameras, and/or multiview stereo cameras. The term pose can be utilized to describe any representation of both a user's position in three-dimensional space and orientation. A simple representation of pose is a head location and viewing direction. More complex pose representations can describe a user's body position using joint locations of an articulated skeleton. As can readily be appreciated the specific description of pose and/or camera system utilized within a given 3D data visualization system 600 is largely dependent upon the requirements of a specific application.

In a number of embodiments, the 3D data visualization computing system 602, the 3D display 604, and the camera system 606 are an integral unit. For example, the 3D data visualization computing system 602, 3D display 604, and camera system 606 can be implemented in a head mounted display such as (but not limited to) the HoloLens distributed by Microsoft Corporation of Redmond, Wash. In other embodiments, the 3D data visualization computing system 602 and the 3D display 604 communicate via a wireless data connection in a manner similar to that utilized by the Oculus Rift 3D display distributed by Oculus VR, LLC of Menlo Park, Calif. As can readily be appreciated, 3D data visualizations can be constructed as a set of virtual objects displayed within a mixed reality context using a MR headset (e.g. HoloLens) and/or displayed in a completely immersive environment using a VR 3D display (e.g. Oculus).

In certain embodiments, the 3D data visualization computing system can leverage distributed processing. In a number of embodiments, at least some processing associated with rendering a 3D data visualization is performed by a processor within a head mounted display. In several embodiments, additional processing is performed by a local computer system with which the head mounted display communicates. In many embodiments, processing is performed by a remote computer system (e.g. computing resources within a cloud computing cluster) with which the head mounted display communicates via the Internet (potentially via a local computer system). Accordingly, 3D data visualization computing systems in accordance with various embodiments of the invention are not limited to a single computing device and can encompass a single computing device, and/or a combination of a computing system within a head mounted display, a local computing system, and/or a remote computing system. As can readily be appreciated the specific implementation of a 3D data visualization computing system used within a given 3D data visualization system is largely dependent upon the requirements of a specific application.

Figure 6B:
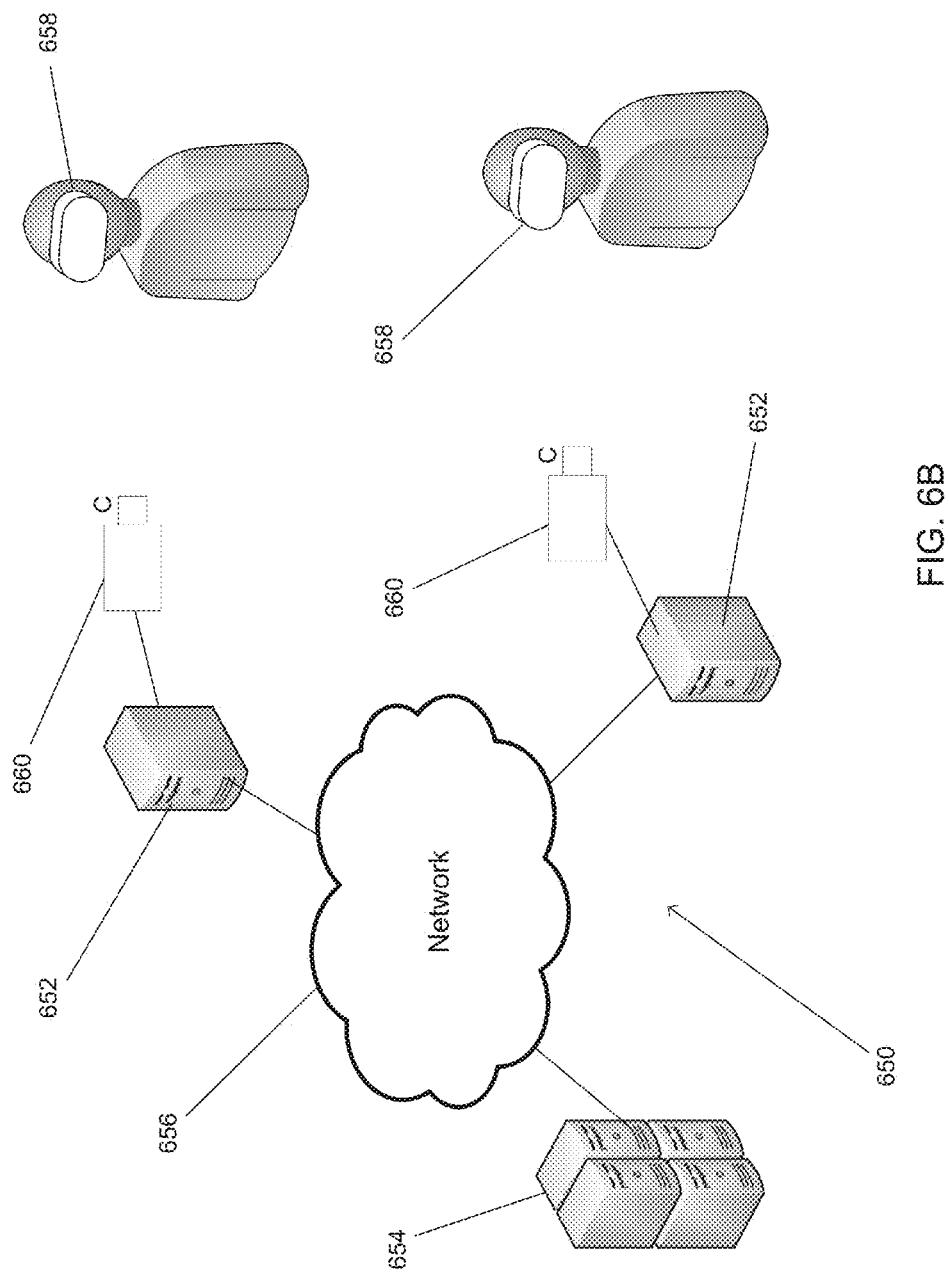

A multidimensional data visualization system in which multiple users are able to simultaneously explore a 3D visualization of a multidimensional data space in accordance with an embodiment of the invention is illustrated in FIG. 6B. The 3D data visualization system 650 includes two local computer systems 652 that communicate via a server computing system 654 across a network 656. Each of the local computer systems 652 is connected to a 3D display 658 and a camera system 660 in a manner similar to that described above with reference to FIG. 6A.

In the illustrated embodiment, the local computer systems 652 each build a 3D model of the multidimensional data space and render video sequences (which may be 2D or 3D) responsive to changes in the pose of the users. In a number of embodiments, the local computer systems 652 are configured to enable independent data exploration by the users and pose information can be shared between the local computer systems 652 via the server computing system 654. The pose information can then be utilized to render an avatar(s) within the virtual space that indicates the location from which a specific user is viewing the virtual space. In many embodiments, the local computer systems 652 support a broadcast mode in which one user navigates through the virtual space and the pose of the navigating user is broadcast via the server computing system 654 to the local computer systems 652 of the others users within the virtual space. The local computer systems 652 that receive pose information from the navigating user can use the pose information to render a multidimensional data visualization from the viewpoint of the navigating user for display via another user's 3D display.

In many embodiments, a broadcast mode is supported by rendering a 3D video sequence and streaming the 3D video sequence to the local computer systems 652 of other users. In several embodiments, the server computing system 654 system includes sufficient computing capacity (e.g. graphics processing units) to generate 3D data visualizations for each of the users and to stream 3D video sequences over the network 656 to the local computers for display via the 3D displays based upon pose information received from a local computer system 652.

Computer Systems for 3D Visualization of Multidimensional Data

Computer systems that can generate 3D visualizations of multidimensional data can take a variety of forms including implementations in which all of the computing is performed by a single computing device to complex systems in which processing is distributed across head mounted displays, local computer systems and/or cloud based server systems. The specific distribution of different processes is largely dependent upon the number of users and the requirements of a given application.

Figure 7:
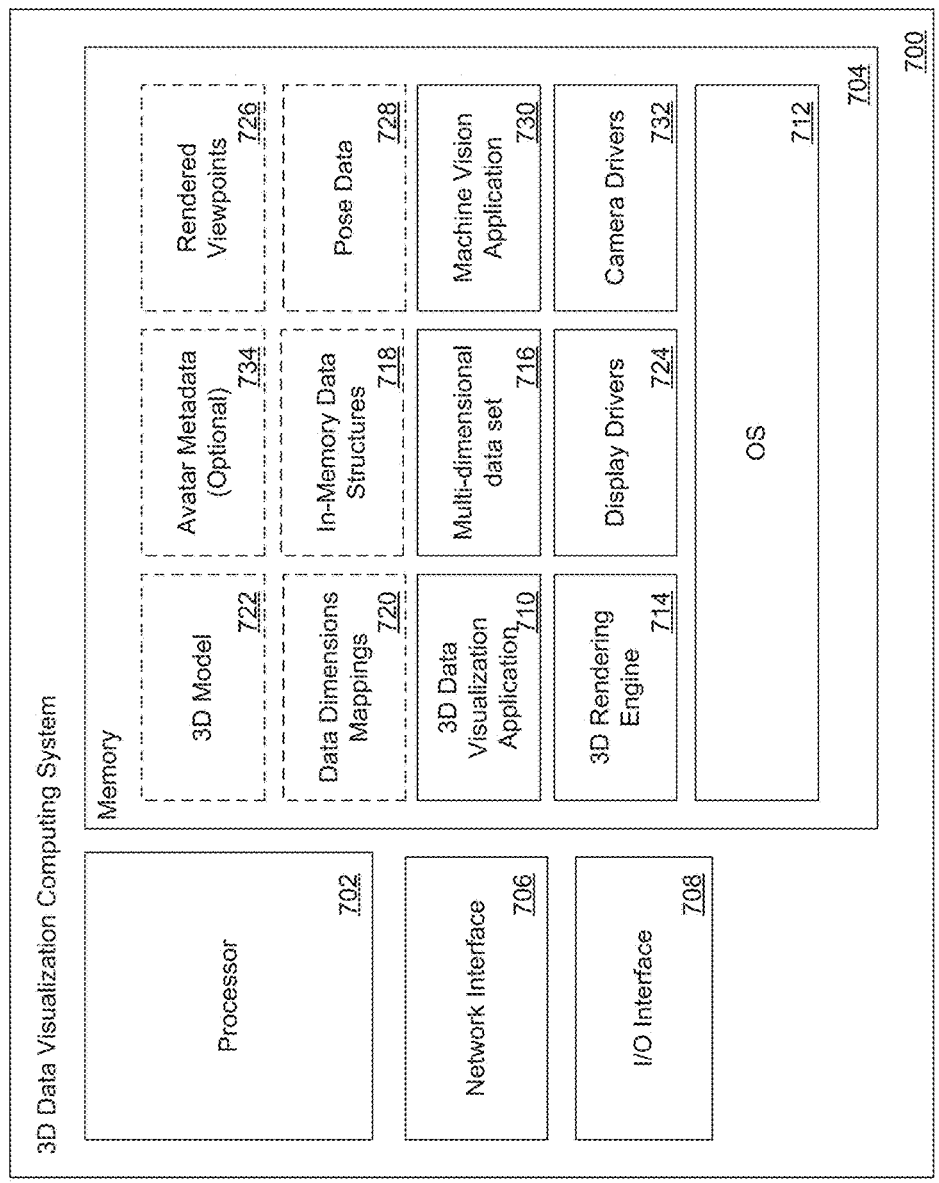
FIG. 7 conceptually illustrates a multidimensional data visualization computing system implemented on a single computing device in accordance with an embodiment of the invention.

A multidimensional data visualization computing system implemented on a single computing device in accordance with an embodiment of the invention is illustrated in FIG. 7. The multidimensional data visualization computing system 700 may be a personal computer, a laptop computer, a head mounted display device and/or any other computing device with sufficient processing power to render 3D displays at a sufficient frame rate to satisfy the interactive 3D data visualization requirements of a specific application.

The 3D data visualization computing system 700 includes a processor 702. The term processor 702 is used to refer to one or more devices within the computing device that can be configured to perform computations via machine readable instructions stored within the memory 704 of the 3D data visualization computing system. The processor 702 can include one or more microprocessor (CPUs), one or more graphics processing units (GPUs), and one or more digital signal processors (DSPs). In addition, the processor 702 can include any of a variety of application specific circuitry developed to accelerate the 3D data visualization computing system.

In the illustrated embodiment, the 3D data visualization computing system 700 includes a network interface 706 to communicate with remote computing systems (e.g. the computing systems of other users and/or a remote server computing system) and an input/output (I/O) interface 708 that can be utilized to communicate with a variety of devices including (but not limited to) a 3D display, and/or a camera system. The specific communication and I/O capabilities required of a computing system used to generated 3D visualizations of multidimensional data is typically determined based upon the demands of a given application.

As can readily be appreciated, a variety of software architectures can be utilized to implement a multidimensional data visualization computing system in accordance with an embodiment of the invention. In the illustrated embodiment, 3D data visualizations are generated by a 3D data visualization application 710 that executes within a computing environment created by an operating system 712. The 3D data visualization application 710 leverages a 3D rendering engine 714 to generate 3D data visualizations that can be displayed via a 3D display. In a number of embodiments, the 3D data visualization application 710 loads a multi-dimensional data set 716 into in-memory data structures 718 that are stored within low-latency memory of the 3D data visualization computing system. The multi-dimensional data set 716 may be locally stored in a file and/or database. In several embodiments, the multi-dimensional data is stored remotely (e.g. in a distributed database) and some or all of the multi-dimensional data is loaded into the in-memory data structures 718 maintained by the 3D data visualization application 710. In many embodiments, the multi-dimensional data is loaded into at least one visualization table. As discussed below, additional data dimensions can be added to the multidimensional data as it is loaded into the at least one visualization table by the 3D data visualization application 710. In several embodiments, a visualization table includes a visibility dimension and the 3D data visualization application continuously modifies the visibility value of individual items within the multi-dimensional data set contained within the visualization table to reflect whether a 3D object corresponding to the item is visible within a current 3D visualization of the multi-dimensional data contained within the visualization table. As can readily be appreciated, any of a variety of additional dimensions can be added to the multi-dimensional data by the 3D data visualization application as appropriate to the requirements of a given application.

As is discussed further below, a user can select mappings of data dimensions to attributes of 3D objects within a 3D data visualization thus effectively creating a multidimensional data visualization. The mappings are stored as data dimension mappings 720. The 3D data visualization application 710 can use the data dimension mappings 720 to provide attributes of 3D objects to the 3D rendering engine 714. In many embodiments, the 3D rendering engine 714 instantiates 3D objects within a 3D model 722 stored in memory and can update the attributes of the 3D objects. In several embodiments, 3D objects can be instantiated within the 3D model 722 by the 3D rendering engine 714 based upon the number of data points loaded into the in-memory data structures 718. In this way, the 3D rendering engine 714 can generate 3D data visualizations rapidly in response to selection of data dimensions for visualization by the user, because the 3D objects are instantiated and the 3D rendering engine 714 simply needs to modify the attributes of the 3D objects within the 3D model 722 to generate the visualization. In other embodiments, the 3D objects are instantiated in response to definition of the attributes of the 3D objects by the user.

The 3D rendering engine 714 can utilize the 3D model 722 to render stereo images that can be presented via a 3D display. In a number of embodiments, the 3D data visualization application uses a display driver 724 to display the rendered viewpoints 726 via a 3D display. The specific rendered viewpoints can be determined by pose data 728 received from a remote computing system (e.g. in broadcast mode) or based upon pose data 728 determined by the 3D data visualization computing system from image and/or other sensor data.

In the illustrated embodiment, the 3D visualization application 710 receives pose data 728 from a machine vision application 730 that obtains image data from a camera system using one or more camera drivers 732. The machine vision application 730 configures the processor 702 to extract a user's pose including (but not limited to) the location and orientation of the user's head from the captured image data. As noted above, the user's pose can be utilized to determine viewpoints 726 from which to render images from the 3D model 722. In many embodiments, user pose is also utilized to control elements of the 3D model including (but not limited to) illumination of 3D objects, speed of movement through the virtual space, and/or visibility of interaction primitives. The specific ways in which user pose can be utilized to modify the rendering of 3D visualizations of multi-dimensional data in accordance with various embodiments of the invention are discussed further below.

When the multidimensional data visualization computing system 700 is generating a 3D visualization of multidimensional data in which multiple users are simultaneously visualizing the same virtual space, the 3D rendering engine 714 can also use avatar metadata 734 that includes pose information for each avatar and (optionally) identifying information for the avatar to incorporate avatars within the 3D model 722 in such a way that avatars located within the field of view of a user are visible within viewpoints 726 rendered by the 3D rendering engine.

In many embodiments, the 3D rendering engine 714 forms part of a 3D graphics engine or 3D game engine that enables implementation of the 3D data visualization application 710 within the 3D graphics engine using a mechanism such as (but not limited to) a scripting language. In other embodiments, the 3D rendering engine forms part of the 3D data visualization application. As can readily be appreciated, the 3D data visualization application, 3D rendering engine, and/or machine vision application can be implemented independently, as a single application, or within or as a plugin for another application such as (but not limited to) a web browser application. The specific manner in which the 3D data visualization application is implemented is largely dependent upon the requirements of a given computing system(s) and/or use case.

Although specific multidimensional data visualization systems and 3D data visualization computing systems are described above with respect to FIGS. 6A-7, any of a variety of computing platforms, 3D displays, and/or camera system can be utilized to implement processes that enable interactive exploration of 3D data visualizations in accordance with various embodiments of the invention. Processes for interactive exploration of 3D data in accordance with a number of embodiments of the invention are discussed further below.

Generating 3D Data Visualizations

Figure 8A:
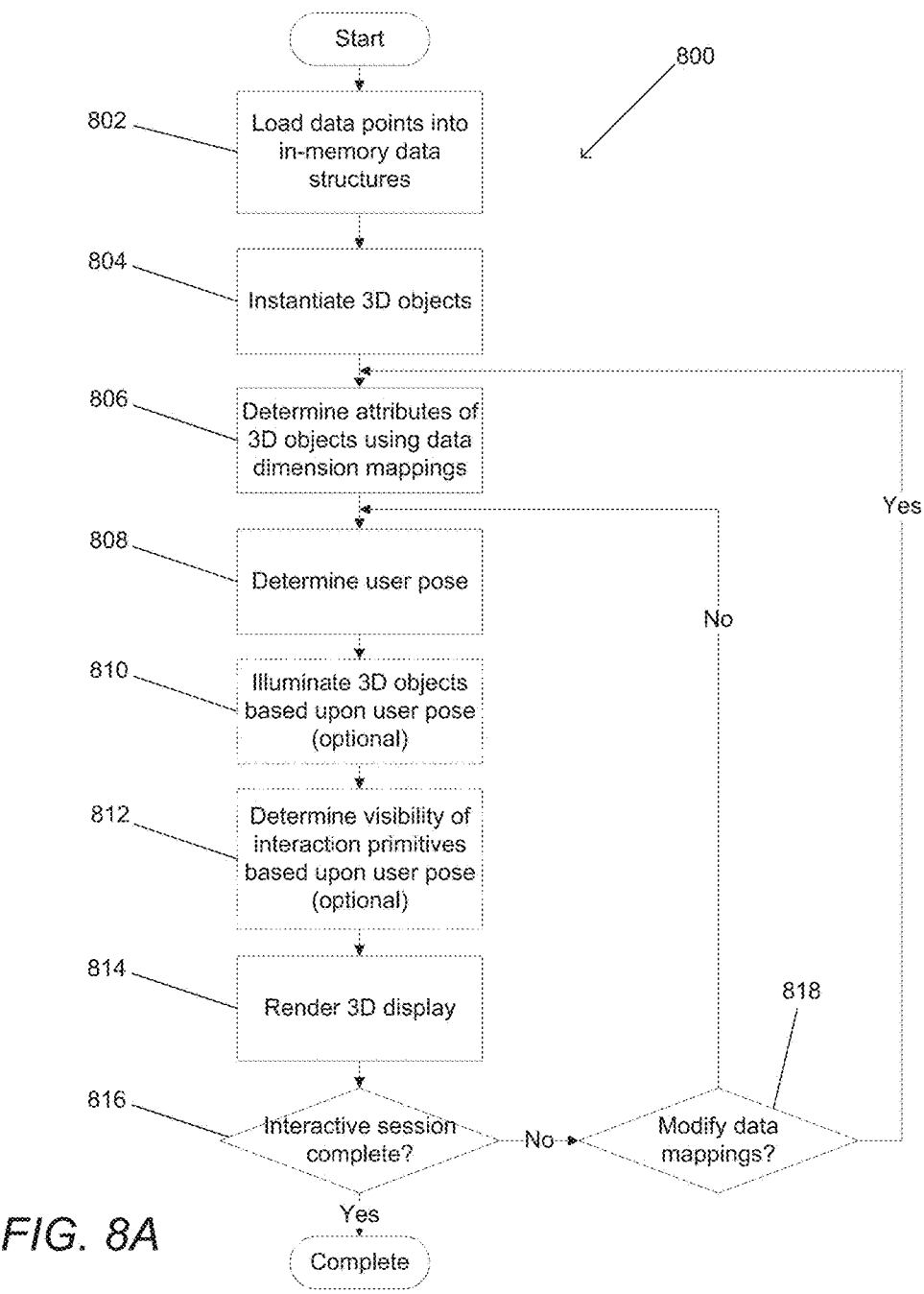
FIG. 8A is a flow chart illustrating a process for generating a multidimensional data visualization in accordance with an embodiment of the invention.

Processes for generating 3D data visualizations in accordance with many embodiments of the invention involve loading data into in-memory data structures and then mapping data dimensions to attributes of 3D objects to enable rendering of 3D data visualizations via 3D displays. A process for generating a multidimensional data visualization in accordance with an embodiment of the invention is illustrated in FIG. 8A. The process 800 includes loading (802) data points into in-memory data structures such as (but not limited to) a visualization table. In the illustrated embodiment, a 3D object is instantiated (804) with respect to each of the data points. As noted above, instantiating 3D objects prior to receiving mappings of data dimensions to attributes of the 3D objects can decrease latency with which a 3D data visualization can be rendered. In other embodiments, the 3D objects are not instantiated until data mappings are defined that determine the attributes of the 3D objects. As can readily be appreciated, the timing of the instantiation of 3D objects relative to the rendering of a 3D display is largely dependent upon the requirements of a given application. In several embodiments, the process of loading the data points into in-memory data structures involves creating an additional data dimension that describes the visibility of a specific data point within a 3D data visualization. The visibility data dimension for individual data points can be updated by the process 800 to indicate that a given data point should not be part of a 3D data visualization. In this context, visibility is a distinct concept from being within the field of view of the user and instead refers to a decision made by the process 800 not to render the data point within the 3D graph. Reasons for excluding a data point can include (but are not limited to) the data point possessing no value or an invalid value with respect to one of the data dimensions mapped to an attribute of a 3D object. As can readily be appreciated, any of a variety of reasons can be utilized to determine that specific data points should not be included within a 3D visualization as appropriate to the requirements of a given application. A visibility data dimension added during data ingest provides a mechanism for reflecting the decision not to visualize an individual data point.

The process 800 includes determining (806) attributes of 3D objects using data dimension mappings. A user interface can present information concerning the data dimensions that describe the data points and enable a user to select the specific data dimensions to map to attributes of 3D objects. In several embodiments, data dimension mappings determine characteristics of 3D objects including (but not limited to) the visibility of the 3D object, the location of the 3D object within a virtual space, the shape used to render the 3D object, the size of the rendered 3D object within the virtual space, and/or the color of the 3D object. In certain embodiments, visualizations of more than three data dimensions can be generated by using data dimension mappings to determine additional characteristics of the 3D objects including (but not limited to) the texture of the 3D object, and/or the transparency of the 3D object. In a number of embodiments the list of attributes that can be defined includes (but are not limited to): X (floating point value), Y (floating point value), Z (floating point value), Shape (floating point value, string), Size (floating point value), Color Palette (floating point value, string), Color Map (floating point value, string), Color Scale (floating point value, string), and transparency (floating point value). As a complement to the visual attributes, data dimension mappings can also be defined with respect to metadata describing the data points represented by the 3D objects including (but not limited to): ID (string), URL (string), Mask (floating point value used to indicate whether a data point is selected), Show By (Float, String, used to indicate whether data point is to be displayed based upon filters, e.g. show only data points with country value equal to "US"). Additional attributes associated with 3D objects can include (but are not limited to) subtle motions of the 3D object (e.g. binning data into different rates of jitter or twist), sonification, haptic feedback, and/or vibrotactile feedback. While specific attributes are described above, any subset and/or combination of some or all of the above attributes can be combined with additional attributes in the visualization of data points. The specific attributes utilized to visualize a data point within a 3D graph are largely dependent upon the requirements of a given 3D data visualization system.

While the mapping of data dimensions to attributes (806) is often performed by a user, a user and/or a 3D data visualization system may also use a previously stored 3D data visualization to define mappings of data dimensions to attributes. In this way, a user can load a new data set or an updated data set (e.g. a data set to which new data points have been added) and utilize a previously selected set of mappings to visualize the data. Accordingly, the attributes of 3D objects can be automatically determined 806 based upon mappings contained within a previously generated 3D data visualization. In many embodiments, users can share 3D data visualizations and the mappings within the shared 3D data visualizations are utilized to determine 806 the attributes of 3D objects. Users can share 3D data visualizations for independent use by others and/or as part of a broadcast 3D data visualization.

The process 800 renders (814) a 3D display based upon a viewpoint of a user. Accordingly, the user's pose is determined (808) and can be used to render a 3D display based upon the position of the user within the virtual space and the 3D objects within the field of view of the user. As is discussed further below with reference to FIG. 8B, additional computational efficiencies can be obtained during rendering by creating one or more meshes for 3D group objects based upon the meshes of a large number (or all) of the 3D objects. In this way, processes including (but not limited to) physics processes such as collision processing can be performed with respect to a much smaller number of 3D group objects. As can readily be appreciated, the extent to which 3D objects are aggregated into 3D group objects for the purposes of reducing the computation required to render a 3D data visualization is largely dependent upon the requirements of a given application.

Effective visualizations of 3D data enhance a user's ability to perceive structure within the data and avoid introducing variation in the appearance of 3D objects within the 3D graph that are unrelated to the characteristics of the data being visualized. In many embodiments, a variety of aspects of the 3D data visualization are modified based upon the pose of the user in order to enhance the ability of the user to perceive the structure of the data. In several embodiments, the process of rendering a 3D display includes illuminating (810) 3D objects based upon the user pose. As is discussed below, illuminating each 3D object within the field of view of the user using a directional illumination source originating at the user's viewpoint or slightly offset from the user's viewpoint can preserve the similarity in appearance of similar 3D objects across the field of view of the user. Processes for illuminating 3D objects based upon the pose of the user in accordance with various embodiments of the invention are discussed below. Where 3D objects have different appearances based upon viewing direction, the orientations of the 3D objects within the field of view of the user can be reoriented to "face" the user (although as discussed below facing the user may actually involve orienting the 3D object at a consistent angle to better accentuate the characteristics of the 3D shape). In this way, no matter what direction a user is viewing an object, its appearance will always be the same within the 3D graph to avoid differences in orientation from being confused as meaningful information by the user consciously or subconsciously. In other embodiments, however, orientation may be fixed and/or may be used to visualize an additional data dimension (e.g. a data dimension is mapped to orientation relative to the user viewpoint, or to a motion such as but not limited to a rate of rotation).

In a number of embodiments, user pose is used to modify a number of other aspects of the 3D data visualization including (but not limited) the transparency and/or location of interaction primitives. For example, interaction primitives such as grid lines and/or navigation affordances can be included within a virtual space to assist with orientation and navigation. In many embodiments, user pose determines the extent to which any interaction primitives are occluding 3D objects that represent data points. A variety of criteria can be utilized to determine whether to increase the transparency and/or to modify the visibility of the interaction primitives as appropriate to the specific user experience that a 3D data visualization system is aiming to achieve. In a number of embodiments, the 3D graph is contained within a virtual space that includes a virtual environment (e.g. a virtual office cube or virtual office room). As the user manipulates the 3D graph within the virtual environment (e.g. rotates the 3D graph or increases the size of the 3D graph), computational efficiencies can be achieved by maintaining the 3D graph as a stationary object(s) and modifying the meshes associated with the virtual environment (e.g. meshes depicting tables, chairs, desks, walls, etc.) relative to the 3D graph based upon the viewpoint of the user (e.g. resizing the virtual environment or rotating the virtual environment and user viewpoint relative to the 3D graph). Meshes associated with the virtual environment are typically simpler than the mesh of the 3D object(s) that make up the 3D graph. Accordingly, shifting the viewpoint of the user and the 3D objects associated with the virtual environment relative to a stationary 3D graph can provide significant computational advantages while maintaining the ability of the user to perform manipulations with respect to the 3D graph including (but not limited to) rotating, moving, and/or resizing the 3D graph within the virtual environment. As can readily be appreciated, the elements of a virtual space that can be modified in response to the pose of the user are not limited to illumination and the visibility of interaction primitives, but can include any of a variety of aspects of the 3D data visualization appropriate to the requirements of a given application including (but not limited to) modifying the rate at which the user moves through the virtual space and/or can interact with 3D objects within the virtual space based upon the position and/or pose of the user. As is discussed below, 3D data visualization systems in accordance with a number of embodiments of the invention can switch between different visualization modes based upon user pose and/or context.

The specific manner in which the 3D display is rendered (814) based upon the pose of the user is largely dependent upon the specific 3D display technology being utilized. In embodiments that utilize a stereo 3D display such as those utilized in many head mounted AR, MR, and VR headsets, two frames are rendered from different viewpoints that can be presented by each of the stereo displays to provide the user with simulated depth perception.

The process 800 continues to update the rendered 3D display based upon changes (808) in the user position and/or changes (818) in the mappings of data dimensions to attributes. When a user terminates (816) the interactive session, the process completes.

As can readily be appreciated, the interactivity of a 3D data visualization depends upon the rate at which updates to the visualization can be rendered. In many embodiments, the 3D data visualization system targets a frame rate of at least 30 frames per second. In several embodiments, target frame rates of at least 60 frames per second and/or at least 120 frames per second are supported. Updating 3D data visualizations at high frame rates involves significant computation. In many instances, the computation required to maintain high frame rates is too great and the 3D data visualization is unable to render one or more frames in time for display resulting in what is commonly referred to as a frame drop. In certain embodiments, a graceful decay is supported in which portions of a frame within the center of a user's field of view are rendered and portions of the frame in the peripheral vision of the user are not updated. The specific manner in which a given 3D data visualization system manages an inability to render all frames required at a target frame rate is dependent upon the requirements of a given application.

The likelihood that a target frame rate can be achieved can be increased by reducing the complexity of rendering a 3D data visualization. In many embodiments, computational efficiencies are achieved by creating group 3D objects that are essentially the aggregation of a number of visible 3D objects. Reducing the number of objects can decrease the computation associated with aspects of the rendering pipeline including the processing performed by the physics engine to detect collisions between 3D objects and the drawing process itself. In several embodiments, a single group 3D object is created using all of the 3D objects corresponding to visible data points within a 3D graph. In many embodiments, a number of group 3D objects that is smaller than the total number of visible 3D objects is created. In certain embodiments, the group 3D objects are simply meshes having the shape of a set of 3D objects.

Figure 8B:
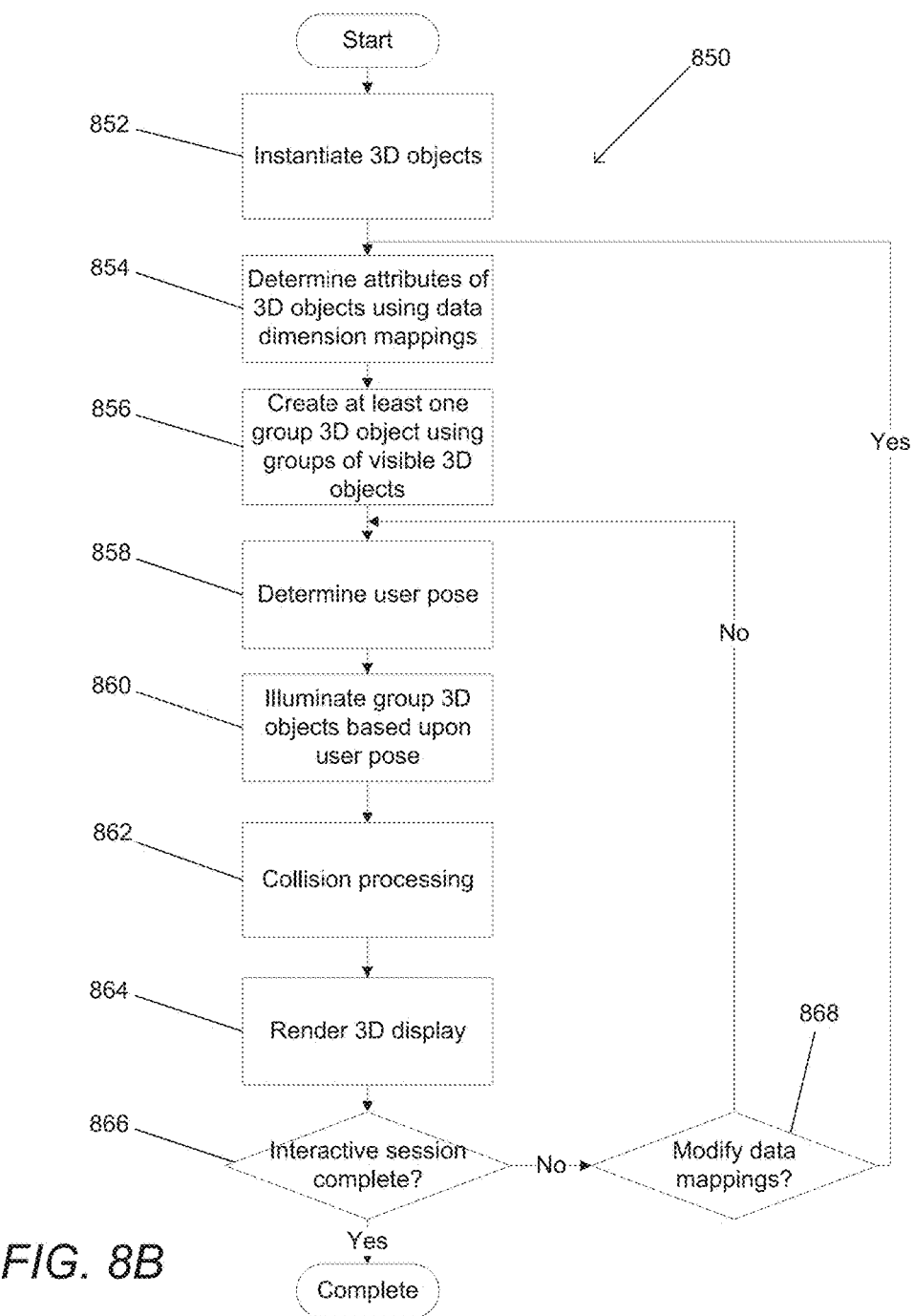
FIG. 8B is a flow chart illustrating a process for rendering a 3D data visualization using group 3D objects in accordance with an embodiment of the invention.

A process for rendering a 3D data visualization using group 3D objects in accordance with an embodiment of the invention is illustrated in FIG. 8B. The process 850 commences with the instantiation (852) of a set of 3D data objects that include multiple visualization attributes. The visualization attributes of the 3D data objects can be determined (854) in a manner similar to that described above using a set of data dimension mappings. In certain embodiments, the data dimension mappings define data dimension values in a visualization table that are processed to determine a specific visualization attribute of a 3D object. One or more group 3D objects are created (856) by generating the mesh and texture of each group 3D object using the meshes and textures of multiple visible 3D objects. In several embodiments, as many as 100,000 3D objects are utilized to create (856) a group 3D object. The specific number of 3D objects utilized to create a group 3D object typically depends upon the requirements of a given application.

User pose is determined (858), and the group 3D objects illuminated (860) based upon the user pose. In many embodiments, the group 3D objects are drawn on a per vertex basis and each vertex is illuminated using a directional light source with a direction determined based upon the line of sight from the user viewpoint (or a point close to the user viewpoint) to the vertex. Collision processing can then be performed (862) with respect to the 3D objects (including group 3D objects) within the virtual space and detected collisions resolved according to the constraints imposed upon the virtual space by a 3D data visualization system. The virtual space can then be rendered (864) from the viewpoint of the user. In the illustrated embodiment, a 3D display is rendered. In many embodiments, the rendered display drives a 2D display device.

Utilizing group objects can significantly reduce processing associated with interactively rendering a 3D data visualization at high frame rates. However, grouping objects results in the same processing overhead to modify a single 3D object as to modify all 3D objects. Accordingly, consideration of the number of 3D objects corresponding to data points combined into a single 3D group object can achieve a balance between reduced computational overhead when interacting with a 3D graph and preserving interactivity when the 3D graph changes due to updates in data mappings. Animation of movement from one 3D graph to another as mappings of data dimensions to attribute values change is discussed below. Group 3D objects can be utilized to animate groups of data points in batches and achieve high frames during animations.

Although specific processes for visualizing 3D data are described above with reference to FIGS. 8A and 8B, any of a variety of processes that render a 3D data visualization based upon dimensions of data points and the position of a user within a virtual space can be utilized as appropriate to the requirements of a given application. Techniques that can be utilized to enhance the effectiveness of 3D data visualizations to reveal structures within data to a user are discussed further below.

Enhancing Effectiveness of 3D Visualization of Complex Data 3D data visualization systems in accordance with various embodiments of the invention have the capacity to generate visualizations of eight or more dimensions of data. A challenge with representing highly dimensional data in 3D is that the 3D data visualization inherently introduces variation in the appearance of 3D objects that is unrelated to the underlying attributes of the 3D objects. For example, a user may have difficulty perceiving the relative size of 3D objects having different shapes that are located at different distances from the user. Illumination and, more specifically, shadows can also introduce variation in the appearance of 3D objects that is unrelated to the underlying attributes of the 3D objects. Experiments with 3D data visualizations have revealed that the effectiveness of a 3D data visualization can be enhanced by utilizing shapes that preserve the ability of a user to differentiate variations in size due to depth and variations in size as an attribute of the data, and/or illumination models that illuminate 3D objects in the same way across the field of view of the user and do not involve casting of shadows on other 3D objects. Use of depth perception preserving shapes and illumination models in the 3D visualization of data to increase the ability of users to perceive structure within data in accordance with various embodiments of the invention are discussed further below.

Depth Perception Preserving Shapes

Figure 9A:
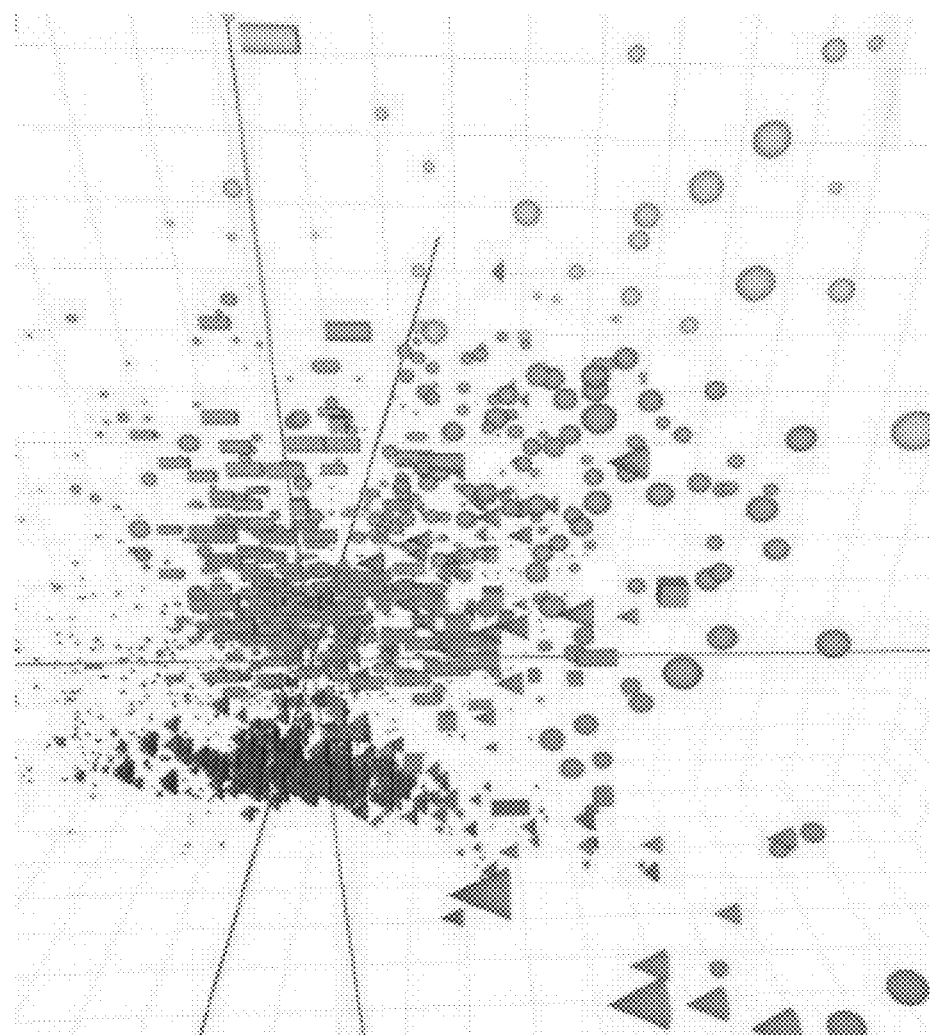
FIGS. 9A-9C illustrates a 3D visualization of a multidimensional data space in which data dimensions are mapped to shape and size attributes of 3D objects in accordance with various embodiments of the invention.
Figure 9B:
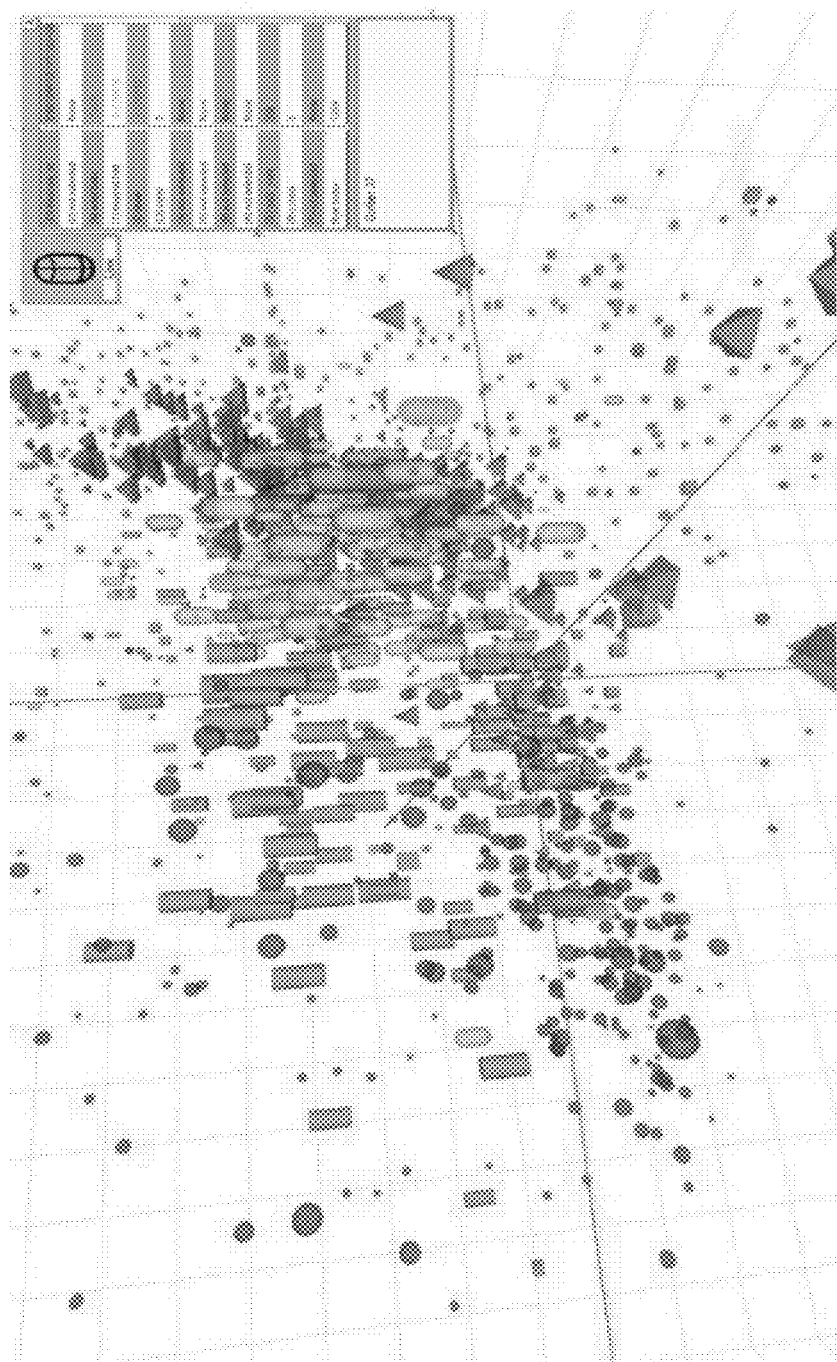
Figure 9C:
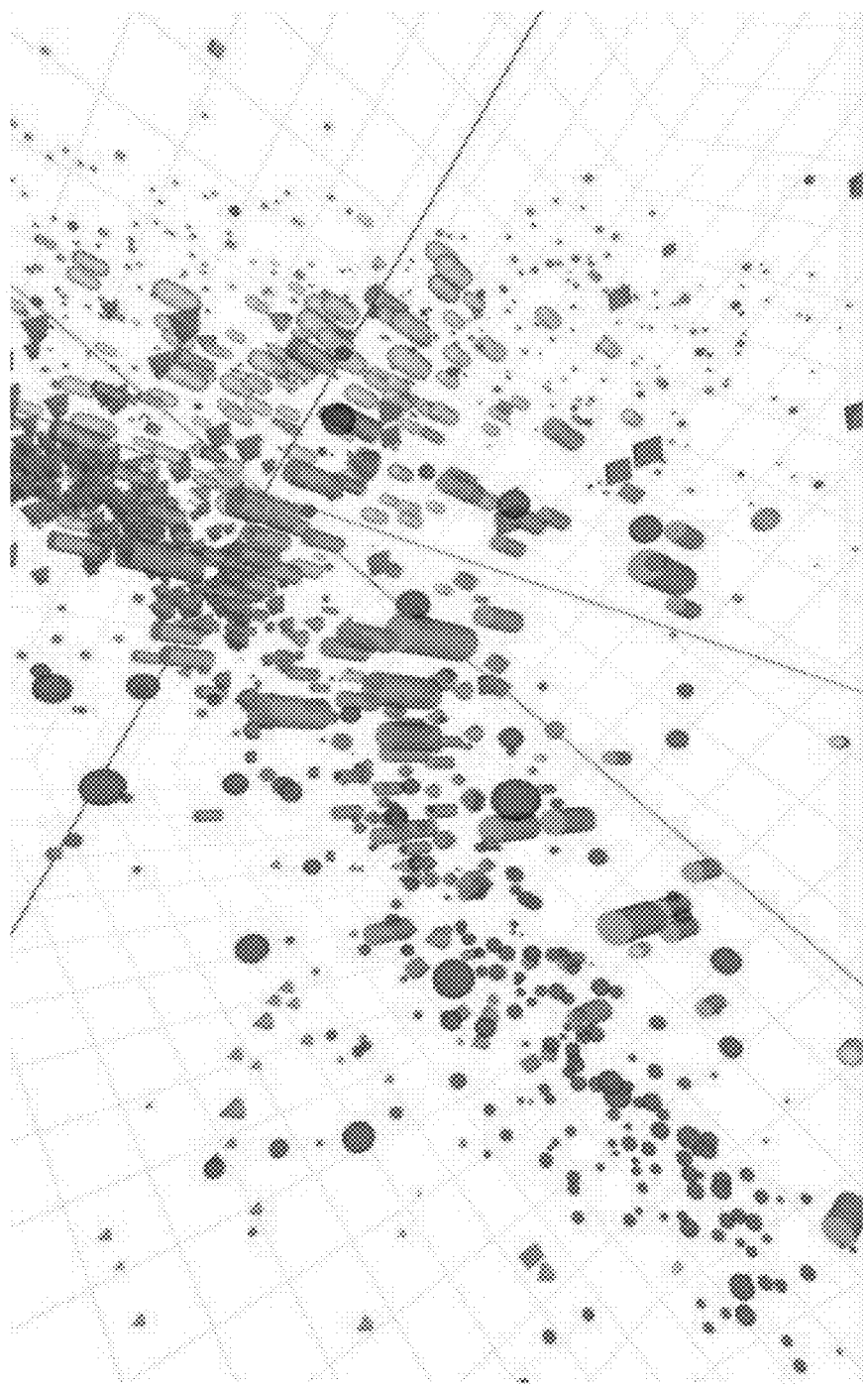

Preserving depth perception can be important in preserving the ability of a user to comprehend the dimensions of the data being visualized. For example, when size is utilized to visualize a data dimension, the size of a specific 3D objects rendered within the field of view of a user will depend both upon the size attribute of the 3D object and the distance of the 3D object from the user within the virtual space. Where a data dimension is also mapped to a shape attribute of the 3D objects, then the shape of the object can further confuse size comparisons (in a manner that is compounded by differences in depth). Experiments have shown that relative size perception for different shapes, such as cubes, spheres, or cylinders, is affected by various factors that include distance, alignment of the objects, color and illumination. In many embodiments, polyhedrons with many faces such as (but not limited to) icosahedrons that have sphere-like appearances are utilized as the shape of 3D objects with 3D data visualizations. Experiments have shown that users are able to accurately perceive the relative sizes of spheres in a 3D environment. However, spheres are complex shapes to render in 3D and are typically rendered as polyhedra with hundreds of faces. Accordingly, utilization of polyhedra with smaller numbers of faces in the range of tens of faces as opposed to hundreds of faces can significantly reduce the computation associated with rendering a 3D graph. A 3D visualization of a multidimensional data space in which data dimensions are mapped to shape and size attributes of 3D objects is shown from several viewpoints in FIGS. 9A-9C.

Figure 10:
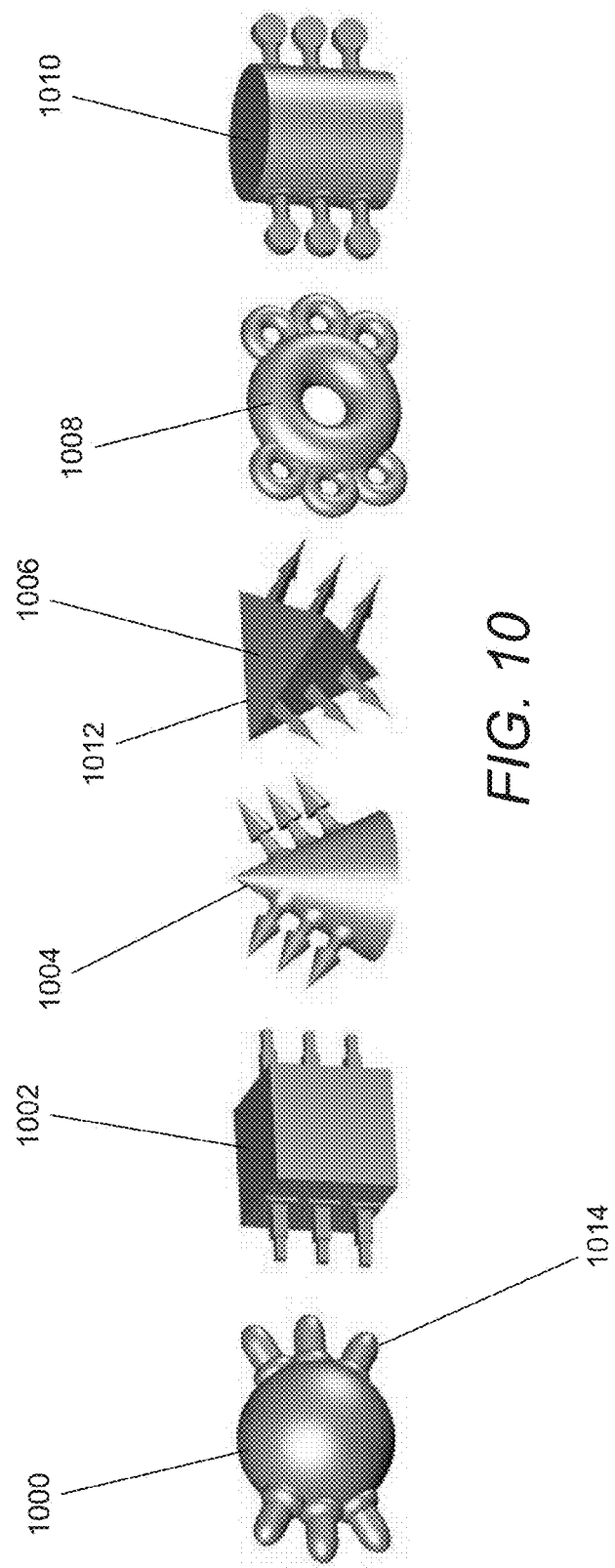
FIG. 10 shows a small set of 3D object shapes that are designed to be recognizable even in highly dense plots.

In many embodiments, data points are visualized using depth perception preserving 3D shapes that assist a user in determining the relative size of a 3D object given the distance of the 3D object from the user within the virtual space. FIG. 10 shows a small set of 3D object shapes that are designed to be recognizable even in highly dense plots. The construction of these 3D object shapes was done with several criteria in mind: front, profile, top profile, protrusions, and corners versus curved regions.

For the front profile, the initial templates were basic shapes common to 2D plots. These include circles, triangles, stars, boxes, pluses and exes. 3D shapes were derived with these listed front profiles. Circles translate to spheres 1000 and tori 1008. Triangles translate to pyramids 1006 (or tetrahedral) and cones 1004. Boxes translate to cubes 1002 and cylinders 1010. While exes and pluses could be made into 3D objects in a similar fashion, each branch of the 3D shapes has a potential to extrude beyond an occluding object and be confused for a different type of 3D shape or a feature in a simpler 3D shape. The same difficulty can be encountered with star plot based 3D shapes.

These chosen basic shapes demonstrate a variety of top and bottom profiles: circle, square, point, triangle, and ellipse. So, while some glyphs do share the same front profile, particularly the cylinder and cube, the number of protruding corners (or lack thereof) and top profiles allow them to remain recognizable even on densely populated plot regions. Furthermore, lighting can exacerbate the visual distinction between shapes, aiding in the ability to differentiate between them. Similarly, the cone 1004 and pyramid 1006, depending on orientation, can exhibit same front profiles, i.e. a triangle. Thus the cone 1004 is chosen to point upward, while the pyramid 1006 is chosen to have one horizontal edge 1012 at the top, while pointing outward.

A 3D shape designed where its faces are parallel to the front plane, when overlapped with other 3D shapes, is likely to create a large plane, rather than a more complex surface. Likewise, if the top and bottom profile are aligned with the floor, when using an orthographic projection, the top and bottom profile would be hidden. All 3D shapes shown in FIG. 10 are, therefore, rotated the same amount both horizontally and vertically. The resulting rotation is equivalent to a 30-degree rotation around an axis 30-degrees west of north (i.e. 30 degrees right of screen up vector). As can readily be appreciated, the specific rotations utilized to yield non-planar renderings of large clusters of shapes is largely dependent upon the requirements of a specific 3D data visualization system. The addition of extra features 1014 on the sides of the 3D objects can also benefit from the horizontal rotation component, in order to give more visual importance (via proximity) to one side over the other.

While extra features are included in the 3D shapes shown in FIG. 10, the extra features need not be included in 3D shapes utilized in accordance with various embodiments of the invention. In many embodiments, depth perception is preserved by limiting only one dimension of a 3D shape to be a visualization attribute. For example, the visualized 3D shapes have heights that are invariant, but widths that vary based upon the value of a mapped data dimension. In certain embodiments, 3D shapes that are pill shaped (i.e. cylindrical with rounded or hemispherical ends) are utilized. In a number of embodiments, the widths of the pill shaped 3D shapes (i.e. the diameters of the cylindrical portion of the pill shapes) are varied based upon the value of a mapped data dimension and the heights of the pill shaped 3D shapes is invariant with data value. In this way, the width conveys information and the height provides a depth cue. As can readily be appreciated, the specific shapes that are utilized will largely depend upon the requirements of a given application. The manner in which illumination of 3D shapes can be utilized to enhance 3D data visualization in accordance with various embodiments of the invention is discussed below.

Illumination Models for 3D Data Visualization

Figure 11A:
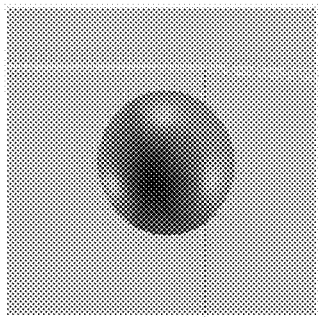
FIG. 11A shows the variation in appearance of a 3D object having a spherical shape under constant illumination by three static point sources when viewed from different directions.
Figure 11A:
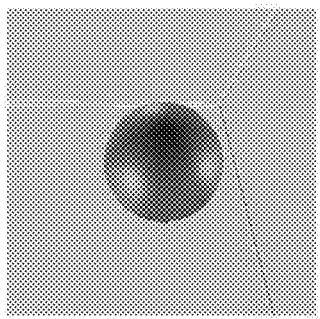
Figure 11A:
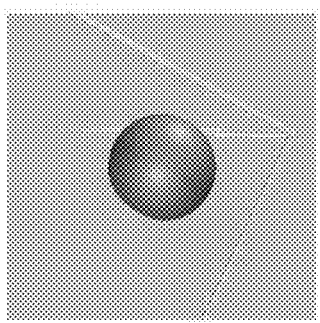
Figure 11A:
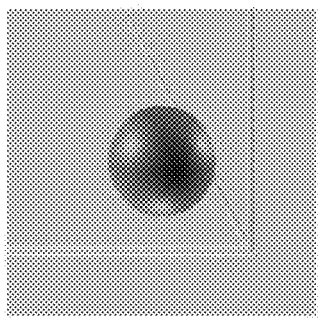
Figure 11B:
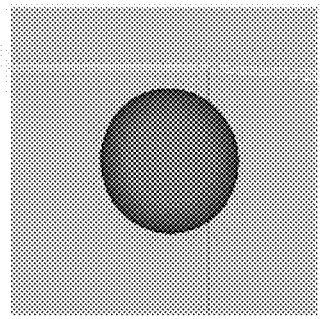
FIG. 11B shows the same 3D data object from the same viewpoints shown in FIG. 11A with the 3D object illuminated using a directional illumination source originating at (or near) the viewpoint of the user.
Figure 11B:
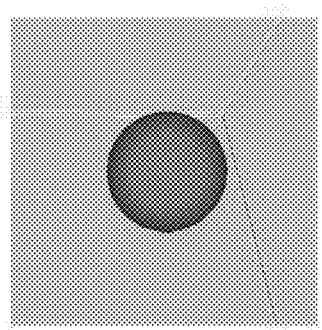
Figure 11B:
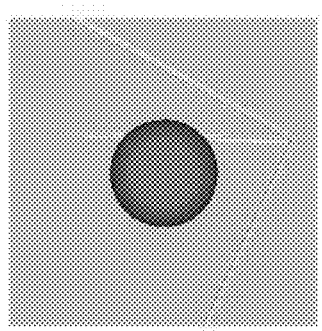
Figure 11B:
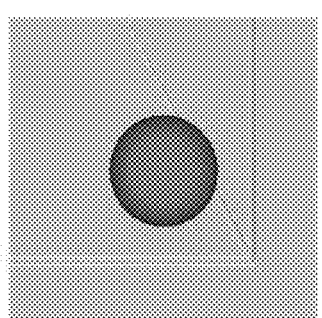
Figure 12A:
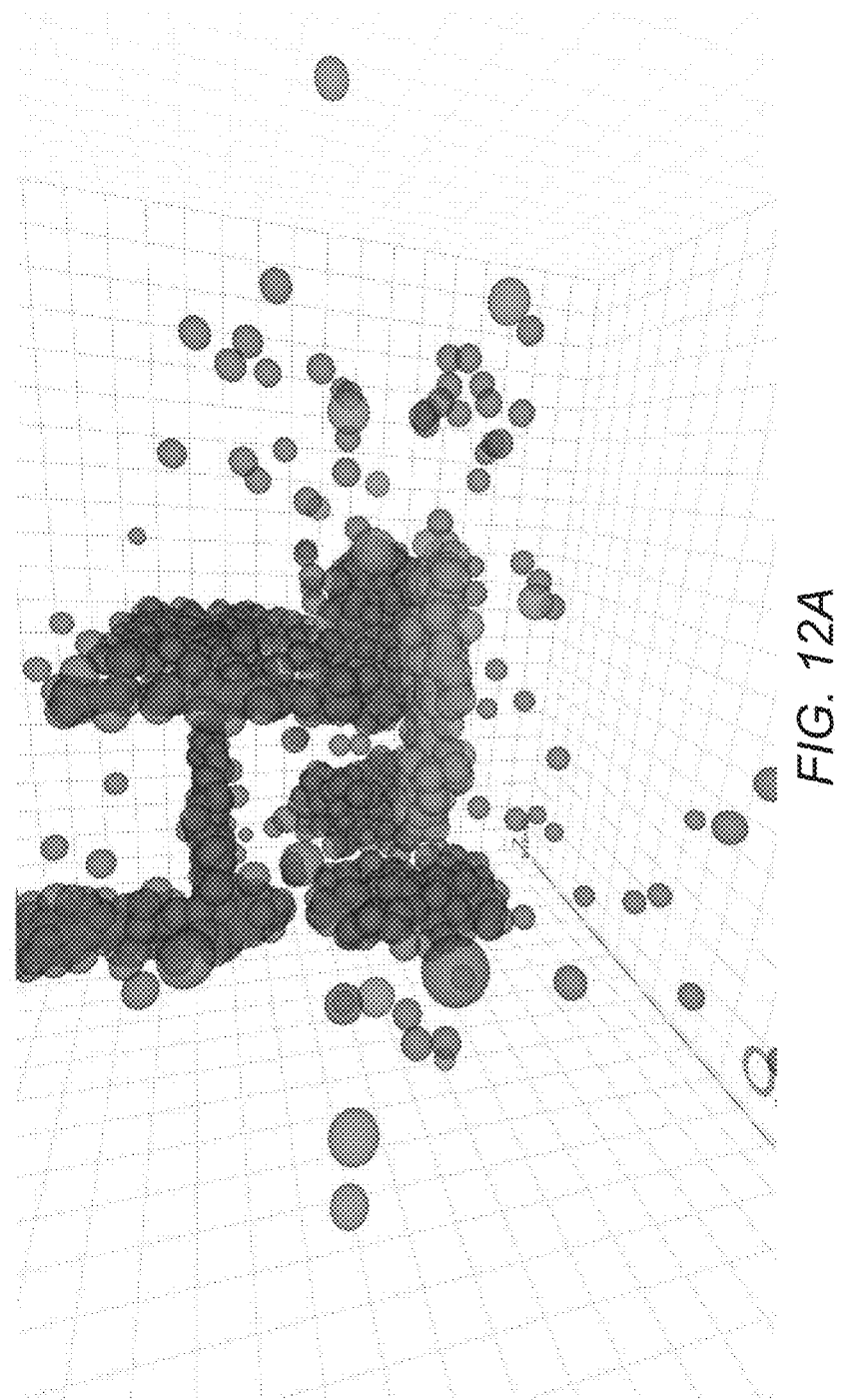
FIG. 12A-12C illustrate the similarity in appearance of similar 3D objects as a user moves through a virtual space, because the illumination of the objects changes with the pose of the user, in accordance with various embodiments of the invention.
Figure 12B:
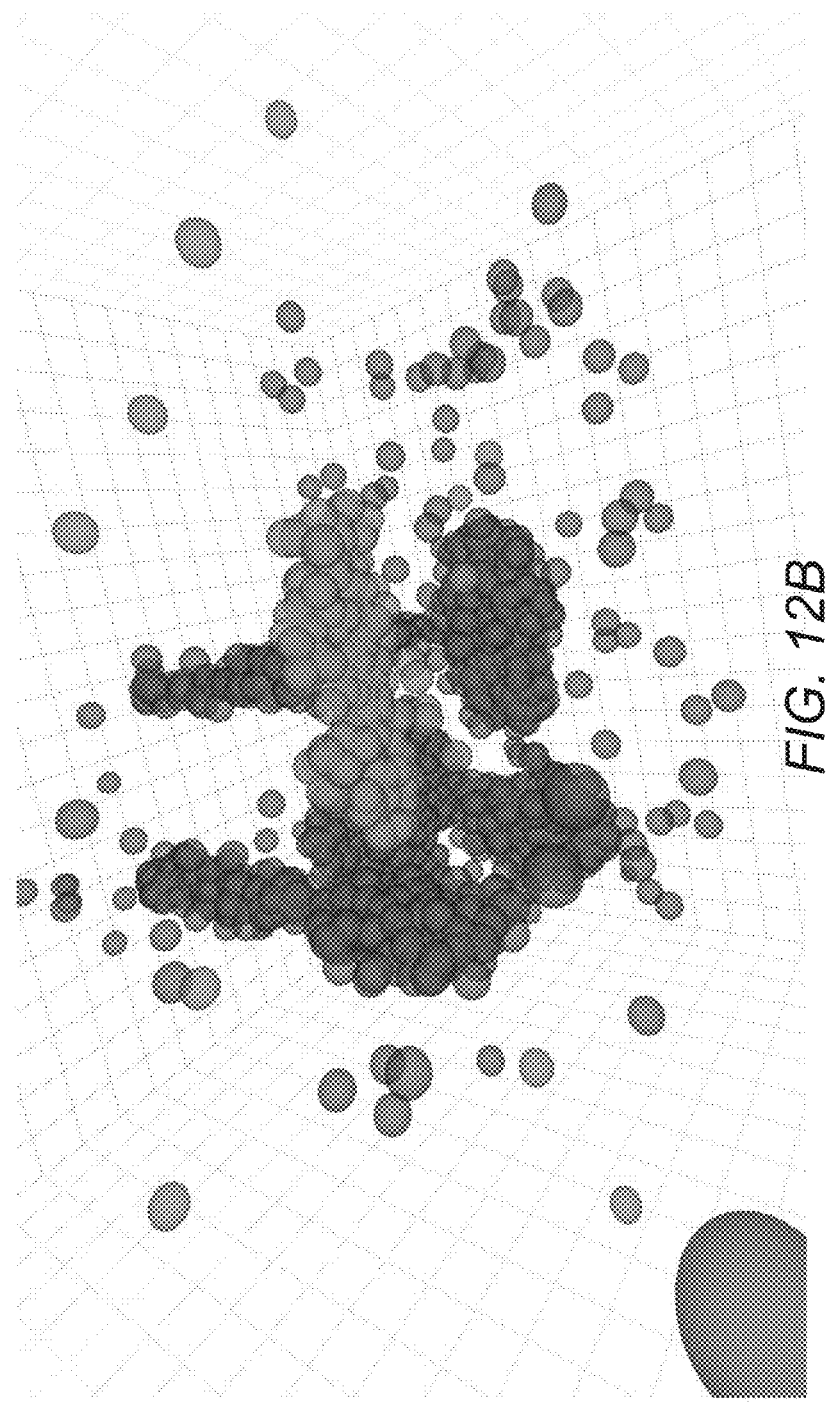
Figure 12C:
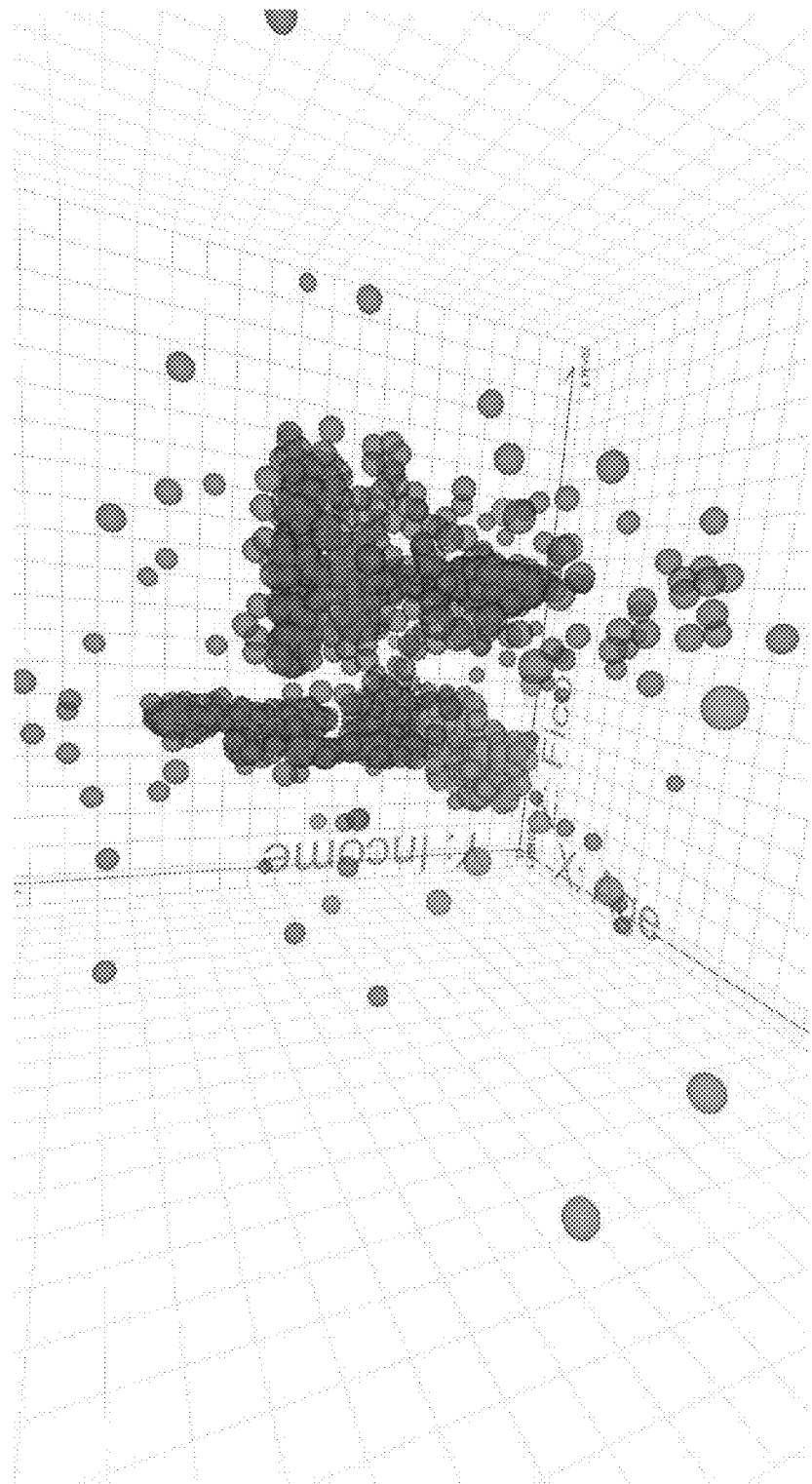

Illumination models used within a 3D data visualization can significantly impact the ease with which a user can interpret visualized data. As noted above, the effectiveness of a 3D data visualization can be decreased where the visualization introduces variation between the visual appearance of 3D objects that is unrelated to the data dimensions that are being visualized. FIG. 11A shows the variation in appearance of a 3D object having a spherical shape under constant illumination by three static point sources when viewed from different directions. As can readily be appreciated, the variation in the shading on the surface of the 3D object conveys no information about the data dimensions being visualized by the 3D object and can complicate the identification of similar 3D objects that are located within different regions within the field of view of a user (and hence illuminated differently) and/or determinations of relative size. 3D data visualization systems in accordance with a number of embodiments of the invention utilize an illumination model in which a separate directional light source originating at (or adjacent) the viewpoint of the user is used to illuminate each 3D data object within the field of view of the user when rendering the 3D data visualization. The same 3D data object from the same viewpoints shown in FIG. 11A are illustrated in FIG. 11B with the 3D object illuminated in the manner described above using a directional illumination source originating at the viewpoint of the user. Illuminating the 3D object in this way results in the 3D object having the same appearance from any viewpoint. In this way, the similarity in appearance of similar 3D objects can be preserved as the user moves through a virtual space, because the illumination of the objects changes with the pose of the user as shown in FIGS. 12A-12C.

Figure 13:
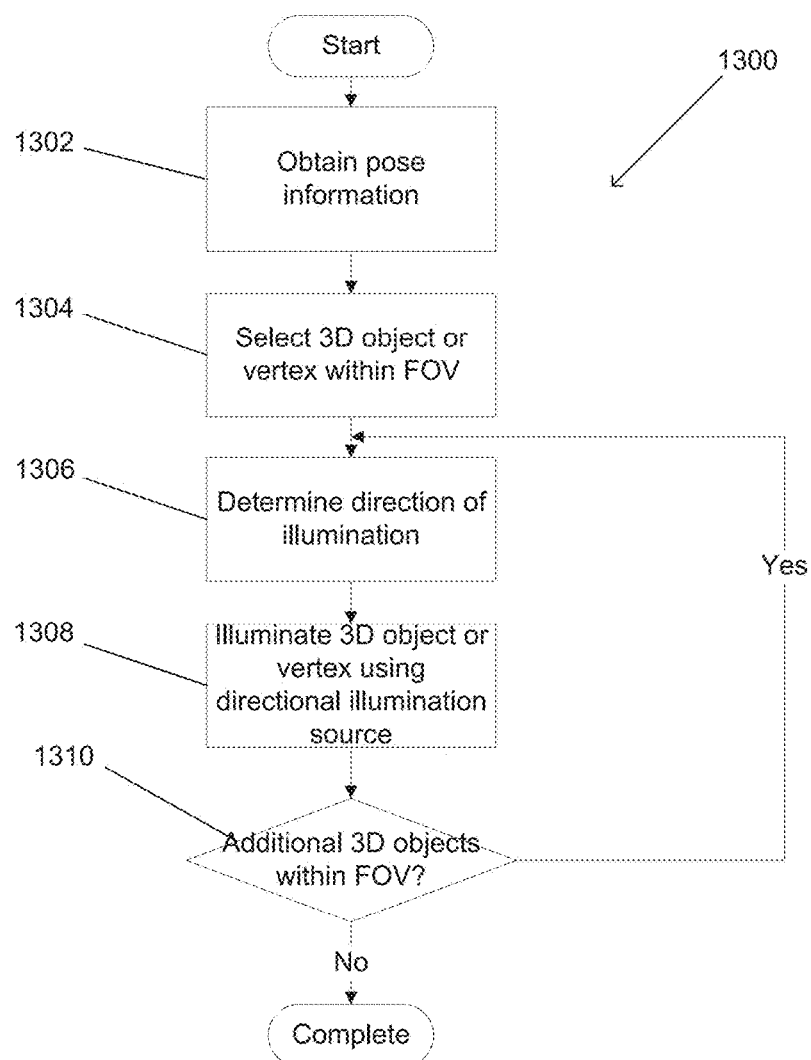
FIG. 13 is a flow chart showing a process for updating the illumination of 3D objects (or individual vertices or surfaces of 3D objects) as the field of view of a user within a virtual space changes in accordance with an embodiment of the invention.

A process for updating the illumination of 3D objects as the field of view of a user within a virtual space changes in accordance with an embodiment of the invention is illustrated in FIG. 13. The process 1300 includes obtaining (1302) pose information and then using the pose information to determine the position and field of view of the user. 3D objects within the field of view of the user can be identified and selected (1304, 1310). The position of the 3D object relative to the location of the user within the virtual space can be used to determine (1306) a direction of illumination. The direction of illumination is typically selected as the direction from the user location to the 3D object or the direction from a point adjacent the location of the user to the 3D object. The direction of illumination can, however, vary based upon the requirements of a given application.

Figure 14:
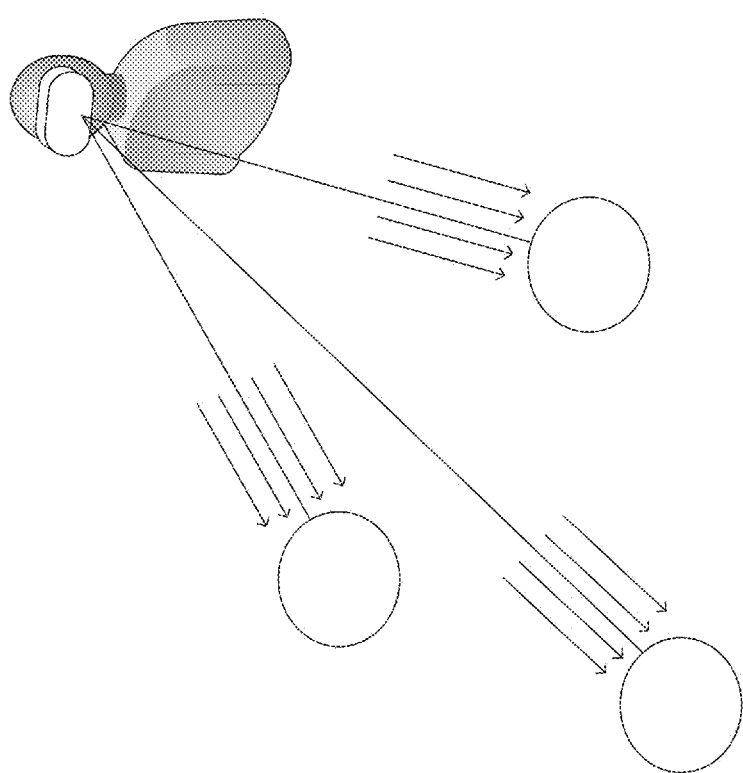
FIG. 14 conceptually illustrates Directional illumination of multiple 3D objects and/or vertices or surfaces of group 3D objects within a virtual space.

In the illustrated embodiment, each 3D object within the field of view of the user is illuminated (1308) using a directional illumination source and the process completes, when the illumination of all 3D objects within the user's field of view is updated (1310). A directional light mimics illumination by the sun and involves using an illumination model involving parallel light rays in a single direction. Directional illumination of multiple 3D objects within a virtual space based upon pose of a viewer is conceptually illustrated in FIG. 14. While using a separate directional light source to illuminate each 3D object provides significant advantages in providing uniform illumination of 3D objects across the field of view of a user, other illumination models that achieve uniform illumination can also be utilized as appropriate to the requirements of a given application in accordance with various embodiments of the invention. As noted above, the 3D data visualization can be enhanced by configuring each of the 3D objects so that they do not cast shadows within the virtual space.

While much of the discussion above with regard to the selection of 3D shapes and illumination within the virtual space relates to the manner in which data can be represented to facilitate 3D data exploration, 3D data visualization systems in accordance with a number of embodiments of the invention add additional 3D objects within the virtual space in the form of interaction primitives that assist a user in maintaining an awareness of the user's position within the virtual space and orientation relative to the data. User primitives that are utilized within 3D data visualization systems in accordance with various embodiments of the invention are discussed further below.

Utilizing Interaction Primitives within Virtual Spaces

The freedom of movement within a virtual space afforded by 3D data visualization systems in accordance with many embodiments of the invention means that users can quickly lose track of their orientation with respect to the data within the virtual space. 3D data visualization systems in accordance with several embodiments of the invention utilize interaction primitives to provide visual anchors for users to enable them to maintain a sense of their relative orientation to visualized data. In a number of embodiments, the 3D graph containing 3D objects is bounded by a cube on which a grid pattern is visible on the interior surface of the cube. As noted above, the position of the user can be utilized to make one or more surfaces of the cube completely transparent so that the grid lines do not partially occlude the 3D objects within the 3D graph. In certain embodiments, labelled axes are continuously shown within the field of view of the user to provide the user with a visual cue concerning the orientation of the data.

Figure 15A:
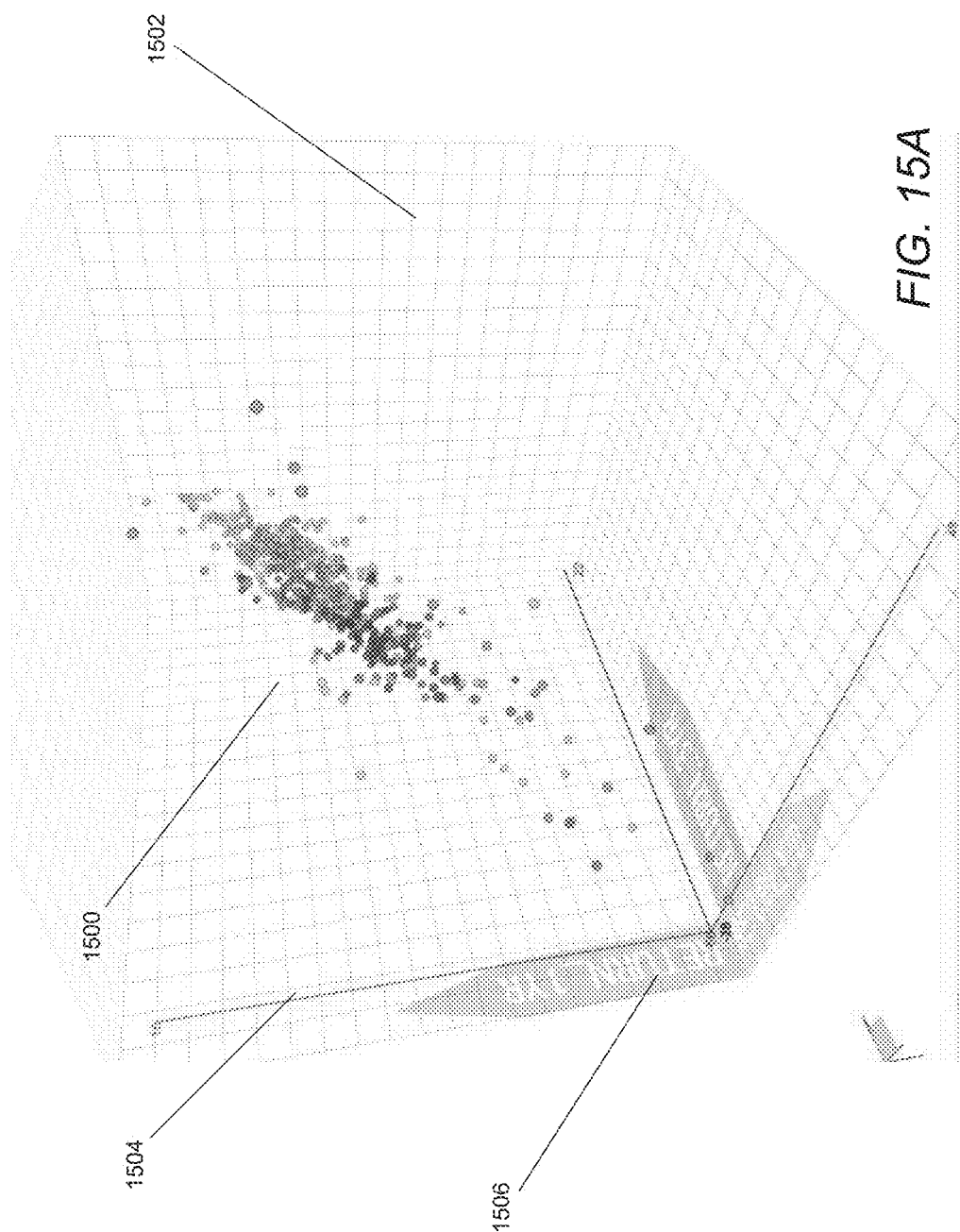
FIG. 15A illustrates a 3D graph including interaction primitives in the form of grids, axes, and axis labels generated by a 3D data visualization system in accordance with an embodiment of the invention.

A 3D graph including interaction primitives in the form of grids, axes, and axis labels generated by a 3D data visualization system in accordance with an embodiment of the invention is illustrated in FIG. 15A. The 3D objects 1500 are contained within a 3D graph that is bounded by planar grids 1502. Three color coded orthogonal axes 1504 provide visual anchors that are reinforced by directional axis labels 1506.

While specific interaction primitives and uses of interaction primitives are described above to assist a user in maintaining a sense of orientation relative to a 3D graph during interactive exploration (particularly within the 3D graph), any of a variety of interaction primitives can be utilized that provide the user with visual cues regarding orientation as appropriate to the requirements of a given application in accordance with many embodiments of the invention.

Implementation of Importance Ordering in Assignment of Dimensions to Visual Attributes A major problem associated with pattern recognition in high-dimensional data sets is the curse of dimensionality; this can be addressed by selecting only a subset of features that are rich in discriminatory power with respect to the data set being visualized. Feature selection is often preferable to feature transformation (e.g., Principal Component Analysis) when the meaning of the features is important and the goal of the 3D data visualization is to find relationships between the features in order to better understand the data set. In many data sets, the data dimensions can be separated into data dimensions that are numerical (e.g. a volatility measure) or categorical (e.g. Region). 3D data visualization systems in accordance with many embodiments of the invention are configured to automatically detect whether data is numerical or categorical during ingest and enable users to modify data dimension classification where incorrect (e.g. ZIP codes may be identified as numerical, but are actually categorical—"91107" is not greater than "91101").

In several embodiments, 3D data visualizations perform feature selection processes to provide recommendations concerning specific mappings of data dimensions to visualization attributes. In a number of embodiments, a user selects a feature of interest (e.g., what are the most important variables related to Return Low/High in a set of electronically traded funds). A feature selection process can then be performed with respect to both the numerical and categorical data dimensions to determine the dimensions that are most relevant to the feature of interest. In certain embodiments, separate feature selection processes are performed with respect to the numerical data dimensions and with respect to the categorical data dimensions. In many embodiments, the feature selection process utilizes univariate feature selection. In other embodiments, any of a variety of feature selection processes can be utilized as appropriate to the requirements of a given application. The feature selection process yields an ordered list of features. In several embodiments, the 3D data visualization system generates separate ordered lists of numerical and categorical data dimensions. In some embodiments, only a subset of data dimensions is considered in forming the ordered lists.

Figure 15B:
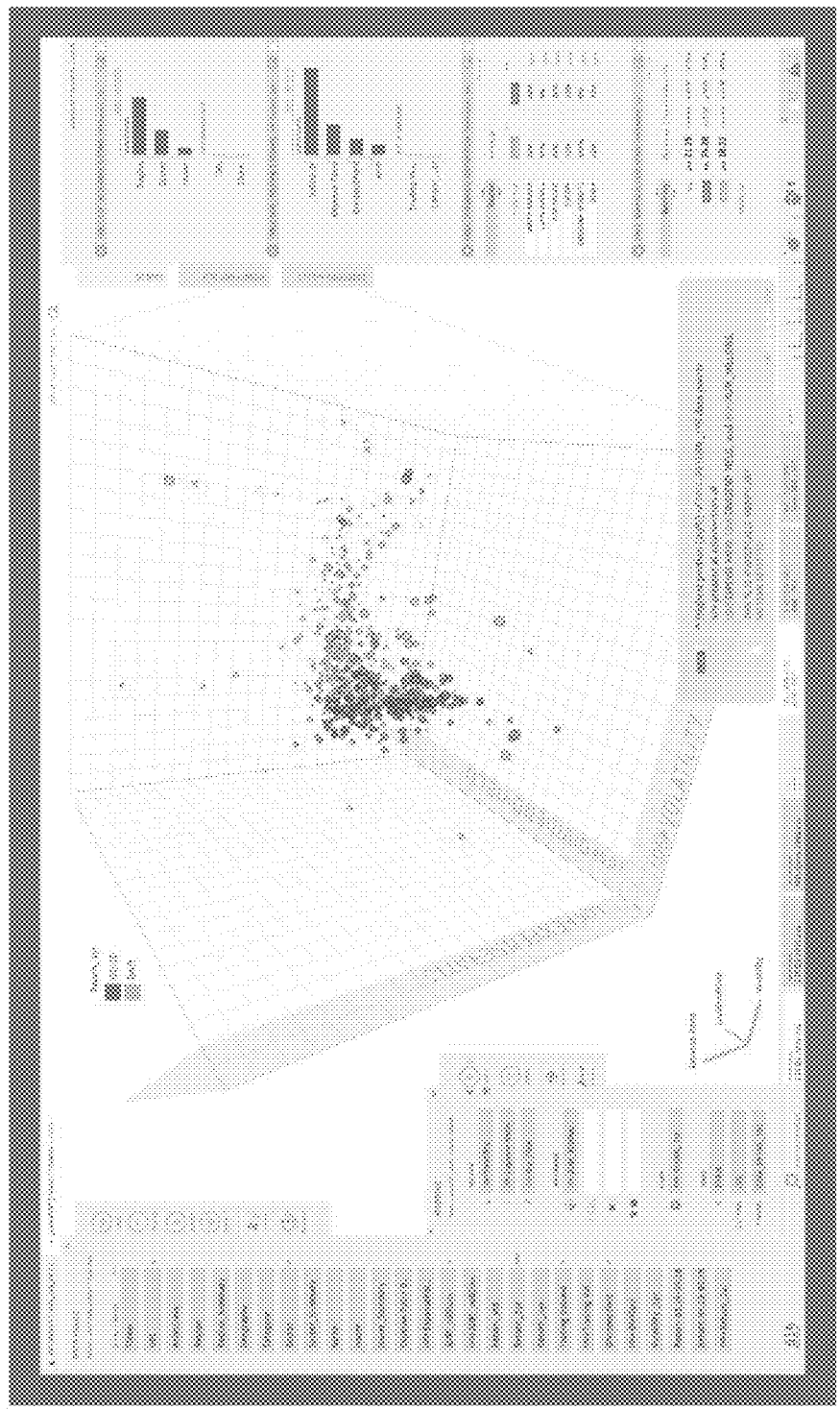
FIG. 15B illustrates a user interface showing recommendations concerning mappings of specific data dimensions to particular attributes of 3D objects visible in a 3D data visualization in accordance with an embodiment of the invention.

Once an ordering of the relevance of data dimensions to a feature is obtained, the ordering information can be utilized to generate or recommend specific mappings of data dimensions to particular visualization attributes. In a number of embodiments, a data visualization is generated in which the four most important numerical data dimensions are mapped to the X, Y, and Z spatial position coordinates of the 3D objects and the size attributes of the 3D objects. In many embodiments, the two most important categorical attributes are mapped to the Show By and shape visualization attributes. In many embodiments, a dialogue can be provided that makes recommendations and/or further recommendations concerning data dimensions that can be assigned to additional attributes. In certain embodiments, the feature of interest that was utilized to generate the importance ordering of the other data dimensions can be mapped to the color visualization attribute. In many embodiments, the specific recommended mappings is determined based upon the relative relevance of different numerical and categorical data dimensions. In many situations, categorical data dimensions will be most important from a quantitative perspective and/or from the perspective of the user. Instead of mapping categorical variables to the X, Y, and Z spatial position coordinates of the 3D objects, the 3D objects can be utilized to generate a 3D swarm plot or other type of categorical scatter plot with non-overlapping points. A user interface showing recommendations concerning mappings of specific data dimensions to particular attributes of 3D objects visible in a 3D data visualization in accordance with an embodiment of the invention is illustrated in FIG. 15B.

While specific processes for performing importance ordering and for recommending and/or assigning mappings of data dimensions to visualization attributes of 3D objects are described above, any of a variety of techniques for recommending specific data dimensions to map to particular visualization attributes including (but not limited to) techniques that perform importance ordering utilizing the Fast Relief Algorithm, the Fisher Discriminant Ratio, Correlation-based Feature Selection, a Fast Correlation Based Filter, and/or Multi Class Feature Selection can be utilized as appropriate to the requirements of specific applications in accordance with various embodiments of the invention.

Automated Color Palette Selection Based Upon Data Characteristics

In a similar manner that selection of specific data dimensions for 3D data visualization can be significant in highlighting patterns within data, the manner in which a specific data dimension is mapped to a visualization attribute can also be important in effectively communicating information. In many embodiments, numerical data dimensions are mapped to a continuous visualization attribute such as (but not limited to) color in a non-linear manner so that the greatest differences in the colors of the 3D objects occurs with respect to the range of values that conveys the most information regarding the relationship between the data dimensions and other data dimensions or a target feature. In many embodiments, when a data dimension is mapped to color it is mapped to a discrete number of colors to add with visual discrimination of the color attribute. As can readily be appreciated, any of a variety of techniques can be utilized to map values of a data dimension to specific colors as appropriate to the requirements of a given application in accordance with various embodiments of the invention.

Use of Animated Transitions in 3D Data Visualizations

Users that analyze high dimensional data frequently change the data dimensions that are visualized in order to explore different relationships within the data. In a number of embodiments, 3D data visualization systems use animation to illustrate correspondence between specific 3D objects representing discrete data points as data mappings change. The ability to observe a point moving from a location in a first 3D graph to a second 3D graph in which one or more the attributes of the 3D object corresponding to the data point are modified can enable the user to observe relationships that may exist within the data that can be revealed by mapping alternative combinations of data dimensions to 3D object attributes. A sequence of 3D data visualizations in which the X attribute of the 3D data objects is modified from a first data dimension (i.e. "Age") to a second data dimension (i.e. "YearsOnJob") in accordance with an embodiment of the invention is illustrated in FIGS. 16A-16D.

In several embodiments, additional insights into the data can be provided by animating different subsets of the data at different rates. For example, a clustering algorithm can be utilized to analyze the data in a first 3D graph and the animation can involve movement of the 3D data objects in the different clusters at different speeds. In certain embodiments, the user can control the animation so that sets of 3D objects commence movement upon receipt of user input directing their movement. In this way, a user can isolate a specific set of 3D objects and observe the way in which they map from one 3D graph to another. In a number of embodiments, a user can repeat the animations in a loop and/o reverse the animation to obtain further insights.

While specific techniques for animating 3D objects are described above with reference to FIGS. 16A-16D, any of a variety of animation techniques can be utilized to show changes in the attributes of 3D objects (which may include changes in shape, color, size, texture, etc. in addition to changes in position) from one 3D graph to another 3D graph as data dimension mappings are changed using 3D data visualization systems as appropriate to the requirements of specific applications in in accordance with various embodiments of the invention.

Contextual Presentation of Data

Many of the processes described above for enhancing 3D data visualization focus on the manner in which the 3D data visualization is generated. The context in which a 3D data visualization is presented can also impact a user's ability to discern meaningful insights from data. A user typically interacts with a 3D graph in different ways depending upon the amount of free space and freedom of movement of the user within the real world environment in which the 3D data visualization is being performed. When a user interacts with a 3D graph while seated at a desk, the user typically prefers the 3D graph to be displayed in a compact manner (e.g. a one foot×one foot×one foot cube). When a user is experiencing the 3D data visualization while standing and in an environment in which the user has significant freedom of movement, the user is more likely to scale the 3D graph to a larger size and move through the 3D graph. In many embodiments, the 3D graph is within a virtual environment. In several embodiments, the virtual environment and/or a mixed reality environment can contain affordances that enable manipulation of data. As noted above, the appearance of the 3D graph moving with respect to the virtual environment and affordances within the virtual environment can be achieved by moving the 3D objects associated with the virtual environment and the user's viewpoint within the virtual space to create the appearance that the 3D graph is being manipulated relative to the environment without moving the 3D objects that form the 3D graph. In addition, the manner in which the user interacts with the 3D graph can change as the relative scale of the 3D graph changes with respect to the virtual environment and with the distance of the user's viewpoint from the 3D graph within the virtual environment.

In many embodiments, a 3D data visualization system provides affordances within the 3D user interface displayed to the user that control the resizing of a 3D graph. In a number of embodiments, the 3D data visualization system can use information concerning the real world environment in which the 3D data visualization is being performed and can adjust the size of the 3D visualization of the multidimensional data space to fit within the environment.

Figure 17C:
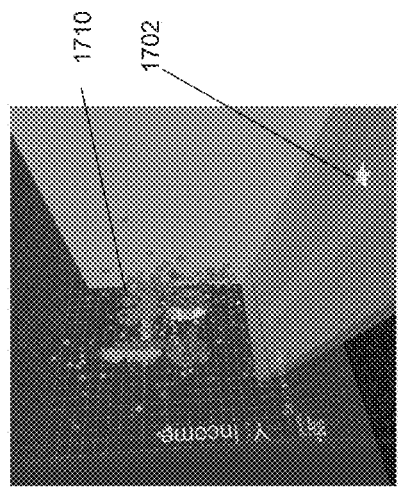
FIGS. 17A-17F illustrate affordances within a VR user interface that enable a user to control the size of a 3D data visualization within the virtual world generated by a 3D data visualization system in accordance with various embodiments of the invention.
Figure 17E:
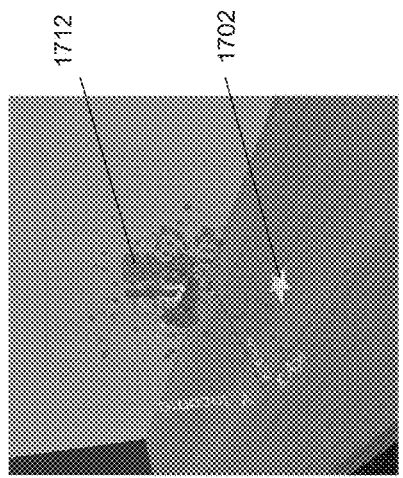
Figure 17B:
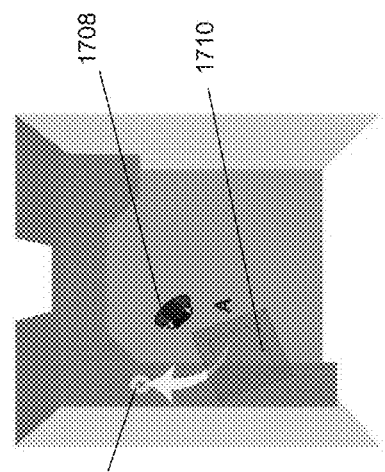
Figure 17D:
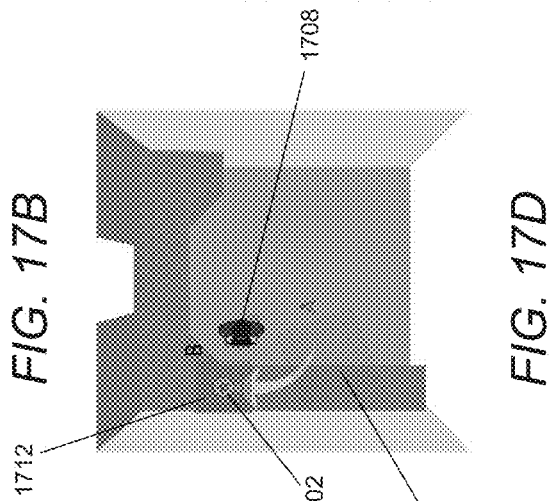
Figure 17A:
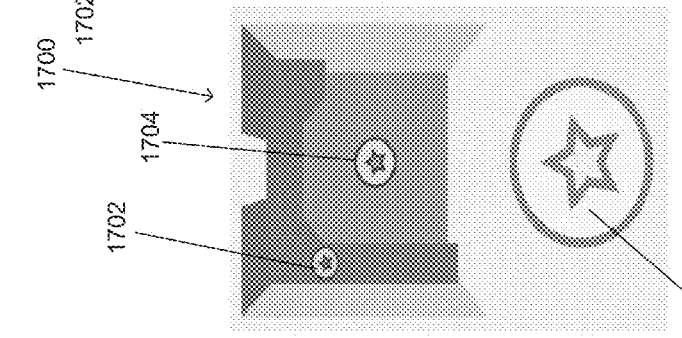
Figure 17F:
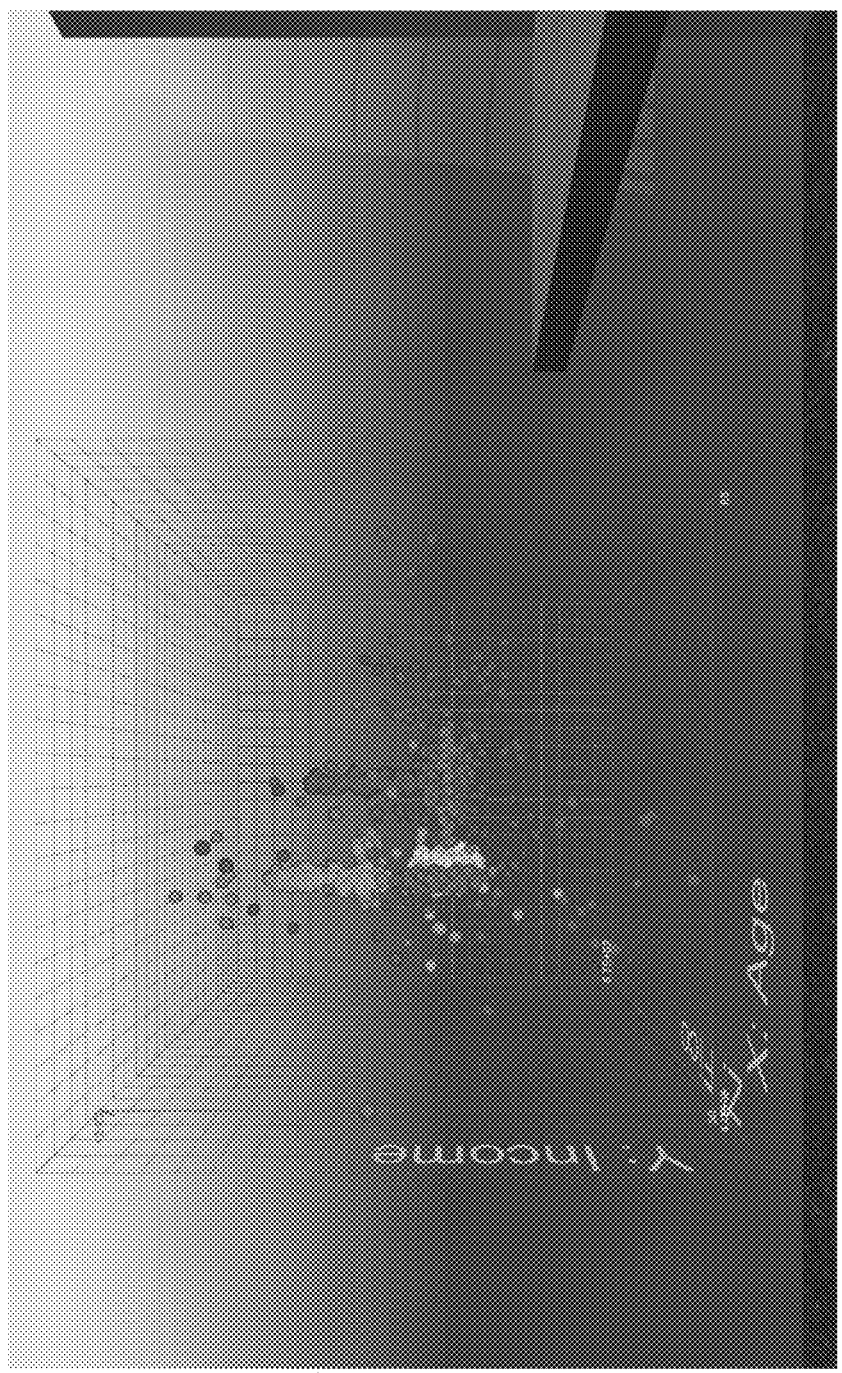

Affordances within a VR user interface that enable a user to control the size of a 3D data visualization within the virtual world generated by a 3D data visualization system in accordance with an embodiment of the invention is illustrated in FIG. 17A. The virtual environment 1700 includes a virtual office cube with a first affordance 1702 that can resize a 3D graph to a predetermined "desktop" scale. The virtual environment 1700 also includes a second affordance 1704 that can resize a 3D graph to a predetermined "sit down" scale, which is larger than the "desktop" scale, and a third affordance 1706 that can resize a 3D graph to the largest predetermined "standing" scale. When a user moves the 3D data visualization over the affordance, the 3D data visualization is resized. Following resizing, the user can further manipulate the 3D data visualization including changing the scaling of the 3D data visualization (e.g. shrinking a 3D graph to "desktop" scale and then expanding the 3D graph to move through the data toward a specific cluster of interest).

The manner in which a 3D data visualization can be resized using affordances within a 3D user interface is conceptually illustrated in FIGS. 17B-17F. In FIGS. 17B and 17C, a user's pose (1708) and a 3D data visualization (1710) within the virtual environment are illustrated. The affordance (1702) that can be utilized to resize the 3D data visualization to "desktop" scale is visible in FIG. 17C. Movement of the 3D data visualization (1710) over the affordance (1702) and the resulting resized 3D data visualization (1712) are conceptually illustrated in FIGS. 17E and 17F. As noted above, resizing does not fix the size of the 3D graph. Following resizing, the user can continue to modify the size of the 3D data visualization and the manner in which the 3D data visualization system responds to user inputs may change (e.g. the magnitude of a 3D gesture movement can be responded to differently based upon the size of the 3D data visualization). The affordance simply provides a mechanism by which a user can move between different contexts and have the 3D data visualization system automatically modify the 3D data visualization in ways that can include (but are not limited to) reflecting differences in the real world space and/or real world freedom of movement available for the user to explore the data. The increased scale with which a user can visualize the 3D data visualization when the user's context shifts to a standup mode in which the user has freedom of movement is conceptually illustrated in FIG. 17F.

While the above discussion refers to three different modes or operating contexts, 3D data visualization systems can support any number of different modes and/or contexts as appropriate to the requirements of a given application in accordance with various embodiments of the invention. Furthermore, the affordances within the 3D user interface that automatically modify the 3D data visualization are not limited to affordances that simply resize the data. In various embodiments, a rich array of affordances are offered including (but not limited to) affordances that respond to movement of a 3D graph over the affordance by: applying a machine learning algorithm to the data (e.g. k-means clustering); and/or generating a new 3D visualization of multidimensional data represented by a single 3D object within an initial 3D visualization. In addition, automated actions such as (but not limited to) resizing can be performed in response to predetermined inputs that can include (but are not limited to) gesture, inputs, speech inputs, inputs via one or more input devices, and/or any combination or sequence of inputs. Accordingly, 3D data visualization systems are not limited to use of any specific affordances and can utilize any affordance, set of affordances, and/or input modalities to interact with a 3D graph as appropriate to the requirements of a given application.

In several embodiments, the 3D data visualization system determines real world context and dynamically modifies the rendering a 3D data visualization to be realistically contained within the real world environment. For example, instead of a virtual cube, similar resizing operations can be performed within a real cube and/or office space. In a number of embodiments, a depth sensing camera system is utilized to acquire information concerning the volumes of a free space surrounding a user. In other embodiments, any of a variety of appropriate machine vision techniques can be utilized. In several embodiments, the 3D data visualization system detects changes in the volume of space related to the change in pose and/or viewpoint of the user and can resize a 3D data visualization in a manner that is appropriate to the new volume of free space visible from the user's viewpoint. As can readily be appreciated, a 3D data visualization system will typically not place limits on the ability to which a user can resize a 3D data visualization based upon the volume of free space available to contain the visualization. Instead, a user can expand the 3D data visualization in a way that enables interactive exploration of the data.

Input Devices

In a number of embodiments, a variety of input modalities are supported by 3D data visualization systems. In several embodiments, a user can interact with a 3D data visualization system using a desktop device using a conventional Windows Icons Menus Pointers (WIMP) paradigm and/or a mobile device using a touch gesture based user interface. When a user transitions to interacting with the 3D data visualization system via an immersive 3D display, such as (but not limited to) an AR, MR, or VR headset, then user input can be obtained using a variety of additional input modalities. In several embodiments, 3D gesture based inputs can be observed using a machine vision system. In many embodiments, a user is provided with a wand-like user input device having an elongated handle that communicates wirelessly with the 3D data visualization system. In a number of embodiments, the wand has a single button and communicates via a wireless communication link. The 3D data visualization system can obtain user input by tracking the pose of the wand and the status of the button. Depending upon the context, the button can be interpreted by the 3D data visualization system as conveying different information. A simple input modality involves allowing the user to move the position of the 3D data visualization relative to the user when the button is not being pressed, and rotate the 3D data visualization when the button is pressed. In other embodiments, user gaze direction and/or a remote control that simply includes one or more buttons can be used as user inputs. As can readily be appreciated, any of a variety of processing can be initiated based upon a combination of a pose input and a button input as appropriate to a specific use interface context and the requirements of a given application in accordance with various embodiments of the invention. Furthermore, any of a variety of additional input modalities can also be supported as appropriate to the needs of a given 3D data visualization application.

Although the present invention has been described in certain specific aspects, many additional modifications and variations would be apparent to those skilled in the art. It is therefore to be understood that the present invention may be practiced otherwise than specifically described, including various changes in the implementation other than those described herein such as (but not limited to) the use of alternative display technologies (e.g. a cave automatic environment), without departing from the scope and spirit of the present invention. Thus, embodiments of the present invention should be considered in all respects as illustrative and not restrictive.

What is claimed is:

1. A data visualization system for generating three-dimensional (3D) visualizations of a multidimensional data space, comprising:
    a display device; and
    a computing system, comprising:
        memory containing a 3D data visualization application; and
        a processing system;
        wherein the 3D data visualization application directs the processing system to:
            load a set of data points into memory where each data point includes values in multiple data dimensions;
            determine data dimensions from the multiple data dimensions related to a data dimension of interest and specific mappings of the determined data dimensions to visualization attributes;
            determine visualization attributes for rendering a set of 3D objects based upon the determined mappings of the data dimensions to the visualization attributes, where the determined mappings of the data dimensions to the visualization attributes determine at least a location for each 3D object within a virtual space;
            create a filtering metadata by applying at least one logical operation over the set of data points, where each value in the filtering metadata indicates whether a corresponding data point in the set of data points is to be displayed based upon the result of the logical operation;
            update a visibility dimension associated with each data point in the set of data points to reflect the visibility of each data point based upon the determined mappings of the data dimensions to the visualization attributes and the filtering metadata, where values in the visibility dimension determine whether or not a 3D object in the set of 3D objects is rendered;
            decrease a rendering latency by interactively rendering the set of 3D objects within the virtual space from viewpoints determined based upon received user input, the visualization attributes, and the visibility dimension, wherein if the visibility dimension value indicates no visibility, then the associated 3D object is not rendered; and
            display the virtual space from a viewpoint within the virtual space using the display device.

2. The data visualization system of claim 1, wherein:
    the display device is a 3D display device; and
    interactively rendering the set of 3D objects within the virtual space from viewpoints determined based upon received user input comprises rendering stereo images displayed via the 3D display device.

3. The data visualization system of claim 1, wherein the 3D data visualization application is implemented using a 3D rendering engine.

4. The data visualization system of claim 3, wherein the implementation of the 3D data visualization application further relies upon scripts that execute via the 3D rendering engine.

5. The data visualization system of claim 1, wherein the visualization attributes include at least one attribute selected from the group consisting of:
    X Coordinate,
    Y Coordinate,
    Z Coordinate,
    Shape,
    Size,
    Color Palette,
    Color Map,
    Color Scale,
    Transparency,
    ID,
    URL,
    Mask,
    Show By,
    Motion of the 3D Object,
    Pulsation,
    Sonification,
    Haptic Feedback, and
    Vibrotactile Feedback.

6. The data visualization system of claim 1, wherein determining the data dimension from the multiple data dimensions related to the data dimension of interest and specific mappings of the determined data dimensions to the visualization attributes further comprises receiving user selections of mappings of data dimensions to visualization attributes.

7. The data visualization system of claim 1, wherein determining the data dimensions from the multiple data dimensions related to the data dimension of interest and the specific mappings of the determined data dimensions to the visualization attributes further comprises retrieving a stored set of mappings of data dimensions to visualization attributes.

8. The data visualization system of claim 1, wherein interactively rendering the set of 3D objects within the virtual space from viewpoints determined based upon received user input further comprises:
   generating at least one group 3D object based upon the visualization attributes of a plurality of visible 3D objects; and
   interactively rendering the at least one group 3D object within the virtual space from viewpoints determined based upon received user input.

9. The data visualization system of claim 1, wherein interactively rendering the set of 3D objects within the virtual space from viewpoints determined based upon the received user input further comprises:
   modifying 3D objects forming part of a virtual environment within the virtual space in response to the user input so that the set of 3D objects remain stationary within the virtual space and appear to change relative to the virtual environment due to the modification to the 3D objects forming part of the virtual environment; and
   rendering the visible set of 3D objects and the 3D objects forming part of the virtual environment.

10. The data visualization system of claim 9, wherein modifying the 3D objects forming part of the virtual environment within the virtual space in response to the user input comprises at least one modification selected from the group consisting of:
   modifying the size of the 3D objects forming part of the virtual environment in response to a user instruction to resize the set of 3D objects to create an impression that the set of 3D objects are changing in size relative to the virtual environment;
   moving the positions of the 3D objects forming part of the virtual environment in response to a user instruction to move the set of 3D objects to create the impression that the set of 3D objects are moving relative to the virtual environment; and
   moving the positions of the 3D objects forming part of the virtual environment in response to a user instruction to rotate the set of 3D objects to create the impression that the set of 3D objects are rotating relative to the virtual environment.

11. The data visualization system of claim 1, wherein interactively rendering of the set of 3D objects within the virtual space from viewpoints determined based upon the received user input comprises:
   illuminating at least some of the 3D objects, where each illuminated 3D object is illuminated using a directional illumination source originating at a user viewpoint; and
   rendering at least the illuminated 3D objects based upon the user viewpoint.

12. The data visualization system of claim 11, wherein illuminating at least some of the 3D objects further comprises:
   determining a field of view;
   illuminating 3D objects within the field of view of the user using a directional illumination source originating at the user viewpoint; and
   rendering the illuminated 3D objects within the field of view of the user.

13. The data visualization system of claim 1, wherein interactively rendering 3D data visualizations of the set of 3D objects within the virtual space from viewpoints determined based upon the received user input comprises:
   rotating at least some of the 3D objects based upon a user viewpoint, so that the appearance of the rotated 3D objects is invariant with user viewpoint; and
   rendering the rotated 3D objects based upon the user viewpoint.

14. The data visualization system of claim 1, wherein interactively rendering the set of 3D objects within the virtual space from viewpoints determined based upon the received user input comprises:
   determining a location within the virtual space of at least one interaction primitive based upon a user viewpoint; and
   rendering the at least one interaction primitive based upon the user viewpoint.

15. The data visualization system of claim 14, further comprising determining a transparency of at least one interaction primitive based upon the user viewpoint.

16. The data visualization system of claim 1, wherein the set of 3D objects include 3D objects having depth perception preserving shapes.

17. The data visualization system of claim 1, wherein determining the data dimensions from the multiple data dimensions related to the data dimension of interest and the specific mappings of the determined data dimensions to visualization attributes comprises:
   receiving a selection of a target feature;
   determining the importance of at least a subset of multiple data dimensions to the target feature; and
   generating mappings of data dimensions having high importance to specific visualization attributes.

18. The data visualization system of claim 17, wherein determining the importance of at least a subset of multiple data dimensions to the target feature further comprises:
   identifying data dimensions that are numerical and data dimensions that are categorical;
   generating mappings of numerical data dimensions having high importance to a first set of visualization attributes;
   generating mappings of categorical data dimensions having high importance to a second set of visualization attributes.

19. The data visualization system of claim 18, wherein the first set of visualization attributes comprises X, Y, Z position, and size.

20. The data visualization system of claim 19, wherein the second set of visualization attributes comprises shape.

21. The data visualization system of claim 1, wherein interactively rendering the set of 3D objects within the virtual space from viewpoints determined based upon received user input comprises:
   determining a location within the virtual space of at least one affordance, where user input directing movement of a 3D object onto one of the at least one affordances initiates modification of the 3D object;
   detecting movement of a 3D object onto one of the at least one affordances;
   modifying the 3D object based upon the one of the at least one affordances; and
   rendering the modified 3D object based upon a user viewpoint.

22. The data visualization system of claim 21, wherein modifying the 3D object based upon the one of the at least one affordances comprises resizing the 3D object.

23. A data visualization system for generating three-dimensional (3D) visualizations of a multidimensional data space, comprising:
- a 3D display device; and
- a computing system, comprising:
  - memory containing a 3D data visualization application; and
  - a processing system;
  - wherein the 3D data visualization application directs the processing system to:
    - load a set of data points into memory, where each data point includes values in multiple data dimensions;
    - receive user selections of mappings of data dimensions to visualization attributes;
    - determine data dimensions from the multiple data dimensions related to a data dimension of interest and specific mappings of the determined data dimensions to visualization attributes;
    - determine visualization attributes for rendering a set of 3D objects based upon the determined mappings of the data dimensions to the visualization attributes, where the determined mappings of data dimensions to visualization attributes determine at least a location for each visible within a virtual space;
    - create a filtering metadata by applying at least one logical operation over the set of data points, where each value in the filtering metadata indicates whether a corresponding data point in the set of data points is to be displayed based upon the result of the logical operation
    - update a visibility dimension associated with each data point to reflect the visibility of each data point based upon the determined mappings of data dimensions to visualization attributes and the filtering metadata, where values in the visibility dimension determine whether or not a 3D object in the set of 3D objects is rendered;
    - decrease a rendering latency by interactively rendering a set of 3D objects within the virtual space from viewpoints determined based upon received user input, the visualization attributes, and the visibility dimension, as stereo images displayed via the 3D display device by:
      - generating at least one group 3D object based upon the visualization attributes of a plurality of visible 3D objects;
      - modifying 3D objects forming part of a virtual environment within the virtual space in response to the user input so that the at least one group 3D object remains stationary within the virtual space and appears to change relative to the virtual environment in the 3D data visualization due to the modification to the 3D objects forming part of the virtual environment; and
      - interactively rendering the visible 3D objects corresponding to the at least one group 3D object and the 3D objects forming part of the virtual environment within the virtual space from viewpoints determined based upon received user input, wherein if the visibility dimension value indicates no visibility, then the associated 3D object is not rendered.

* * * * *